United States Patent
Lin

(10) Patent No.: US 12,413,283 B2
(45) Date of Patent: Sep. 9, 2025

(54) METHOD AND APPARATUS FOR REPORTING CHANNEL STATE INFORMATION (CSI) UNDER ADAPTATION IN A WIRELESS COMMUNICATION SYSTEM

(71) Applicant: ASUS Technology Licensing Inc., Taipei (TW)

(72) Inventor: Ko-Chiang Lin, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/785,027

(22) Filed: Jul. 26, 2024

(65) Prior Publication Data

US 2025/0038812 A1  Jan. 30, 2025

Related U.S. Application Data

(60) Provisional application No. 63/529,491, filed on Jul. 28, 2023.

(51) Int. Cl.
*H04B 7/06* (2006.01)
*H04W 76/28* (2018.01)

(52) U.S. Cl.
CPC .......... *H04B 7/0626* (2013.01); *H04W 76/28* (2018.02)

(58) Field of Classification Search
CPC .. H04B 7/0626; H04B 7/0413; H04B 7/0617; H04B 7/086; H04B 7/063; H04B 7/0632; H04B 7/0639; H04B 17/328; H04W 76/28; H04W 24/08; H04L 5/0048; H04L 5/005

See application file for complete search history.

(56) References Cited

U.S. PATENT DOCUMENTS

2022/0191725 A1*  6/2022  Ashraf ................. H04L 5/0053
2024/0237133 A1*  7/2024  Jeon ...................... H04W 76/28

* cited by examiner

*Primary Examiner* — Ayanah S George
(74) *Attorney, Agent, or Firm* — Cooper Legal Group LLC

(57) ABSTRACT

A method and apparatus are disclosed. In an example from the perspective of a User Equipment (UE), the UE receives an indication of activation of Cell Discontinuous Transmission (DTX), wherein the Cell DTX is associated with one or more active periods and one or more non-active periods, and the UE is configured with a plurality of Channel State Information Reference Signal (CSI-RS) resources for deriving a CSI report. The UE determines whether to transmit the CSI report based on whether the UE receives a CSI-RS in an active period of the one or more active periods associated with the Cell DTX.

20 Claims, 12 Drawing Sheets

700 ⟶

```
┌─────────────────────────────────────────────────────────────┐
│  RECEIVE INDICATION OF ADAPTATION ASSOCIATED WITH CSI-RS,   │
│  WHEREIN ADAPTATION IS ASSOCIATED WITH SWITCHING FROM       │─── 705
│  FIRST NUMBER OF PORTS TO SECOND NUMBER OF PORTS, AND UE    │
│  IS CONFIGURED WITH PLURALITY OF CSI-RS RESOURCES FOR       │
│                  DERIVING CSI REPORT                         │
└─────────────────────────────────────────────────────────────┘
                              │
                              ▼
┌─────────────────────────────────────────────────────────────┐
│   DETERMINE WHETHER TO TRANSMIT CSI REPORT BASED ON         │
│   WHETHER UE RECEIVES CSI-RS ASSOCIATED WITH SECOND         │─── 710
│                    NUMBER OF PORTS                           │
└─────────────────────────────────────────────────────────────┘
```

FIG. 7

METHOD AND APPARATUS FOR REPORTING CHANNEL STATE INFORMATION (CSI) UNDER ADAPTATION IN A WIRELESS COMMUNICATION SYSTEM

CROSS-REFERENCE TO RELATED APPLICATIONS

The present Application claims the benefit of U.S. Provisional Patent Application Ser. No. 63/529,491 filed on Jul. 28, 2023, the entire disclosure of which is incorporated herein in its entirety by reference.

FIELD

This disclosure generally relates to wireless communication networks, and more particularly, to a method and apparatus for reporting Channel State Information (CSI) under adaptation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives an indication of activation of Cell Discontinuous Transmission (DTX), wherein the Cell DTX is associated with one or more active periods and one or more non-active periods, and the UE is configured with a plurality of Channel State Information Reference Signal (CSI-RS) resources for deriving a CSI report. The UE determines whether to transmit the CSI report based on whether the UE receives a CSI-RS in an active period of the one or more active periods associated with the Cell DTX.

In an example from the perspective of a base station, the base station transmits, to a UE, an indication of activation of Cell DTX, wherein the adaptation is associated with switching from a first number of ports to a second number of ports. The base station configures the UE with a plurality of CSI-RS resources for deriving a CSI report. The base station determines whether to receive the CSI report based on whether the UE receives a CSI-RS associated with the second number of ports.

BRIEF DESCRIPTION OF THE DRAWINGS

FIG. 7 is a flow chart according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 38.211 V15.7.0, "NR physical channels and modulation"; 3GPP TS 38.214 V17.4.0, "NR Physical layer procedures for data"; RP-230566, "WID revision: Network energy savings for NR"; RAN1 #110 chairman's note; RAN1 #110bis-e chairman's note. The standards and documents listed above are hereby expressly incorporated by reference in their entirety.

Figure 1:
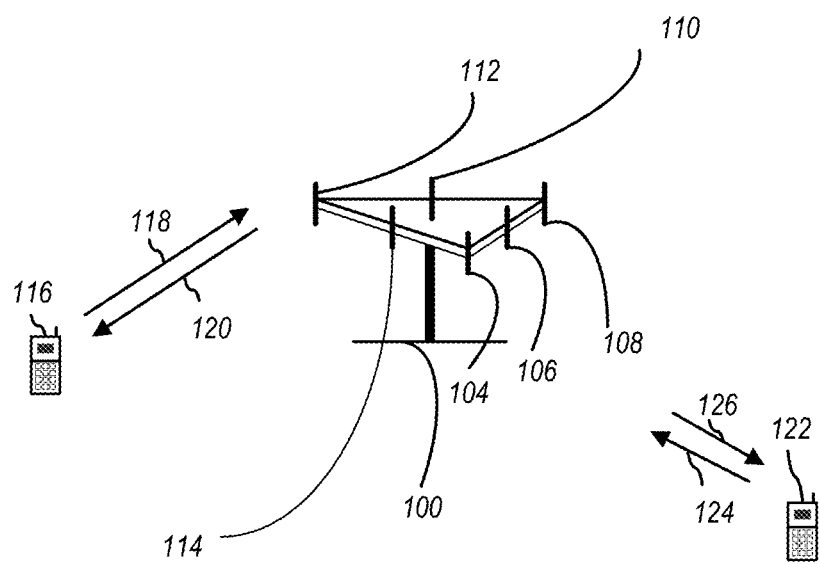
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
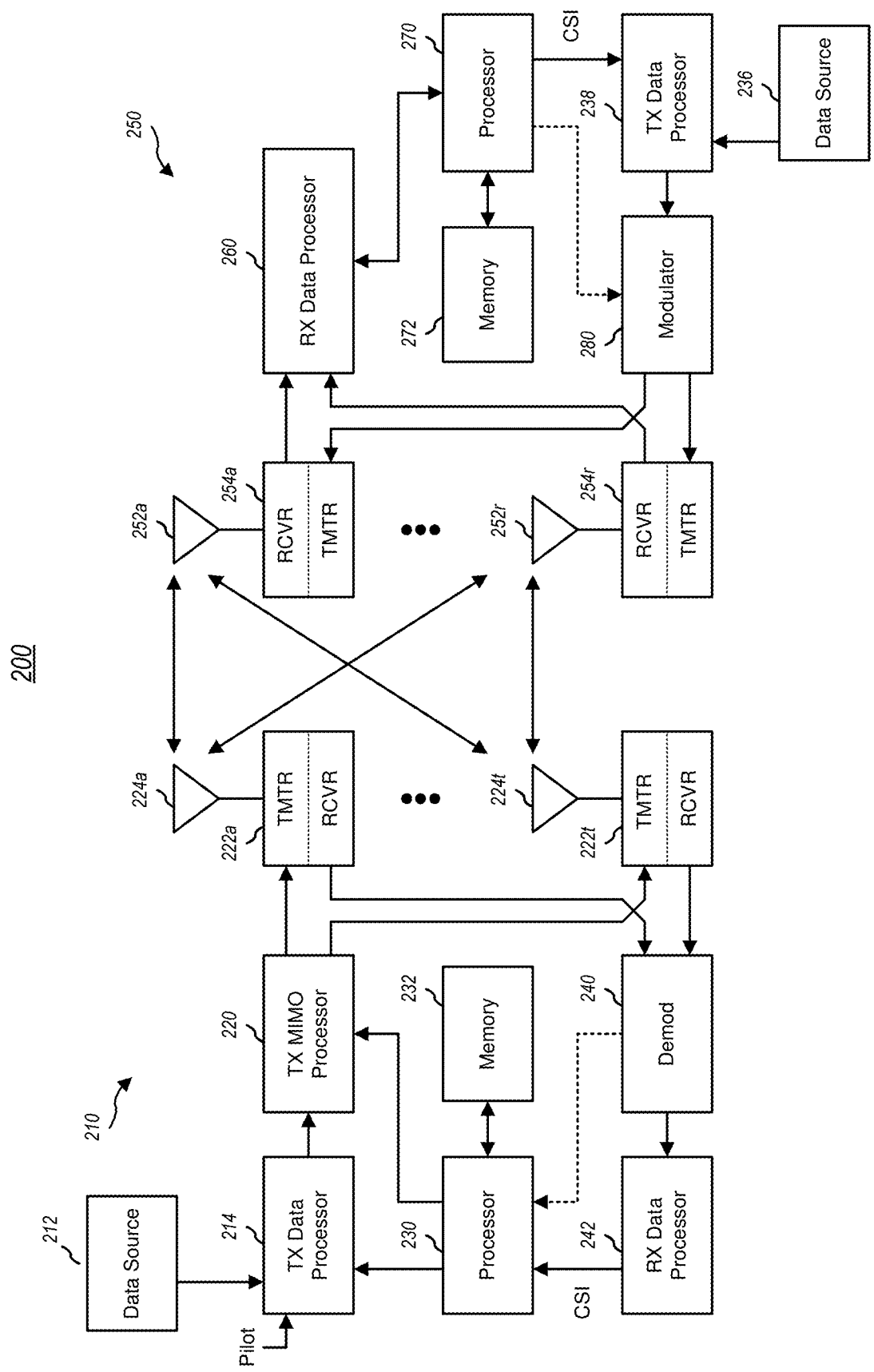
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
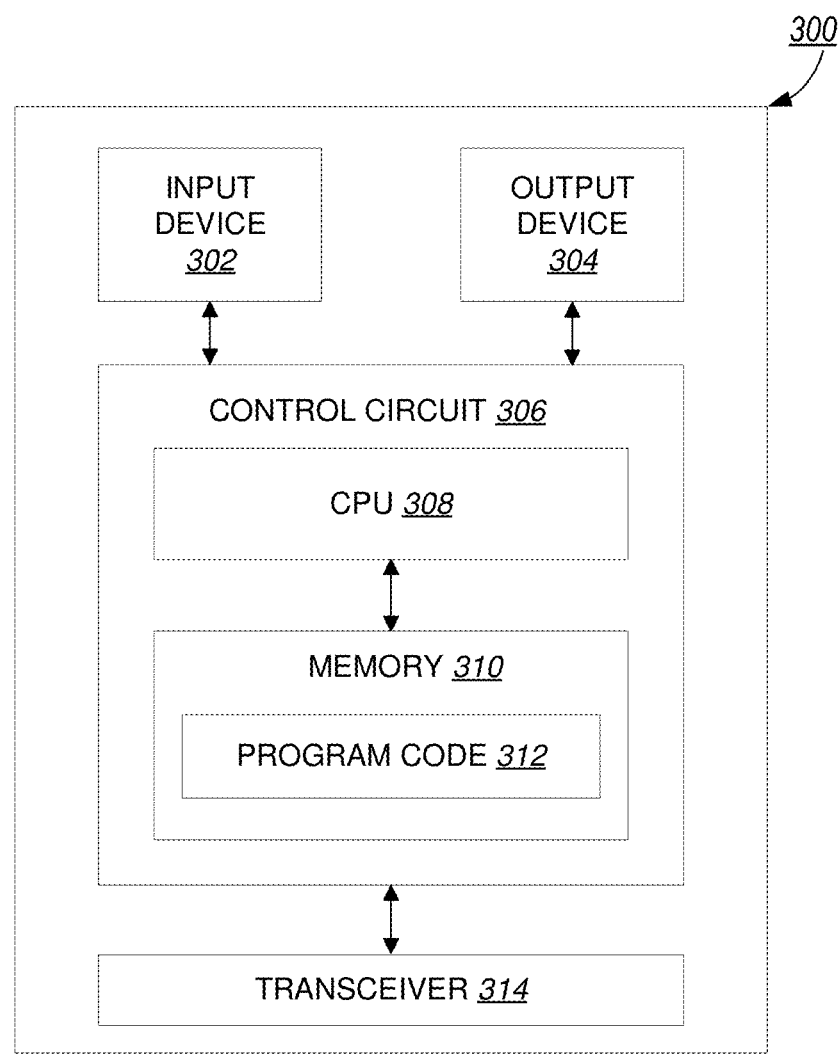
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
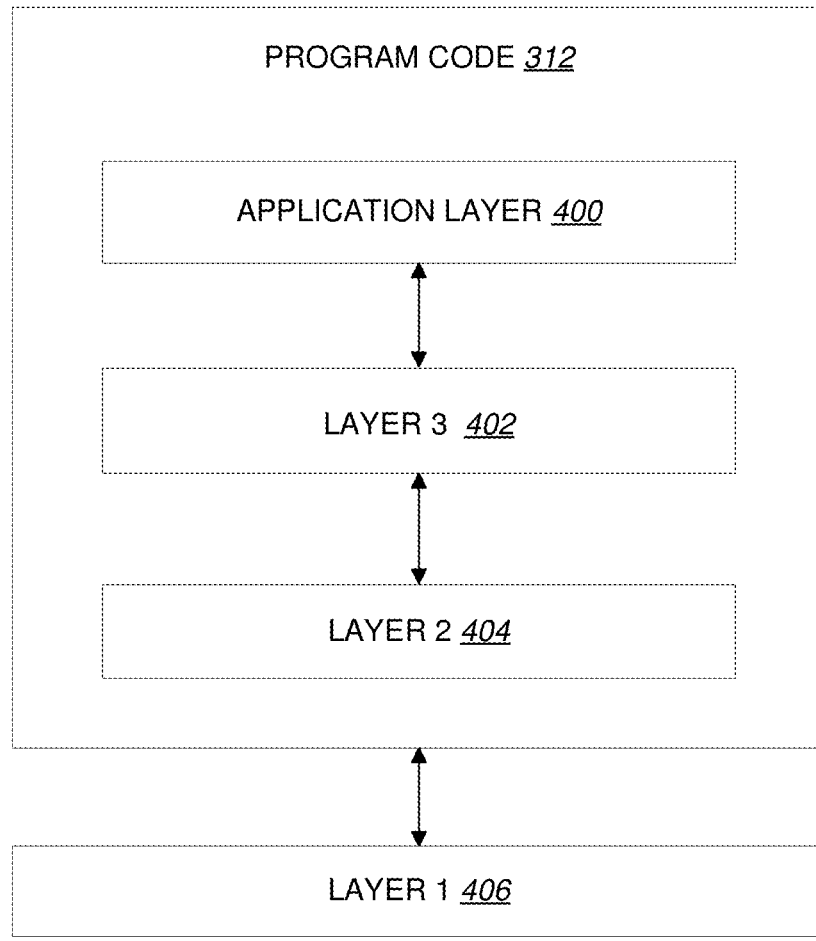
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

One or more frame structures associated with Radio Access Technology (RAT) and/or New RAT (NR) (associated with 5G) may accommodate various requirements associated with time resources and/or frequency resources (e.g., ultra-low latency (e.g., ~0.5 ms)) to delay-tolerant traffic for Machine Type Communication (MTC), from a high peak rate for enhanced Mobile Broadband (eMBB) to a very low data rate for MTC. Low latency (e.g., short Transmission Time Interval (TTI)) and/or mixing/adapting different TTIs may be important for various applications. In addition to diverse services and requirements, forward compatibility is an important consideration in an initial NR frame structure design as not all features of NR would be included in the beginning phase/release of NR.

Reducing protocol latency may be an important improvement between different generations/releases, which can improve efficiency as well as meeting new application requirements (e.g., real-time service). An effective method adopted to reduce latency is to reduce a length of TTIs from 10 milliseconds (ms) in 3G to 1 ms in LTE.

Backward compatibility may not be required in an NR system. Numerology may be adjusted such that reducing a symbol number of a TTI is not the only way to change TTI length. In an example associated with LTE numerology, 14 Orthogonal Frequency Division Multiplexing (OFDM) symbols may be associated with 1 ms and/or a subcarrier spacing of 15 KHz. When the subcarrier spacing increases to 30 KHz, where a Fast Fourier Transform (FFT) size and/or a cyclic prefix (CP) structure may not change, there may be 28 OFDM symbols in 1 ms and/or the TTI may become 0.5 ms if the number of OFDM symbol in a TTI is kept the same. Accordingly, a design between different TTI lengths may be kept common, with scalability performed on the subcarrier spacing. One or more of FFT size, Physical Resource Block (PRB) definition/number, CP design, supportable system bandwidth, subcarrier spacing selection, etc. may be configured in association with subcarrier spacing selection. As NR is associated with a larger system bandwidth and/or a larger coherence bandwidth, inclusion of a larger subcarrier spacing may be beneficial.

Figure 5:
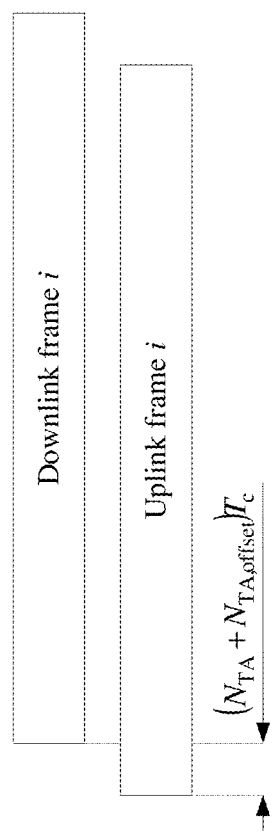
FIG. 5 is a diagram illustrating an exemplary scenario associated with uplink-downlink timing relation according to one exemplary embodiment.

More details of NR frame structure, channel and/or numerology design are provided in 3GPP TS 38.211 V15.7.0. Notably, Figure 4.3.1-1 of Section 4.3.1 of 3GPP TS 38.211 V15.7.0, entitled "Uplink-downlink timing relation", is reproduced herein as FIG. 5. One or more parts of 3GPP TS 38.211 V15.7.0 are quoted below:

4 Frame Structure and Physical Resources 4.1 General

Throughout this specification, unless otherwise noted, the size of various fields in the time domain is expressed in time units $T_c=1/(\Delta f_{max} \cdot N_f)$ where $\Delta f_{max}=480 \cdot 10^3$ Hz and $N_f=4096$. The constant $\kappa = T_s/T_c = 64$ where $T_s=1/(\Delta f_{ref} \cdot N_{f,ref})$, $\Delta f_{ref}=15 \cdot 10^3$ Hz and $N_{f,ref}=2048$.

4.2 Numerologies

Multiple OFDM numerologies are supported as given by Table 4.2-1 where μ and the cyclic prefix for a bandwidth part are obtained from the higher-layer parameter subcarrierSpacing and cyclicPrefix, respectively.

TABLE 4.2-1

Supported transmission numerologies.

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

4.3 Frame Structure 4.3.1 Frames and Subframes

Downlink and uplink transmissions are organized into frames with $T_f=(\Delta f_{max} \cdot N_f/100) \cdot T_c=10$ ms duration, each consisting often subframes of $T_{sf}=(\Delta f_{max} N_f/1000) \cdot T_c=1$ ms duration. The number of consecutive OFDM symbols per subframe is $N_{symb}^{subframe,\mu} = N_{symb}^{slot} N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,offset})T_c$ before the start of the corresponding downlink frame at the UE where $N_{TA,offset}$ is given by [5, TS 38.213].

Figure 4.3.1-1: Uplink-Downlink Timing Relation

A CSI report may be used to reveal information related to channel related and/or beam related information between UE and base station. The base station may be configured with (and/or may configure the UE with) one or more sets of CSI-RS resources as well as CSI report configurations. The UE may measure the configured CSI-RSs, derive one or more proper quantities and/or contents (e.g., at least one of Channel Quality Indicator (CQI), precoding matrix indicator (PMI), rank indicator (RI), CSI-RS resource indicator (CRI), Synchronization Signal/Physical Broadcast Channel (SS/PBCH) Block Resource indicator (SSBRI), L1-RSRP, L1-signal to interference and noise ratio (SINR), etc.), and/or report content indicative of the quantities and/or contents to the base station. The base station may then be able to schedule the UE properly and/or accordingly, e.g., with one or more proper MCSs, one or more proper beams, prober precoding and/or proper number of layers. One or more parts of 3GPP TS 38.214 V17.4.0 are quoted below:

5.1.5 Antenna Ports Quasi Co-Location

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:
- 'typeA': {Doppler shift, Doppler spread, average delay, delay spread}
- 'typeB': {Doppler shift, Doppler spread}
- 'typeC': {Doppler shift, average delay}
- 'typeD': {Spatial Rx parameter}

The UE can be configured with a list of up to 128 TCI-State configurations, within the higher layer parameter dl-OrJoint-TCIStateList in PDSCH-Config for providing a reference signal for the quasi co-location for DM-RS of PDSCH and DM-RS of PDCCH in a BWP/CC, for CSI-RS, and to provide a reference, if applicable, for determining UL TX spatial filter for dynamic-grant and configured-grant based PUSCH and PUCCH resource in a BWP/CC, and SRS.

. . .

For a periodic CSI-RS resource in an NZP-CSI-RS-ResourceSet configured with higher layer parameter trs-Info, the UE shall expect that a TCI-State indicates one of the following quasi co-location type(s):
- 'typeC' with an SS/PBCH block and, when applicable, 'typeD' with the same SS/PBCH block where SS/PBCH block may have a PCI different from the PCI of the serving cell. The UE can assume center frequency, SCS, SFN offset are the same for SS/PBCH block from the serving cell and SS/PBCH block having a PCI different from the serving cell, or
- 'typeC' with an SS/PBCH block and, when applicable, 'typeD' with a CSI-RS resource in an NZP-CSI-RS-ResourceSet configured with higher layer parameter repetition, where SS/PBCH block may have a PCI different from the PCI of the serving cell. The UE can assume center frequency, SCS, SFN offset are the same for SS/PBCH block from the serving cell and SS/PBCH block having a PCI different from the serving cell.

For periodic/semi-persistent CSI-RS, if the UE is configured with dl-OrJoint-TCIStateList, the UE can assume that the indicated TCI-State is not applied.

For an aperiodic CSI-RS resource in an NZP-CSI-RS-ResourceSet configured with higher layer parameter trs-Info, the UE shall expect that a TCI-State indicates qcl-Type set to 'typeA' with a periodic CSI-RS resource in a NZP-CSI-RS-ResourceSet configured with higher layer parameter trs-Info and, when applicable, qcl-Type set to 'typeD' with the same periodic CSI-RS resource.

For a CSI-RS resource in an NZP-CSI-RS-ResourceSet configured without higher layer parameter trs-Info and without the higher layer parameter repetition, the UE shall expect that a TCI-State indicates one of the following quasi co-location type(s):
- 'typeA' with a CSI-RS resource in a NZP-CSI-RS-ResourceSet configured with higher layer parameter trs-Info and, when applicable, 'typeD' with the same CSI-RS resource, or
- 'typeA' with a CSI-RS resource in a NZP-CSI-RS-ResourceSet configured with higher layer parameter trs-Info and, when applicable, 'typeD' with an SS/PBCH block, where SS/PBCH block may have a PCI different from the PCI of the serving cell. The UE can assume center frequency, SCS, SFN offset are the same for SS/PBCH block from the serving cell and SS/PBCH block having a PCI different from the serving cell, or
- 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or
- 'typeB' with a CSI-RS resource in a NZP-CSI-RS-ResourceSet configured with higher layer parameter trs-Info when 'typeD' is not applicable.

For a CSI-RS resource in an NZP-CSI-RS-ResourceSet configured with higher layer parameter repetition, the UE shall expect that a TCI-State indicates one of the following quasi co-location type(s):
- 'typeA' with a CSI-RS resource in a NZP-CSI-RS-ResourceSet configured with higher layer parameter trs-Info and, when applicable, 'typeD' with the same CSI-RS resource, or
- 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or
- 'typeC' with an SS/PBCH block and, when applicable, 'typeD' with the same SS/PBCH block, the reference RS may additionally be an SS/PBCH block having a PCI different from the PCI of the serving cell. The UE can assume center frequency, SCS, SFN offset are the same for SS/PBCH block from the serving cell and SS/PBCH block having a PCI different from the serving cell.

. . .

5.1.6 UE Procedure for Receiving Reference Signals 5.1.6.1 CSI-RS Reception Procedure The CSI-RS defined in Clause 7.4.1.5 of [4, TS 38.211], may be used for time/frequency tracking, CSI computation, L1-RSRP computation, L1-SINR computation, mobility, and tracking during fast SCell activation.

For a CSI-RS resource associated with a NZP-CSI-RS-ResourceSet with the higher layer parameter repetition set to 'on', the UE shall not expect to be configured with CSI-RS over the symbols during which the UE is also configured to monitor the CORESET, while for other NZP-CSI-RS-ResourceSet configurations, if the UE is configured with a CSI-RS resource and a search space set associated with a CORESET in the same OFDM symbol(s), the UE may assume that the CSI-RS and a PDCCH DM-RS transmitted in all the search space sets associated with CORESET are quasi co-located with 'typeD', if 'typeD' is applicable. If the CORESET is activated with two TCI states, UE may assume that the first TCI state of the CORESET as the default QCL assumption for the CSI-RS. This also applies to the case when CSI-RS and the CORESET are in different intra-band component carriers, if 'typeD' is applicable. Furthermore, the UE shall not expect to be configured with the CSI-RS in PRBs that overlap those of the CORESET in the OFDM symbols occupied by the search space set(s).

The UE is not expected to receive CSI-RS and SIB1 message in the overlapping PRBs in the OFDM symbols where SIB1 is transmitted.

If the UE is configured with DRX,
- if the UE is configured to monitor DCI format 2_6 and configured by higher layer parameter ps-TransmitOtherPeriodicCSI to report CSI with the higher layer parameter reportConfigType set to 'periodic' and reportQuantity set to quantities other than 'cri-RSRP' and 'ssb-Index-RSRP' when drx-onDurationTimer in DRX-Config is not started, the most recent CSI measurement occasion occurs in DRX active time or during the time duration indicated by drx-onDurationTimer in DRX-Config also outside DRX active time for CSI to be reported;

if the UE is configured to monitor DCI format 2_6 and configured by higher layer parameter ps-TransmitPeriodicL1-RSRP to report L1-RSRP with the higher layer parameter reportConfigType set to 'periodic' and reportQuantity set to cri-RSRP when drx-onDurationTimer in DRX-Config is not started, the most recent CSI measurement occasion occurs in DRX active time or during the time duration indicated by drx-onDurationTimer in DRX-Config also outside DRX active time for CSI to be reported;

otherwise, the most recent CSI measurement occasion occurs in DRX active time for CSI to be reported.

5.1.6.1.2 CSI-RS for L1-RSRP and L1-SINR Computation

If a UE is configured with a NZP-CSI-RS-ResourceSet configured with the higher layer parameter repetition set to 'on', the UE may assume that the CSI-RS resources, described in Clause 5.2.2.3.1, within the NZP-CSI-RS-ResourceSet are transmitted with the same downlink spatial domain transmission filter, where the CSI-RS resources in the NZP-CSI-RS-ResourceSet are transmitted in different OFDM symbols. If repetition is set to 'off', the UE shall not assume that the CSI-RS resources within the NZP-CSI-RS-ResourceSet are transmitted with the same downlink spatial domain transmission filter.

If the UE is configured with a CSI-ReportConfig with reportQuantity set to 'cri-RSRP', 'cri-SINR' or 'none' and if the CSI-ResourceConfig for channel measurement (higher layer parameter resourcesForChannelMeasurement) contains a NZP-CSI-RS-ResourceSet that is configured with the higher layer parameter repetition and without the higher layer parameter trs-Info, the UE can only be configured with the same number (1 or 2) of ports with the higher layer parameter nrofPorts for all CSI-RS resources within the set. If the UE is configured with the CSI-RS resource in the same OFDM symbol(s) as an SS/PBCH block, the UE may assume that the CSI-RS and the SS/PBCH block are quasi co-located with 'typeD' if 'typeD' is applicable. Furthermore, the UE shall not expect to be configured with the CSI-RS in PRBs that overlap with those of the SS/PBCH block, and the UE shall expect that the same subcarrier spacing is used for both the CSI-RS and the SS/PBCH block.

. . .

5.2 UE Procedure for Reporting Channel State Information (CSI)

5.2.1 Channel State Information Framework

The procedures on aperiodic CSI reporting described in this clause assume that the CSI reporting is triggered by DCI format 0_1, but they equally apply to CSI reporting triggered by DCI format 02, by applying the higher layer parameter reportTriggerSizeDCI-0-2 instead of reportTriggerSize.

The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP, L1-SINR or CapabilityIndex.

For CQI, PMI, CRI, SSBRI, LI, RI, L1-RSRP, L1-SINR, Capability[Set]Index a UE is configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOn-PUSCH-TriggerStateList). Each trigger state in CSI-AperiodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

5.2.1.1 Reporting Settings

Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer indicator (LI), L1-RSRP, L1-SINR, CRI, and SSBRI (SSB Resource Indicator) and Capability-Index.

The time domain behavior of the CSI-ReportConfig is indicated by the higher layer parameter reportConfigType and can be set to 'aperiodic', 'semiPersistentOnPUCCH', 'semiPersistentOnPUSCH', or 'periodic'. For 'periodic' and 'semiPersistentOnPUCCH'/'semiPersistentOnPUSCH' CSI reporting, the configured periodicity and slot offset applies in the numerology of the UL BWP in which the CSI report is configured to be transmitted on. The higher layer parameter reportQuantity indicates the CSI-related, L1-RSRP-related, L1-SINR-related or CapabilityIndex-related quantities to report. The reportFreqConfiguration indicates the reporting granularity in the frequency domain, including the CSI reporting band and if PMI/CQI reporting is wideband or sub-band. The timeRestrictionForChannelMeasurements parameter in CSI-ReportConfig can be configured to enable time domain restriction for channel measurements and timeRestrictionForInterferenceMeasurements can be configured to enable time domain restriction for interference measurements. The CSI-ReportConfig can also contain CodebookConfig, which contains configuration parameters for Type-I, Type II, Enhanced Type II CSI, or Further Enhanced Type II Port Selection including codebook subset restriction when applicable, and configurations of group-based reporting. A UE is not expected to be configured with a CSI report setting associated with a dormant DL BWP if the reportConfigType is set to 'aperiodic'.

5.2.1.2 Resource Settings

Each CSI Resource Setting CSI-ResourceConfig contains a configuration of a list of S≥1 CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.

The time domain behavior of the CSI-RS resources within a CSI Resource Setting are indicated by the higher layer parameter resourceType and can be set to aperiodic, periodic, or semi-persistent. For periodic and semi-persistent CSI Resource Settings, when the UE is configured with groupBasedBeamReporting-r17, the number of CSI Resource Sets configured is S=2, otherwise the number of CSI-RS Resource Sets configured is limited to S=1. For periodic and semi-persistent CSI Resource Settings, the configured periodicity and slot offset is given in the numerology of its associated DL BWP, as given by BWP-id. When a UE is configured with multiple CSI-ResourceConfigs consisting the same NZP CSI-RS resource ID, the same time domain behavior shall be configured for the CSI-ResourceConfigs. When a UE is configured with multiple CSI-ResourceConfigs consisting the same CSI-IM resource ID, the same time-domain behavior shall be configured for the CSI-ResourceConfigs. All CSI Resource Settings linked to a CSI Report Setting shall have the same time domain behavior.

The following are configured via higher layer signaling for one or more CSI Resource Settings for channel and interference measurement:

CSI-IM resource for interference measurement as described in Clause 5.2.2.4.
    NZP CSI-RS resource for interference measurement as described in Clause 5.2.2.3.1.
    NZP CSI-RS resource for channel measurement as described in Clause 5.2.2.3.1.

The UE may assume that the NZP CSI-RS resource(s) for channel measurement and the CSI-IM resource(s) for interference measurement configured for one CSI reporting are resource-wise QCLed with respect to 'typeD'. When NZP CSI-RS resource(s) is used for interference measurement, the UE may assume that the NZP CSI-RS resource for channel measurement and the CSI-IM resource or NZP CSI-RS resource(s) for interference measurement configured for one CSI reporting are QCLed with respect to 'typeD'.

For L1-SINR Measurement:

When one Resource Setting is configured, the Resource Setting (given by higher layer parameter resourcesForChannelMeasurement) is for channel and interference measurement on NZP CSI-RS for L1-SINR computation. UE may assume that same 1 port NZP CSI-RS resource(s) with density 3 REs/RB is used for both channel and interference measurements.

When two Resource Settings are configured, the first one Resource Setting (given by higher layer parameter resourcesForChannelMeasurement) is for channel measurement on SSB or NZP CSI-RS and the second one (given by either higher layer parameter csi-IM-ResourcesForInterference or higher layer parameter nzp-CSI-RS-ResourcesForInterference) is for interference measurement performed on CSI-IM or on 1 port NZP CSI-RS with density 3 REs/RB, where each SSB or NZP CSI-RS resource for channel measurement is associated with one CSI-IM resource or one NZP CSI-RS resource for interference measurement by the ordering of the SSB or NZP CSI-RS resource for channel measurement and CSI-IM resource or NZP CSI-RS resource for interference measurement in the corresponding resource sets. The number of SSB(s) or CSI-RS resources for channel measurement equals to the number of CSI-IM resources or the number of NZP CSI-RS resource for interference measurement.

UE may apply the SSB, or 'typeD' RS configured with qcl-Type set to 'typeD' to the NZP CSI-RS resource for channel measurement, as the reference RS for determining 'typeD' assumption for the corresponding CSI-IM resource or the corresponding NZP CSI-RS resource for interference measurement configured for one CSI reporting.

UE may expect that the NZP CSI-RS resource set for channel measurement and the NZP-CSI-RS resource set for interference measurement, if any, are configured with the higher layer parameter repetition.

5.2.1.3 (Void)
5.2.1.4 Reporting Configurations

The UE shall calculate CSI parameters (if reported) assuming the following dependencies between CSI parameters (if reported)

LI shall be calculated conditioned on the reported CQI, PMI, RI and CRI
    CQI shall be calculated conditioned on the reported PMI, RI and CRI
    PMI shall be calculated conditioned on the reported RI and CRI
    RI shall be calculated conditioned on the reported CRI.

The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Clause 5.2.1.5.2. Aperiodic CSI-RS is configured and triggered/activated as described in Clause 5.2.1.5.1.

. . .

When the UE is configured with higher layer parameter NZP-CSI-RS-ResourceSet and when the higher layer parameter repetition is set to 'off', the UE shall determine a CRI from the supported set of CRI values as defined in Clause 6.3.1.1.2 of [5, TS 38.212] and report the number in each CRI report. When the higher layer parameter repetition for a CSI-RS Resource Set for channel measurement is set to 'on', CRI for the CSI-RS Resource Set for channel measurement is not reported. CRI reporting is not supported when the higher layer parameter codebookType is set to 'typeII', 'typeII-PortSelection', 'typeII-r16', to 'typeII-PortSelection-r16', or 'typeII-PortSelection-r17'.

For a periodic or semi-persistent CSI report on PUCCH, the periodicity $T_{CSI}$ (measured in slots) and the slot offset $T_{offset}$ are configured by the higher layer parameter reportSlotConfig. Unless specified otherwise, the UE shall transmit the CSI report in frames with SFN $n_f$ and slot number within the frame $n_{s,f}^{\mu}$ satisfying $$(N_{slot}^{frame,\mu} n_f + n_{s,f}^{\mu} - T_{offset}) \mod T_{CSI} = 0$$

where μ is the SCS configuration of the UL BWP the CSI report is transmitted on.

For a semi-persistent CSI report on PUSCH, the periodicity $T_{CSI}$ (measured in slots) is configured by the higher layer parameter reportSlotConfig. Unless specified otherwise, the UE shall transmit the CSI report in frames with SFN $n_f$ and slot number within the frame $n_{s,f}^{\mu}$ satisfying $$(N_{slot}^{frame,\mu}(n_f - n_f^{start}) + n_{s,f}^{\mu} - n_{s,f}^{start}) \mod T_{CSI} = 0$$

where $n_f^{start}$ and $n_{s,f}^{start}$ are the SFN and slot number within the frame respectively of the initial semi-persistent PUSCH transmission according to the activating DCI.

For a semi-persistent or aperiodic CSI report on PUSCH, the allowed slot offsets are configured by the following higher layer parameters:

if triggered/activated by DCI format 0_2 and the higher layer parameter reportSlotOffsetListDCI-0-2 is configured, the allowed slot offsets are configured by report-SlotOffsetListDCI-0-2, and if triggered/activated by DCI format 0_1 and the higher layer parameter reportSlotOffsetListDCI-0-1 is configured, the allowed slot offsets are configured by report-SlotOffsetListDCI-0-1, and otherwise, the allowed slot offsets are configured by the higher layer parameter reportSlotOffsetList.

The offset is selected in the activating/triggering DCI.

For CSI reporting, a UE can be configured via higher layer signaling with one out of two possible subband sizes, where a subband is defined as $N_{PRB}^{SB}$ contiguous PRBs and depends on the total number of PRBs in the bandwidth part according to Table 5.2.1.4-2.

. . .

The reportFreqConfiguration contained in a CSI-ReportConfig indicates the frequency granularity of the CSI Report. A CSI Reporting Setting configuration defines a CSI reporting band as a subset of subbands of the bandwidth part, where the reportFreqConfiguration indicates:

the csi-ReportingBand as a contiguous or non-contiguous subset of subbands in the bandwidth part for which CSI shall be reported.

A UE is not expected to be configured with csi-ReportingBand which contains a subband where a CSI-RS resource linked to the CSI Report setting has the frequency density of each CSI-RS port per PRB in the subband less than the configured density of the CSI-RS resource.

If a CSI-IM resource is linked to the CSI Report Setting, a UE is not expected to be configured with csi-ReportingBand which contains a subband where not all PRBs in the subband have the CSI-IM REs present.

wideband CQI or subband CQI reporting, as configured by the higher layer parameter cqi-FormatIndicator. When wideband CQI reporting is configured, a wideband CQI is reported for each codeword for the entire CSI reporting band. When subband CQI reporting is configured, one CQI for each codeword is reported for each subband in the CSI reporting band.

wideband PMI or subband PMI reporting as configured by the higher layer parameter pmi-FormatIndicator. When wideband PMI reporting is configured, a wideband PMI is reported for the entire CSI reporting band. When subband PMI reporting is configured, except with 2 antenna ports, a single wideband indication ($i_1$ in Clause 5.2.2.2) is reported for the entire CSI reporting band and one subband indication ($i_2$ in clause 5.2.2.2) is reported for each subband in the CSI reporting band. When subband PMIs are configured with 2 antenna ports, a PMI is reported for each subband in the CSI reporting band.

a UE is not expected to be configured with pmi-FormatIndicator if codebookType is set to 'typeII-r16' or 'typeII-PortSelection-r16' or 'typeII-PortSelection-r17'.

A CSI Reporting Setting is said to have a wideband frequency-granularity if reportQuantity is set to 'cri-RI-PMI-CQI', or 'cri-RI-LI-PMI-CQI', cqi-FormatIndicator is set to 'widebandCQI' and pmi-FormatIndicator is set to 'widebandPMI', or reportQuantity is set to 'cri-RI-PMI-CQI', codebookType is set to 'typeII-PortSelection-r17' with M=1 and cqi-FormatIndicator is set to 'widebandCQI', or reportQuantity is set to 'cri-RI-i1' or reportQuantity is set to 'cri-RI-CQI' or 'cri-RI-i1-CQI' and cqi-FormatIndicator is set to 'widebandCQI', or reportQuantity is set to 'cri-RSRP' or 'ssb-Index-RSRP' or 'cri-SINR', or 'ssb-Index-SINR' or 'cri-RSRP-CapabilityIndex' or 'ssb-Index-RSRP-CapabilityIndex' or 'cri-SINR-CapabilityIndex', or 'ssb-Index-SINR-CapabilityIndex' otherwise, the CSI Reporting Setting is said to have a subband frequency-granularity.

A CSI Reporting Setting with codebookType set to 'typeI-SinglePanel' and the corresponding CSI-RS Resource Set for channel measurement configured with two Resource Groups and N Resource Pairs, as described in clause 5.2.1.4.1, can be configured with wideband frequency-granularity only if csi-ReportMode is set to 'Mode1' and numberOfSingleTRP-CSI-Mode1 is set to X=0, as described in clause 5.2.1.4.2.

If the UE is configured with a CSI Reporting Setting for a bandwidth part with fewer than 24 PRBs, the CSI reporting setting is expected to have a wideband frequency-granularity, and, if applicable, the higher layer parameter codebookType is set to 'typeI-SinglePanel'.

The first subband size is given by $N_{PRB}^{SB} - (N_{BWP,i}^{start} \bmod N_{PRB}^{SB})$ and the last subband size given by $$(N_{BWP,i}^{start} + N_{BWP,i}^{size}) \bmod N_{PRB}^{SB} \text{ if } (N_{BWP,i}^{start} + N_{BWP,i}^{size}) \bmod N_{PRB}^{SB} \neq 0 \text{ and } N_{PRB}^{SB} \text{ if } (N_{BWP,i}^{start} + N_{BWP,i}^{size}) \bmod N_{PRB}^{SB} = 0$$

If a UE is configured with semi-persistent CSI reporting, the UE shall report CSI when both CSI-IM and NZP CSI-RS resources are configured as periodic or semi-persistent. If a UE is configured with aperiodic CSI reporting, the UE shall report CSI when both CSI-IM and NZP CSI-RS resources are configured as periodic, semi-persistent or aperiodic.

A UE configured with DCI format 0_1 or 0_2 does not expect to be triggered with multiple CSI reports with the same CSI-ReportConfigId.

5.2.1.4.1 Resource Setting Configuration

For aperiodic CSI, each trigger state configured using the higher layer parameter CSI-AperiodicTriggerState is associated with one or multiple CSI-ReportConfig where the CSI-ReportConfig not configured with groupBasedBeamReporting-r17 is linked to periodic, or semi-persistent, or aperiodic resource setting(s):

When one Resource Setting is configured, the Resource Setting (given by higher layer parameter resourcesForChannelMeasurement) is for channel measurement for L1-RSRP or for channel and interference measurement for L1-SINR computation.

When two Resource Settings are configured, the first one Resource Setting (given by higher layer parameter resourcesForChannelMeasurement) is for channel measurement and the second one (given by either higher layer parameter csi-IM-ResourcesForInterference or higher layer parameter nzp-CSI-RS-ResourcesForInterference) is for interference measurement performed on CSI-IM or on NZP CSI-RS.

When three Resource Settings are configured, the first Resource Setting (higher layer parameter resourcesForChannelMeasurement) is for channel measurement, the second one (given by higher layer parameter csi-IM-ResourcesForInterference) is for CSI-IM based interference measurement and the third one (given by higher layer parameter nzp-CSI-RS-ResourcesFo-rInterference) is for NZP CSI-RS based interference measurement.

For aperiodic CSI, and for periodic and semi-persistent CSI resource settings, each trigger state configured using the higher layer parameter CSI-AperiodicTriggerState is associated with one or multiple CSI-ReportConfig where the CSI-ReportConfig configured with groupBasedBeamReporting-r17 is linked to periodic or semi-persistent, setting(s):

When one Resource Setting is configured, the Resource setting is given by resourcesForChannelMeasurement for L1-RSRP measurement. In such a case, the number of configured CSI Resource Sets in the Resource Setting is S=2

For aperiodic CSI, and for aperiodic CSI resource settings, each trigger state configured using the higher layer parameter CSI-AperiodicTriggerState is associated with one or multiple CSI-ReportConfig where the CSI-ReportConfig configured with groupBasedBeamReporting-r17 is associated with resourcesForChannel and resourcesForChannel2, which correspond to first and second resource sets, respectively, for L1-RSRP measurement.

For semi-persistent or periodic CSI, each CSI-ReportConfig is linked to periodic or semi-persistent Resource Setting(s):

When one Resource Setting (given by higher layer parameter resourcesForChannelMeasurement) is configured, the Resource Setting is for channel measurement for L1-RSRP or for channel and interference measurement for L1-SINR computation.

When two Resource Settings are configured, the first Resource Setting (given by higher layer parameter resourcesForChannelMeasurement) is for channel measurement and the second Resource Setting (given by higher layer parameter csi-IM-ResourcesForInterference) is used for interference measurement performed on CSI-IM. For L1-SINR computation, the second Resource Setting (given by higher layer parameter csi-IM-ResourcesForInterference or higher layer parameter nzp-CSI-RS-ResourceForInterference) is used for interference measurement performed on CSI-IM or on NZP CSI-RS.

A UE is not expected to be configured with more than one CSI-RS resource in resource set for channel measurement for a CSI-ReportConfig with the higher layer parameter codebookType set to 'typeII', 'typeII-PortSelection', 'typeII-r16', 'typeII-PortSelection-r16', or 'typeII-PortSelection-r17'. A UE is not expected to be configured with more than 64 NZP CSI-RS resources and/or SS/PBCH block resources in resource setting for channel measurement for a CSI-ReportConfig with the higher layer parameter reportQuantity set to 'none', 'cri-RI-CQI', 'cri-RSRP', 'ssb-Index-RSRP', 'cri-SINR' or 'ssb-Index-SINR', 'cri-RSRP-Index', 'ssb-Index-RSRP-Index', 'cri-SINR-Index' or 'ssb-Index-SINR-Index'. If interference measurement is performed on CSI-IM, each CSI-RS resource for channel measurement is resource-wise associated with a CSI-IM resource by the ordering of the CSI-RS resource and CSI-IM resource in the corresponding resource sets. The number of CSI-RS resources for channel measurement equals to the number of CSI-IM resources.

An NZP CSI-RS Resource Set for channel measurement with $2 \leq K_s \leq 8$ resources can be configured with two Resource Groups, with $K_1 \geq 1$ resources in Group 1 and $K_2 \geq 1$ resources in Group 2, such that $K_1+K_2=K_s$, and with $N \in \{1,2\}$ Resource Pairs. Each Resource Pair consists of one resource from Group 1 and one resource from Group 2. The same resource can be associated with two Resource Pairs in frequency range 1 but not in frequency range 2.

Except for L1-SINR, if interference measurement is performed on NZP CSI-RS, a UE does not expect to be configured with more than one NZP CSI-RS resource in the associated resource set within the resource setting for channel measurement. Except for L1-SINR, the UE configured with the higher layer parameter nzp-CSI-RS-ResourcesForInterference may expect no more than 18 NZP CSI-RS ports configured in a NZP CSI-RS resource set.

For CSI measurement(s) other than L1-SINR, a UE assumes:
  each NZP CSI-RS port configured for interference measurement corresponds to an interference transmission layer.
  all interference transmission layers on NZP CSI-RS ports for interference measurement take into account the associated EPRE ratios configured in 5.2.2.3.1;
  other interference signal on REs of NZP CSI-RS resource for channel measurement, NZP CSI-RS resource for interference measurement, or CSI-IM resource for interference measurement.

For L1-SINR measurement with dedicated interference measurement resources, a UE assumes:
  the total received power on dedicated NZP CSI-RS resource for interference measurement or dedicated CSI-IM resource for interference measurement corresponds to interference and noise.

5.2.1.4.2 Report Quantity Configurations

A UE may be configured with a CSI-ReportConfig with the higher layer parameter reportQuantity set to either 'none', 'cri-RI-PMI-CQI', 'cri-RI-i1', 'cri-RI-i1-CQI', 'cri-RI-CQI', 'cri-RSRP', 'cri-SINR', 'ssb-Index-RSRP', 'ssb-Index-SINR', 'cri-RI-L1-PMI-CQI', 'cri-RSRP-Index', 'ssb-Index-RSRP-Index', 'cri-SINR-Index' or 'ssb-Index-SINR-Index'.

If the UE is configured with a CSI-ReportConfig with the higher layer parameter reportQuantity set to 'none', then the UE shall not report any quantity for the CSI-ReportConfig.

If the UE is configured with a CSI-ReportConfig with the higher layer parameter reportQuantity set to 'cri-RI-PMI-CQI', or 'cri-RI-LI-PMI-CQI', the UE shall report a preferred precoder matrix for the entire reporting band, or a preferred precoder matrix per subband, according to Clause 5.2.2.2.

If the UE is configured with a CSI-ReportConfig with the higher layer parameter reportQuantity set to 'cri-RI-i1',
  the UE expects, for that CSI-ReportConfig, to be configured with higher layer parameter codebookType set to 'typeI-SinglePanel' and pmi-FormatIndicator set to 'widebandPMI' and,
  the UE shall report a PMI consisting of a single wideband indication (i, in Clause 5.2.2.2.1) for the entire CSI reporting band.

If the UE is configured with a CSI-ReportConfig with the higher layer parameter reportQuantity set to 'cri-RI-i1-CQI',
  the UE expects, for that CSI-ReportConfig, to be configured with higher layer parameter codebookType set to 'typeI-SinglePanel' and pmi-FormatIndicator set to 'widebandPMI' and,
  the UE shall report a PMI consisting of a single wideband indication ($i_1$ in Clause 5.2.2.2.1) for the entire CSI reporting band. The CQI is calculated conditioned on the reported $i_1$ assuming PDSCH transmission with $N_p \geq 1$ precoders (corresponding to the same $i_1$ but different $i_2$ in Clause 5.2.2.2.1), where the UE assumes that one precoder is randomly selected from the set of $N_p$ precoders for each PRG on PDSCH, where the PRG size for CQI calculation is configured by the higher layer parameter pdsch-BundleSizeForCSI.

If the UE is configured with a CSI-ReportConfig with the higher layer parameter reportQuantity set to 'cri-RI-CQI',
- if the UE is configured with higher layer parameter non-PMI-PortIndication contained in a CSI-Report-Config, r ports are indicated in the order of layer ordering for rank r and each CSI-RS resource in the CSI resource setting is linked to the CSI-ReportConfig based on the order of the associated NZP-CSI-RS-ResourceId in the linked CSI resource setting for channel measurement given by higher layer parameter resourcesForChannelMeasurement. The configured higher layer parameter non-PMI-PortIndication contains a sequence $p_0^{(1)}$, $p_0^{(2)}$, $p_1^{(2)}$, $p_0^{(3)}$, $p_1^{(3)}$, $p_2^{(3)}$, ..., $p_0^{(R)}$, $p_1^{(R)}$, ..., $p_{R-1}^{(R)}$ of port indices, where $p_0^{(v)}$, ..., $p_{v-1}^{(v)}$ are the CSI-RS port indices associated with rank v and $R \in \{1, 2, ..., P\}$ where $P \in \{1,2,4,8\}$ is the number of ports in the CSI-RS resource. The UE shall only report RI corresponding to the configured fields of PortIndexFor8Ranks.
- if the UE is not configured with higher layer parameter non-PMI-PortIndication, the UE assumes, for each CSI-RS resource in the CSI resource setting linked to the CSI-ReportConfig, that the CSI-RS port indices $p_0^{(v)}, ..., p_{v-1}^{(v)} = \{0, ..., v-1\}$ are associated with ranks v=1, 2, ..., P where $P \in \{1,2,4,8\}$ is the number of ports in the CSI-RS resource.
- When calculating the CQI for a rank, the UE shall use the ports indicated for that rank for the selected CSI-RS resource. The precoder for the indicated ports shall be assumed to be the identity matrix scaled by $1/\sqrt{v}$.

If the UE is configured with a CSI-ReportConfig with the higher layer parameter reportQuantity set to 'cri-RSRP', 'ssb-Index-RSRP', 'cri-RSRP-Index' or 'ssb-Index-RSRP-Index',
- if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer configured) different CRI or SSBRI for each report setting.
- if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.
- if the UE is configured with the higher layer parameter groupBasedBeamReporting-r17, the UE is not required to update measurements for more than 64 CSI-RS and/or SSB resources, and the UE shall report in a single reporting instance nrofReportedGroups, if configured, group(s) of two CRIs or SSBRIs selecting one CSI-RS or SSB from each of the two CSI Resource Sets for the report setting, where CSI-RS and/or SSB resources of each group can be received simultaneously by the UE.

If the UE is configured with a CSI-ReportConfig with the higher layer parameter reportQuantity set to 'cri-SINR', 'ssb-Index-SINR', 'cri-SINR-Index' or 'ssb-Index-SINR-Index',
- if the UE is configured with the higher layer parameter groupBasedBeamReporting set to 'disabled', the UE shall report in a single report nrofReportedRS (higher layer configured) different CRI or SSBRI for each report setting.
- if the UE is configured with the higher layer parameter groupBasedBeamReporting set to 'enabled', the UE shall report in a single reporting instance two different CRI or SSBRI for each report setting, where CSI-RS and/or SSB resources can be received simultaneously by the UE.

If the UE is configured with a CSI-ReportConfig with the higher layer parameter reportQuantity set to 'cri-RSRP', 'cri-RI-PMI-CQI', 'cri-RI-i1', 'cri-RI-i1-CQI', 'cri-RI-CQI', 'cri-RI-LI-PMI-CQI', 'cri-SINR', or 'cri-SINR-Index', and $K_s > 1$ resources are configured in the corresponding resource set for channel measurement, then the UE shall derive the CSI parameters other than CRI conditioned on the reported CRI, where CRI k ($k \geq 0$) corresponds to the configured (k+1)-th entry of associated nzp-CSI-RS-Resources in the corresponding NZP-CSI-RS-ResourceSet for channel measurement, and (k+1)-th entry of associated csi-IM-Resource in the corresponding csi-IM-ResourceSet (if configured) or (k+1)-th entry of associated nzp-CSI-RS-Resources in the corresponding NZP-CSI-RS-ResourceSet (if configured for CSI-ReportConfig with reportQuantity set to 'cri-SINR' or 'cri-SINR-Index') for interference measurement. If $K_S = 2$ CSI-RS resources are configured, each resource shall contain at most 16 CSI-RS ports. If $2 < K_S \leq 8$ CSI-RS resources are configured, each resource shall contain at most 8 CSI-RS ports.

If the UE is configured with a CSI-ReportConfig with the higher layer parameter reportQuantity set to 'cri-RI-PMI-CQI', or 'cri-RI-LI-PMI-CQI' and the corresponding NZP-CSI-RS-ResourceSet for channel measurement is configured with $K_S \geq 2$ resources, two Resource Groups with $K_1 \geq 1$ resources in Group 1, $K_2 \geq 1$ resources in Group 2, $K_1 + K_2 = K_s$, and N Resource Pairs:
- each resource can contain, subject to UE capability, at most 32 CSI-RS ports. For two Resource Groups with $K_i$ resources (i=1, 2), if $\max\{K_1, K_2\}=1$, the resource in NZP-CSI-RS-ResourceSet shall contain at most 32 CSI-RS ports; if $\max\{K_1, K_2\}=2$, each resource in NZP-CSI-RS-ResourceSet shall contain at most 16 CSI-RS ports; if $2 < \max\{K_1, K_2\} \leq 8$, each resource in NZP-CSI-RS-ResourceSet shall contain at most 8 CSI-RS ports.
- each of the N Resource Pairs is associated to a CRI value.
- The CSI-ReportConfig may be configured with higher layer parameter sharedCMR. $M_1$ and $M_2$ are the numbers of resources associated to a CRI value, other than the N CRIs defined above, in Group 1 and Group 2, respectively, with $M=M_1+M_2$, such that the total number of CRI values configured for the CSI-ReportConfig is M+N.
  - If the higher layer parameter csi-ReportMode is set to 'Mode1' and the higher layer parameter numberOfSingleTRP-CSI-Mode1 is set to $X \in \{0\}$, $M_1 = M_2 = 0$; otherwise,
  - if the higher layer parameter csi-ReportMode is set to 'Mode1' and the higher layer parameter numberOfSingleTRP-CSI-Mode1 is set to $X \in \{1,2\}$, or if csi-ReportMode is set to 'Mode2',
    - if sharedCMR is configured: $M_1 = K_1$ and $M_2 = K_2$; otherwise
    - if sharedCMR is not configured, only the resources in Group 1 and Group 2 that are not referred to in any Resource Pair are associated to M CRI values other than the N CRIs defined above.

If interference measurement is performed on CSI-IM, M+N resources are configured in the corresponding csi-IM-ResourceSet. The M resources for channel measurement defined above are resource-wise associated with the first M CSI-IM resources by the ordering of the CSI-RS resources and CSI-IM resources in the corresponding Resource Set. The N Resource Pairs for channel measurement are associated to the last N CSI-IM resources by the ordering of the CSI-RS Resource Pairs and CSI-IM resources in the CSI-IM Resource Set. The UE may assume that the two CSI-RS resources for channel measurement in a Resource Pair and the associated CSI-IM resource for interference measurement are resource-wise QCLed with respect to 'typeD'.

The UE is not expected to be configured with NZP CSI-RS for interference measurement other than the NZP CSI-RS resources for channel measurement configured in the N Resource Pairs.

The UE expects, for that CSI-ReportConfig, to be configured with higher layer parameter codebookType set to 'typeI-SinglePanel', and The UE shall derive the CSI parameters other than CRI(s) conditioned on the reported CRI(s), as follows:

If the higher layer parameter csi-ReportMode is set to 'Mode1' and the higher layer parameter numberOfSingleTRP-CSI-Mode1 is set to $X \in \{0,1,2\}$, X+1 CRI(s) are reported:

one CRI $k_1$ ($k_1 \geq 0$) corresponds to the configured ($k_1+1$)-th entry of the associated N Resource Pairs in the corresponding CSI-RS Resource Set for channel measurement, and ($M+k_1+1$)-th entry of the corresponding CSI-IM Resource Set, if configured. The UE shall report two RIs, two PMIs, two LIs (if configured), associated to the resource in Group 1 and the resource in Group 2, respectively, of the ($k_1+1$)-th Resource Pair, and one CQI; and if X=1, one CRI $k_2$ ($k_2 \geq 0$) corresponds to the configured ($k_2+1$)-th entry of the associated M resources in the corresponding CSI-RS Resource Set for channel measurement, and ($k_2+1$)-th entry of the corresponding CSI-IM Resource Set, if configured. The UE shall report one RI, one PMI, one LI (if configured) and one or two CQIs conditioned on CRI $k_2$; or if X=2, one CRI $k_2$ ($k_2 \geq 0$) corresponds to the configured ($k_2+1$)-th entry of the associated $M_1$ resources in Group 1 of the corresponding CSI-RS Resource Set for channel measurement, and ($k_2+1$)-th entry of the associated resources in the corresponding CSI-IM Resource Set, if configured, and one CRI $k_3$ ($k_3 \geq 0$) corresponds to the configured ($k_3+1$)-th entry of the associated $M_2$ resources in Group 2 of the corresponding CSI-RS Resource Set for channel measurement, and ($M_1+k_3+1$)-th entry of the corresponding CSI-IM Resource Set, if configured. The UE shall report one RI, one PMI, one LI (if configured) and one or two CQIs conditioned on CRI $k_2$ and one RI, one PMI, one LI (if configured) and one or two CQIs conditioned on CRI $k_3$.

If the higher layer parameter csi-ReportMode is set to 'Mode2', one CRI $k_1$ ($k_1 \geq 0$) is reported, which corresponds to the ($k_1+1$)-th entry of the M+N resources or Resource Pairs in the corresponding CSI-RS Resource Set for channel measurement, and ($k_1+1$)-th entry of the associated resources in the corresponding CSI-IM Resource Set, if configured. The first M codepoints of the CRI correspond to resources associated to Group 1 and Group 2. The last N codepoints of the CRI correspond to the N configured Resource Pairs. The UE shall report one RI, one PMI, one LI, if configured, and one or two CQIs conditioned on CRI $k_1$ if $k_1<M$; or two RIs, two PMIs, two LIs, if configured, associated to the resource in Group 1 and the resource in Group 2, respectively, of the ($k_1-M+1$)-th Resource Pair, and one CQI, otherwise.

For a reported CRI corresponding to an entry of the N Resource Pairs configured in the corresponding CSI-RS Resource Set for channel measurement:

the UE shall not report a total number of layers larger than four.

the two RIs are reported with a joint RI index corresponding to one of the four rank combinations: {1,1}, {1,2}, {2,1}, {2,2}.

The CodebookConfig in CSI-ReportConfig can be configured with two RI restriction parameters. One parameter applies to a reported RI when conditioned on a CRI corresponding to an entry of the M CSI-RS resources defined above. Another parameter applies to a reported joint RI index when conditioned on a CRI corresponding to an entry of the N Resource Pairs and indicates one or more of the four rank combinations that are allowed to correspond to the reported PMIs and RIs.

The CodebookConfig in CSI-ReportConfig can be configured with two Codebook Subset Restrictions. The first restriction applies to a reported PMI associated to a CSI-RS resource in Group 1. The second restriction applies to a reported PMI associated to a CSI-RS resource in Group 2.

If the UE is configured with a CSI-ReportConfig with the higher layer parameter reportQuantity set to 'ssb-Index-RSRP' or 'ssb-Index-RSRP-Index', the UE shall report SSBRI, where SSBRI k ($k \geq 0$) corresponds to the configured (k+1)-th entry of the associated csi-SSB-ResourceList in the corresponding CSI-SSB-ResourceSet.

If the UE is configured with a CSI-ReportConfig with the higher layer parameter reportQuantity set to 'ssb-Index-SINR' or 'ssb-Index-SINR-Index', the UE shall derive L1-SINR conditioned on the reported SSBRI, where SSBRI k ($k \geq 0$) corresponds to the configured (k+1)-th entry of the associated csi-SSB-ResourceList in the corresponding CSI-SSB-ResourceSet for channel measurement, and (k+1)-th entry of associated csi-IM-Resource in the corresponding csi-IM-ResourceSet (if configured) or (k+1)-th entry of associated nzp-CSI-RS-Resources in the corresponding NZP-CSI-RS-ResourceSet (if configured) for interference measurement.

If the UE is configured with a CSI-ReportConfig with the higher layer parameter reportQuantity set to 'cri-RI-PMI-CQI', ' cri-RI-i1', 'cri-RI-i1-CQI', 'cri-RI-CQI' or 'cri-RI-LI-PMI-CQI', then the UE is not expected to be configured with more than 8 CSI-RS resources in a CSI-RS resource set contained within a resource setting that is linked to the CSI-ReportConfig.

If the UE is configured with a CSI-ReportConfig with the higher layer parameter reportQuantity set to 'cri-RI-LI-PMI-CQI', UE does not expect the CSI-ReportConfig to be configured with higher layer parameter codebookType set to 'typeII-r16' or 'typeII-PortSelection-r16' or 'typeII-PortSelection-r17'.

If the UE is configured with a CSI-ReportConfig with higher layer parameter reportQuantity set to 'cri-RSRP', 'cri-SINR', 'none', 'cri-RSRP-Index' or 'cri-SINR-Index and the CSI-ReportConfig is linked to a resource setting configured with the higher layer parameter resourceType set to 'aperiodic', then the UE is not expected to be configured with more than 16 CSI-RS resources in a CSI-RS resource set contained within the resource setting.

The LI indicates which column of the precoder matrix of the reported PMI corresponds to the strongest layer of the codeword corresponding to the largest reported wideband CQI. If two wideband CQIs are reported and have equal value, the LI corresponds to strongest layer of the first codeword. If the UE is configured with a CSI-ReportConfig with reportQuantity set to 'cri-RI-LI-PMI-CQI' and the corresponding NZP-CSI-RS-ResourceSet for channel measurement is configured with two Resource Groups and N Resource Pairs, and the UE reports a CRI associated to a Resource Pair, and a rank combination $\{v_1, v_2\}$, the first LI indicates which column of the precoder matrix of the first reported PMI corresponds to the strongest of the first $v_1$ layers of the codeword and the second LI indicates which column of the precoder matrix of the second reported PMI corresponds to the strongest of the last $v_2$ layers of the codeword.

. . .

5.2.1.4.3 L1-RSRP Reporting

For L1-RSRP Computation the UE may be configured with CSI-RS resources, SS/PBCH Block resources or both CSI-RS and SS/PBCH block resources, when resource-wise quasi co-located with 'type C' and 'typeD' when applicable.

the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', or if the higher layer parameter groupBasedBeamReporting-r17 is configured, the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

When the higher layer parameter groupBasedBeamReporting-r17 in CSI-ReportConfig is configured, the UE shall indicate the CSI Resource Set associated with the largest measured value of L1-RSRP, and for each group, CRI or SSBRI of the indicated CSI Resource Set is present first.

If the higher layer parameter timeRestrictionForChannelMeasurements in CSI-ReportConfig is set to "notConfigured", the UE shall derive the channel measurements for computing L1-RSRP value reported in uplink slot n based on only the SS/PBCH or NZP CSI-RS, no later than the CSI reference resource, (defined in TS 38.211[4]) associated with the CSI resource setting.

If the higher layer parameter timeRestrictionForChannelMeasurements in CSI-ReportConfig is set to "Configured", the UE shall derive the channel measurements for computing L1-RSRP reported in uplink slot n based on only the most recent, no later than the CSI reference resource, occasion of SS/PBCH or NZP CSI-RS (defined in [4, TS 38.211]) associated with the CSI resource setting.

When the UE is configured with SSB-MTC-AddtionalPCI, a CSI-SSB-ResourceSet configured for L1-RSRP reporting includes one set of SSB indices and one set of PCI indices, where each SSB index is associated with a PCI index.

When the UE is configured with a CSI-ReportConfig with the higher layer parameter reportQuantity set to 'cri-RSRP-Index' or 'ssb-Index-RSRP-Index' an index of UE capability value set, indicating the maximum supported number of SRS antenna ports, is reported along with the pair of SSBRI/CRI and L1-RSRP.

5.2.1.4.4 L1-SINR Reporting

For L1-SINR computation, for channel measurement the UE may be configured with NZP CSI-RS resources and/or SS/PBCH Block resources, for interference measurement the UE may be configured with NZP CSI-RS or CSI-IM resources.

for channel measurement, the UE may be configured with CSI-RS resource setting with up to 16 resource sets, with a total of up to 64 CSI-RS resources or up to 64 SS/PBCH Block resources.

For L1-SINR reporting, if the higher layer parameter nrofReportedRS in CSI-ReportConfig is configured to be one, the reported L1-SINR value is defined by a 7-bit value in the range [−23, 40] dB with 0.5 dB step size, and if the higher layer parameter nrofReportedRS is configured to be larger than one, or if the higher layer parameter groupBasedBeamReporting is configured as 'enabled', the UE shall use differential L1-SINR based reporting, where the largest measured value of L1-SINR is quantized to a 7-bit value in the range [−23, 40] dB with 0.5 dB step size, and the differential L1-SINR is quantized to a 4-bit value. The differential L1-SINR is computed with 1 dB step size with a reference to the largest measured L1-SINR value which is part of the same L1-SINR reporting instance. When NZP CSI-RS is configured for channel measurement and/or interference measurement, the reported L1-SINR values should not be compensated by the power offset(s) given by higher layer parameter powerControOffsetSS or powerControlOffset.

When one or two resource settings are configured for L1-SINR measurement

If the higher layer parameter timeRestrictionForChannelMeasurements in CSI-ReportConfig is set to 'notConfigured', the UE shall derive the channel measurements for computing L1-SINR reported in uplink slot n based on only the SSB or NZP CSI-RS, no later than the CSI reference resource, (defined in TS 38.211[4]) associated with the CSI resource setting.

If the higher layer parameter timeRestrictionForChannelMeasurements in CSI-ReportConfig is set to 'configured', the UE shall derive the channel measurements for computing L1-SINR reported in uplink slot n based on only the most recent, no later than the CSI reference resource, occasion of SSB or NZP CSI-RS (defined in [4, TS 38.211]) associated with the CSI resource setting.

If the higher layer parameter timeRestrictionForInterferenceMeasurements in CSI-ReportConfig is set to 'not- Configured', the UE shall derive the interference measurements for computing L1-SINR reported in uplink slot n based on only the CSI-IM or NZP CSI-RS for interference measurement (defined in [4, TS 38.211]) or NZP CSI-RS for channel and interference measurement no later than the CSI reference resource associated with the CSI resource setting.

If the higher layer parameter timeRestrictionForInterferenceMeasurements in CSI-ReportConfig is set to 'configured', the UE shall derive the interference measurements for computing the L1-SINR reported in uplink slot n based on the most recent, no later than the CSI reference resource, occasion of CSI-IM or NZP CSI-RS for interference measurement (defined in [4, TS 38.211]) or NZP CSI-RS for channel and interference measurement associated with the CSI resource setting.

When the UE is configured a CSI-ReportConfig with the higher layer parameter reportQuantity set to 'cri-SINR-Index' or 'ssb-Index-SINR-Index' an index of UE capability value, indicating the maximum supported number of SRS antenna ports, is reported along with the pair of SSBRI/CRI and L1-SINR.

5.2.1.5 Triggering/Activation of CSI Reports and CSI-RS 5.2.1.5.1 Aperiodic CSI Reporting/Aperiodic CSI-RS when the Triggering PDCCH and the CSI-RS have the Same Numerology For CSI-RS resource sets associated with Resource Settings configured with the higher layer parameter resourceType set to 'aperiodic', 'periodic', or 'semi-persistent', trigger states for Reporting Setting(s) (configured with the higher layer parameter reportConfig Type set to 'aperiodic') and/or Resource Setting for channel and/or interference measurement on one or more component carriers are configured using the higher layer parameter CSI-AperiodicTriggerStateList. For aperiodic CSI report triggering, a single set of CSI triggering states are higher layer configured, wherein the CSI triggering states can be associated with any candidate DL BWP. A UE is not expected to receive more than one DCI with non-zero CSI request field per slot per cell. A UE is not expected to receive DCI with non-zero CSI request field within a cell group in a slot overlapping with any slot receiving DCI with non-zero CSI request field in the same cell group. A UE is not expected to be configured with different TCI-StateId's for the same aperiodic CSI-RS resource ID configured in multiple aperiodic CSI-RS resource sets with the same triggering offset in the same aperiodic trigger state. A UE is not expected to receive more than one aperiodic CSI report request for transmission in a given slot per cell. A UE is not expected to receive an aperiodic CSI report request for transmission in a slot overlapping with any slot having an aperiodic CSI report transmission in the same cell group. If a UE does not indicate its capability of CSItriggerStateContainingNonactiveBWP the UE is not expected to be triggered with a CSI report for a non-active DL BWP. Otherwise, when a UE is triggered with a CSI report for a DL BWP that is non-active when expecting to receive the most recent occasion, no later than the CSI reference resource, of the associated NZP CSI-RS, the UE is not expected to report the CSI for the non-active DL BWP and the CSI report associated with that BWP is omitted. When a UE is triggered with aperiodic NZP CSI-RS in a DL BWP that is non-active when expecting to receive the NZP CSI-RS, the UE is not expected to measure the aperiodic CSI-RS. In the carrier of the serving cell expecting to receive that associated NZP CSI-RS, if the active DL BWP when receiving the NZP CSI-RS is different from the active DL BWP when receiving the triggering DCI, the last symbol of the PDCCH span of the DCI carrying the BWP switching shall be no later than the last symbol of the PDCCH span of the DCI carrying the CSI trigger, irrespective of whether they are in the same carrier of a serving cell or not and irrespective of whether they are in the same SCS or not;

the UE is not expected to have any other BWP switching in that carrier after the last symbol of the PDCCH span covering the DCI carrying the CSI trigger and before the first symbol of the triggered NZP CSI-RS or CSI-IM.

when the PDCCH reception includes two PDCCH candidates from two respective search space sets, as described in clause 10.1 of [6, TS 38.213], the span that involves the PDCCH candidate that ends later in time is used.

A trigger state is initiated using the CSI request field in DCI.
When all the bits of CSI request field in DCI are set to zero, no CSI is requested.

When the number of configured CSI triggering states in CSI-AperiodicTriggerStateList is greater than $2^{N_{TS}}-1$, where $N_{TS}$ is the number of bits in the DCI CSI request field, the UE receives a subselection indication, as described in clause 6.1.3.13 of [10, TS 38.321], used to map up to $2^{N_{TS}}-1$ trigger states to the codepoints of the CSI request field in DCI. $N_{TS}$ is configured by the higher layer parameter reportTriggerSize where $N_{TS} \in \{0,1,2,3,4,5,6\}$. When the UE would transmit a PUCCH with HARQ-ACK information in slot n corresponding to the PDSCH carrying the subselection indication, the corresponding action in [10, TS 38.321] and UE assumption on the mapping of the selected CSI trigger state(s) to the codepoint(s) of DCI CSI request field shall be applied starting from the first slot that is after slot $$n + 3N_{slot}^{subframe,\mu} + \frac{2^\mu}{2^{\mu_{K_{mac}}}} \cdot k_{mac}$$

where μ is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided.

When the number of CSI triggering states in CSI-AperiodicTriggerStateList is less than or equal to $2^{N_{TS}}-1$, the CSI request field in DCI directly indicates the triggering state.

For each aperiodic CSI-RS resource in a CSI-RS resource set associated with each CSI triggering state, the UE is indicated the quasi co-location configuration of quasi co-location RS source(s) and quasi co-location type(s), as described in clause 5.1.5, through higher layer signaling of qcl-info which contains a list of references to TCI-State's for the aperiodic CSI-RS resources associated with the CSI triggering state. If a State referred to in the list is configured with a reference to an RS configured with qcl-Type set to 'typeD', that RS may be an SS/PBCH block located in the same or different CC/DL BWP or a CSI-RS resource configured as periodic or semi-persistent located in the same or different CC/DL BWP.

If the scheduling offset between the last symbol of the PDCCH carrying the triggering DCI and the first symbol of the aperiodic CSI-RS resources in a NZP-CSI-RS-ResourceSet configured without higher layer parameter trs-Info is smaller than the UE reported threshold beamSwitchTiming, as defined in [13, TS 38.306], when the reported value is one of the values of $\{14, 28, 48\} \cdot 2^{max(0,\mu_{CSIRS}-3)}$ and enableBeamSwitchTiming is not provided, or is smaller than $48 \cdot 2^{max(0,\mu_{CSIRS}-3)}$ when the UE provides beamSwitchTiming-r16, enableBeamSwitchTiming is provided and the NZP-CSI-RS-ResourceSet is configured with the higher layer parameter repetition set to 'off' or configured without the higher layer parameter repetition, or is smaller than the UE reported threshold beamSwitchTiming-r16, when enableBeamSwitchTiming is provided and the NZP-CSI-RS-ResourceSet is configured with the higher layer parameter repetition set to 'on'.

...

If configured, the UE may assume that a CSI-RS resource in an aperiodic CSI-RS resource set configured without trs-Info is quasi co-located with the RS(s) in the indicated TCI state.

A non-zero codepoint of the CSI request field in the DCI is mapped to a CSI triggering state according to the order of the associated positions of the up to $2^{N_{TS}}-1$ trigger states in CSI-AperiodicTriggerStateList with codepoint '1' mapped to the triggering state in the first position.

For a UE configured with the higher layer parameter CSI-AperiodicTriggerStateList, if a Resource Setting linked to a CSI-ReportConfig has multiple aperiodic resource sets, only one of the aperiodic CSI-RS resource sets from the Resource Setting is associated with the trigger state, and the UE is higher layer configured per trigger state per Resource Setting to select the one CSI-IM/NZP CSI-RS resource set from the Resource Setting.

When aperiodic CSI-RS is used with aperiodic reporting, the CSI-RS offset is configured per resource set by the higher layer parameter aperiodicTriggeringOffset or aperiodicTriggeringOffset-r16 or aperiodicTriggeringOffset-r17. The CSI-RS triggering offset has the values of $\{0, 1, 2, 3, 4, 5, 6, \ldots, 15, 16, 24\}$ slots for $\mu_{CSIRS} \leq 3$ or $\{0, 4, 8, 12, \ldots, 60, 64, 96\}$ slots for $\mu_{CSIRS}=5$ and $\mu_{CSIRS}=6$, where $\mu_{CSIRS}$ is the subcarrier spacing configurations for CSI-RS. If the UE is not configured with minimumSchedulingOffsetK0 for any DL BWP and minimumSchedulingOffsetK2 for any UL BWP and if all the associated trigger states do not have the higher layer parameter qcl-Type set to 'typeD' in the corresponding TCI states, the CSI-RS triggering offset is fixed to zero. The aperiodic triggering offset of the CSI-IM follows offset of the associated NZP CSI-RS for channel measurement. The aperiodic CSI-RS is transmitted in a slot $$K_s, K_S = n + X + \left\lfloor \left( \frac{N^{CA}_{slot,offset,PDCCH}}{2^{\mu_{offset,PDCCH}}} - \frac{N^{CA}_{slot,offset,CSIRS}}{2^{\mu_{offset,CSIRS}}} \right) \cdot 2^{\mu_{CSIRS}} \right\rfloor,$$

if UE is configured with ca-SlotOffset for at least one of the triggered and triggering cell, and in slot $K_s=n+X$, otherwise, and where n is the slot containing the triggering DCI, X is the CSI-RS triggering offset according to the higher layer parameter aperiodicTriggeringOffset or aperiodicTriggeringOffset-r16 or aperiodicTriggeringOffset-r17, $N_{slot, offset, PDCCH}^{CA}$ and $\mu_{offset,PDCCH}$ are the $N_{slot, offset}^{CA}$ and the $\mu_{offset}$ which are determined by higher-layer configured ca-SlotOffset for the cell receiving the PDCCH, $N_{slot, offset, CSIRS}^{CA}$ and $\mu_{offset,CSIRS}$ are the $N_{slot, offset}^{CA}$ and the $\mu_{offset}$ which are determined by higher-layer configured ca-SlotOffset for the cell transmitting the CSI-RS respectively, as defined in [4, TS 38.211] clause 4.5.

...

5.2.1.5.2 Semi-Persistent CSI/Semi-Persistent CSI-RS

For semi-persistent reporting on PUSCH, a set of trigger states are higher layer configured by CSI-SemiPersistentOnPUSCH-TriggerStateList, where the CSI request field in DCI scrambled with SP-CSI-RNTI activates one of the trigger states. A UE is not expected to receive a DCI scrambled with SP-CSI-RNTI activating one semi-persistent CSI report with the same CSI-ReportConfigId as in a semi-persistent CSI report which is activated by a previously received DCI scrambled with SP-CSI-RNTI.

For semi-persistent reporting on PUCCH, the PUCCH resource used for transmitting the CSI report are configured by reportConfigType. Semi-persistent reporting on PUCCH is activated by an activation command as described in clause 6.1.3.16 of [10, TS 38.321], which selects one of the semi-persistent Reporting Settings for use by the UE on the PUCCH. When the UE would transmit a PUCCH with HARQ-ACK information in slot n corresponding to the PDSCH carrying the activation command, the indicated semi-persistent Reporting Setting should be applied starting from the first slot that is after slot $n+3N_{slot}^{subframe,\mu}$ where $\mu$ is the SCS configuration for the PUCCH.

...

If the UE has an active semi-persistent CSI-RS/CSI-IM resource configuration, or an active semi-persistent ZP CSI-RS resource set configuration, and has not received a deactivation command, the activated semi-persistent CSI-RS/CSI-IM resource set or the activated semi-persistent ZP CSI-RS resource set configurations are considered to be active when the corresponding DL BWP is active, otherwise they are considered suspended.

If the UE is configured with carrier deactivation, the following configurations in the carrier in activated state would also be deactivated and need re-activation configuration(s): semi-persistent CSI-RS/CSI-IM resource, semi-persistent CSI reporting on PUCCH, semi-persistent SRS, semi-persistent ZP CSI-RS resource set.

5.2.2 Channel State Information 5.2.2.1 Channel Quality Indicator (CQI)

The CQI indices and their interpretations are given in Table 5.2.2.1-2 or Table 5.2.2.1-4 for reporting CQI based on QPSK, 16QAM and 64QAM. The CQI indices and their interpretations are given in Table 5.2.2.1-3 for reporting CQI based on QPSK, 16QAM, 64QAM and 256QAM. The CQI indices and their interpretations are given in Table 5.2.2.1-5 for reporting CQI based on QPSK, 16QAM, 64QAM, 256QAM and 1024 QAM.

Based on an unrestricted observation interval in time unless specified otherwise in this Clause, and an unrestricted observation interval in frequency, the UE shall derive for each CQI value reported in uplink slot n the highest CQI index which satisfies the following condition:

A single PDSCH transport block with a combination of modulation scheme, target code rate and transport block size corresponding to the CQI index, and occupying a group of downlink physical resource blocks termed the CSI reference resource, could be received with a transport block error probability not exceeding:
0.1, if the higher layer parameter cqi-Table in CSI-ReportConfig configures 'table' (corresponding to Table 5.2.2.1-2), or 'table2' (corresponding to Table 5.2.2.1-3), or if the higher layer parameter cqi-Table in CSI-ReportConfig configures 'table4-r17' (corresponding to Table 5.2.2.1-5), or 0.00001, if the higher layer parameter cqi-Table in CSI-ReportConfig configures 'table3' (corresponding to Table 5.2.2.1-4).

If the higher layer parameter timeRestrictionForChannelMeasurements is set to "notConfigured", the UE shall derive the channel measurements for computing CSI value reported in uplink slot n based on only the NZP CSI-RS, no later than the CSI reference resource, (defined in TS 38.211 [4]) associated with the CSI resource setting.

If the higher layer parameter timeRestrictionForChannelMeasurements in CSI-ReportConfig is set to "Configured", the UE shall derive the channel measurements for computing CSI reported in uplink slot n based on only the most recent, no later than the CSI reference resource, occasion of NZP CSI-RS (defined in [4, TS 38.211]) associated with the CSI resource setting.

If the higher layer parameter timeRestrictionForInterferenceMeasurements is set to "notConfigured", the UE shall derive the interference measurements for computing CSI value reported in uplink slot n based on only the CSI-IM and/or NZP CSI-RS for interference measurement no later than the CSI reference resource associated with the CSI resource setting.

If the higher layer parameter timeRestrictionForInterferenceMeasurements in CSI-ReportConfig is set to "Configured", the UE shall derive the interference measurements for computing the CSI value reported in uplink slot n based on the most recent, no later than the CSI reference resource, occasion of CSI-IM and/or NZP CSI-RS for interference measurement (defined in [4, TS 38.211]) associated with the CSI resource setting.

If the higher layer parameter cqi-BitsPerSubband in CSI-ReportConfig is not configured, for each sub-band index s, a 2-bit sub-band differential CQI is defined as:

Sub-band Offset level($s$)=sub-band CQI index($s$)−wideband CQI index.

The mapping from the 2-bit sub-band differential CQI values to the offset level is shown in Table 5.2.2.1-1

. . .

If the higher layer parameter cqi-BitsPerSubband in CSI-ReportConfig is configured, for each sub-band index s, a 4-bit sub-band CQI is reported. The 4-bit sub-band CQI for each sub-band s is a CQI index in Table 5.2.2.1-2, Table 5.2.2.1-3, or Table 5.2.2.1-4 as configured by the higher layer parameter cqi-Table in CSI-ReportConfig.

A combination of modulation scheme and transport block size corresponds to a CQI index if:
- the combination could be signaled for transmission on the PDSCH in the CSI reference resource according to the Transport Block Size determination described in Clause 5.1.3.2, and
- the modulation scheme is indicated by the CQI index, and
- the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes is relevant.

. . .

5.2.2.3 Reference Signal (CSI-RS)

5.2.2.3.1 NZP CSI-RS

The UE can be configured with one or more NZP CSI-RS resource set configuration(s) as indicated by the higher layer parameters CSI-ResourceConfig, and NZP-CSI-RS-ResourceSet. Each NZP CSI-RS resource set consists of $K \geq 1$ NZP CSI-RS resource(s).

The following parameters for which the UE shall assume non-zero transmission power for CSI-RS resource are configured via the higher layer parameter NZP-CSI-RS-Resource, CSI-ResourceConfig and NZP-CSI-RS-ResourceSet for each CSI-RS resource configuration:

- nzp-CSI-RS-ResourceId determines CSI-RS resource configuration identity.
- periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources.
- resourceMapping defines the number of ports, CDM-type, and OFDM symbol and subcarrier occupancy of the CSI-RS resource within a slot that are given in Clause 7.4.1.5 of [4, TS 38.211].
- nrofPorts in resourceMapping defines the number of CSI-RS ports, where the allowable values are given in Clause 7.4.1.5 of [4, TS 38.211].
- density in resourceMapping defines CSI-RS frequency density of each CSI-RS port per PRB, and CSI-RS PRB offset in case of the density value of 1/2, where the allowable values are given in Clause 7.4.1.5 of [4, TS 38.211]. For density 1/2, the odd/even PRB allocation indicated in density is with respect to the common resource block grid.
- cdm-Type in resourceMapping defines CDM values and pattern, where the allowable values are given in Clause 7.4.1.5 of [4, TS 38.211].
- powerControlOffset: which is the assumed ratio of PDSCH EPRE to NZP CSI-RS EPRE when UE derives CSI feedback and takes values in the range of [−8, 15] dB with 1 dB step size. For CQI calculation based on a pair of NZP CSI-RS resources, powerControlOffset of each NZP CSI-RS resource in the pair of NZP CSI-RS resources for channel measurement is the assumed ratio of EPRE when UE derives CSI feedback and takes values in the range of [−8, 15] dB with 1 dB step size.
- powerControlOffsetSS: which is the assumed ratio of NZP CSI-RS EPRE to SS/PBCH block EPRE.
- scramblingID defines scrambling ID of CSI-RS with length of 10 bits.
- BWP-Id in CSI-ResourceConfig defines which bandwidth part the configured CSI-RS is located in.
- repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not as described in Clause 5.1.6.1.2. and can be configured only when the higher layer parameter reportQuantity associated with all the reporting settings linked with the CSI-RS resource set is set to 'cri-RSRP', 'cri-SINR', 'cri-RSRP-Index', 'cri-SINR-Index' or 'none'.
- qcl-InfoPeriodicCSI-RS contains a reference to a TCI-State indicating QCL source RS(s) and QCL type(s). If the TCI-State is configured with a reference to an RS configured with qcl-Type set to 'typeD' association, that RS may be an SS/PBCH block located in the same or different CC/DL BWP or a CSI-RS resource configured as periodic located in the same or different CC/DL BWP. The reference RS may additionally be an SS/PBCH block associated with a PCI different from the PCI of the serving cell.

trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same as described in Clause 5.1.6.1.1 and can be configured when reporting setting is not configured or when the higher layer parameter reportQuantity associated with all the reporting settings linked with the CSI-RS resource set is set to 'none'.

All CSI-RS resources within one set are configured with same density and same nrofPorts, except for the NZP CSI-RS resources used for interference measurement.

The UE expects that all the CSI-RS resources of a resource set are configured with the same starting RB and number of RBs and the same cdm-type.

For a CSI-RS Resource Set for channel measurement configured with two Resource Groups and N Resource Pairs, the slot offsets of the two resources in a Resource Pair are configured within $X \in \{1,2\}$ slots, without DL/UL switching in between the two resources, where X=1 implies that the two resources are configured in the same slot, and X=2 implies that the two resources are configured within two adjacent slots.

The bandwidth and initial common resource block (CRB) index of a CSI-RS resource within a BWP, as defined in Clause 7.4.1.5 of [4, TS 38.211], are determined based on the higher layer parameters nrofRBs and startingRB, respectively, within the CSI-FrequencyOccupation IE configured by the higher layer parameter freqBand within the CSI-RS-ResourceMapping IE. Both nrofRBs and startingRB are configured as integer multiples of 4 RBs, and the reference point for startingRB is CRB 0 on the common resource block grid. If startingRB<$N_{BWP}^{start}$, the UE shall assume that the initial CRB index of the CSI-RS resource is $N_{initial\ RB}=N_{BWP}^{start}$, otherwise $N_{initial\ RB}$=startingRB. If nrofRBs>$N_{BWP}^{size}+N_{BWP}^{start}-N_{initial\ RB}$, the UE shall assume that the bandwidth of the CSI-RS resource is $N_{CSI-RS}^{BW}=N_{BWP}^{size}+N_{BWP}^{start}-N_{initial\ RB}$, otherwise $N_{CSI-RS}^{BW}$=nrofRBs. In all cases, the UE shall expect that $N_{CSI-RS}^{BW} \geq \min(24, N_{BWP}^{size})$.

5.2.2.5 CSI Reference Resource Definition

The CSI reference resource for a serving cell is defined as follows:

In the frequency domain, the CSI reference resource is defined by the group of downlink physical resource blocks corresponding to the band to which the derived CSI relates.

In the time domain, the CSI reference resource for a CSI reporting in uplink slot n' is defined by a single downlink slot $$n - n_{CSI\_ref} - K_{offset} \cdot \frac{2^{\mu_{DL}}}{2^{\mu_{K_{offset}}}},$$

where $K_{offset}$ is a parameter configured by higher layer as specified in clause 4.2 of [6 TS 38.213], and where $\mu_{K_{offset}}$ is the subcarrier spacing configuration for $K_{offset}$ with a value of 0 for frequency range 1, where $$n = \left\lfloor n' \cdot \frac{2^{\mu_{DL}}}{2^{\mu_{UL}}} \right\rfloor + \left\lfloor \left( \frac{N_{slot,offset,UL}^{CA}}{2^{\mu_{offset,UL}}} - \frac{N_{slot,offset,DL}^{CA}}{2^{\mu_{offset,DL}}} \right) \cdot 2^{\mu_{DL}} \right\rfloor$$

and $\mu_{DL}$ and $\mu_{UL}$ are the subcarrier spacing configurations for DL and UL, respectively, and $N_{slot,offset}^{CA}$ and $\mu_{offset}$ are determined by higher-layer configured ca-SlotOffset for the cells transmitting the uplink and downlink, as defined in clause 4.5 of [4, TS 38.211]

where for periodic and semi-persistent CSI reporting
if a single CSI-RS/SSB resource is configured for channel measurement $n_{CSI\_ref}$ is the smallest value greater than or equal to $4 \cdot 2^{\mu_{DL}}$, such that it corresponds to a valid downlink slot, or
if multiple CSI-RS/SSB resources are configured for channel measurement $n_{CSI\_ref}$ is the smallest value greater than or equal to $5 \cdot 2^{\mu_{DL}}$, such that it corresponds to a valid downlink slot.

where for aperiodic CSI reporting, if the UE is indicated by the DCI to report CSI in the same slot as the CSI request, $n_{CSI\_ref}$ is such that the reference resource is in the same valid downlink slot as the corresponding CSI request, otherwise $n_{CSI\_ref}$ is the smallest value greater than or equal to $\lfloor Z'/N_{symb}^{slot} \rfloor$, such that slot n-$n_{CSI\_ref}$ corresponds to a valid downlink slot, where Z' corresponds to the delay requirement as defined in Clause 5.4.

when periodic or semi-persistent CSI-RS/CSI-IM or SSB is used for channel/interference measurements, the UE is not expected to measure channel/interference on the CSI-RS/CSI-IM/SSB whose last OFDM symbol is received up to Z' symbols before transmission time of the first OFDM symbol of the aperiodic CSI reporting.

A slot in a serving cell shall be considered to be a valid downlink slot if:
it comprises at least one higher layer configured downlink or flexible symbol, and
it does not fall within a configured measurement gap for that UE If there is no valid downlink slot for the CSI reference resource corresponding to a CSI Report Setting in a serving cell, CSI reporting is omitted for the serving cell in uplink slot n'.

After the CSI report (re)configuration, serving cell activation, BWP change, or activation of SP-CSI, the UE reports a CSI report only after receiving at least one CSI-RS transmission occasion for channel measurement and CSI-RS and/or CSI-IM occasion for interference measurement no later than CSI reference resource and drops the report otherwise.

When DRX is configured, the UE reports a CSI report only if receiving at least one CSI-RS transmission occasion for channel measurement and CSI-RS and/or CSI-IM occasion for interference measurement in DRX Active Time no later than CSI reference resource and drops the report otherwise. When DRX is configured and the CSI-RS Resource Set for channel measurement corresponding to a CSI report is configured with two Resource Groups and N Resource Pairs, as described in clause 5.2.1.4.1, the UE reports a CSI report only if receiving at least one CSI-RS transmission occasion for each CSI-RS resource in a Resource Pair within the same DRX Active Time no later than CSI reference resource and drops the report otherwise. When the UE is configured to monitor DCI format 2_6 and if the UE configured by higher layer parameter ps-TransmitOtherPeriodicCSI to report CSI with the higher layer parameter reportConfigType set to 'periodic' and reportQuantity set to quantities other than 'cri-RSRP', 'ssb-Index-RSRP', 'cri-RSRP-Index', and 'ssb-Index-RSRP-Index' when drx-onDurationTimer is not started, the UE shall report CSI during the time duration indicated by drx-onDurationTimer in DRX-Config also outside active time according to the procedure described in Clause 5.2.1.4 if receiving at least one CSI-RS transmission occasion for channel measurement and CSI-RS and/or CSI-IM occasion for interference measurement during the time duration indicated by drx-onDurationTimer in DRX-Config outside DRX active time or in DRX Active Time_no later than CSI reference resource and drops the report otherwise. When the UE is configured to monitor DCI format 2_6 and if the UE configured by higher layer parameter ps-TransmitPeriodicL1-RSRP to report L1-RSRP with the higher layer parameter reportConfigType set to 'periodic' and reportQuantity set to 'cri-RSRP', 'ssb-Index-RSRP', 'cri-RSRP-Index', or 'ssb-Index-RSRP-Index' when drx-onDurationTimer is not started, the UE shall report L1-RSRP during the time duration indicated by drx-onDurationTimer in DRX-Config also outside active time according to the procedure described in clause 5.2.1.4 and when reportQuantity set to 'cri-RSRP' or 'cri-RSRP-Capability[Set]Index' if receiving at least one CSI-RS transmission occasion for channel measurement during the time duration indicated by drx-onDurationTimer in DRX-Config outside DRX active time or in DRX Active Time no later than CSI reference resource and drops the report otherwise.

Network energy saving may be introduced and/or utilized to save power from base station perspective. Base station could determine whether to turn off a component (e.g., an antenna port and/or other component) partially or completely and/or whether to reduce its transmission power to reduce power consumption, e.g., when there is at least one of a dip in traffic and/or loading, less than a threshold amount of traffic and/or loading, and/or zero traffic and/or loading. For example, the base station may shut down and/or turn off (i) one, some, and/or all TXRUs of a set of (one or more) TXRUs of the base station, (ii) one, some, and/or all Radio Frequency (RF) chains of a set of (one or more) RF chains of the base station, (iii) one, some, and/or all antenna ports of a set of (one or more) antenna ports of the base station and/or (iv) one, some, and/or all channels and/or signals of a set of (one or more) channels and/or signals of the base station. The base station could reduce its transmission power (TX power) by X decibels (dB). When more traffic arises for the base station and/or has more UEs to serve (and/or when the base station has greater than the threshold amount of traffic and/or loading), the base station may increase the TX power (e.g., back to normal) and/or turn on all or some of (i) TXRU(s) of the base station, (ii) Radio Frequency (RF) chain(s) of the base station, (iii) antenna port(s) of the base station and/or (iv) channel(s) and/or signal(s) of the base station.

RP-230566, RAN1 #110 chairman's note, and RAN1 #110bis-e chairman's note provide some details about network energy saving. One or more parts of RP-230566, RAN1 #110 chairman's note, and RAN1 #110bis-e chairman's note are quoted below:

4.1 Objective of SI or Core Part WI or Testing Part WI

The objectives of the work item are the following:
1. Specify SSB-less SCell operation for inter-band CA for FR1 and co-located cells, if found feasible by RAN4 study, where a UE measures SSB transmitted on PCell or another SCell for an SCell's time/frequency synchronization (including downlink AGC), and L1/L3 measurements, including potential enhancement on SCell activation procedures if necessary [RAN4, RAN2]
2. Specify enhancement on cell DTX/DRX mechanism including the alignment of cell DTX/DRX and UE DRX in RRC_CONNECTED mode, and inter-node information exchange on cell DTX/DRX [RAN2, RAN1, RAN3]
    Note: No change for SSB transmission due to cell DTX/DRX.
    Note: The impact to IDLE/INACTIVE UEs due to the above enhancement should be avoided.
3. Specify the following techniques in spatial and power domains
    Specify necessary enhancements on CSI and beam management related procedures including measurement and report, and signaling to enable efficient adaptation of spatial elements (e.g. antenna ports, active transceiver chains) [RAN1, RAN2]
    Specify necessary enhancements on CSI related procedures including measurement and report, and signaling to enable efficient adaptation of power offset values between PDSCH and CSI-RS [RAN1, RAN2]
    Note: Above objectives are only for UE specific channels/signals
    Note: Legacy UE CSI/CSI-RS capabilities applies when considering total number of CSI reports and requirements
4. Specify mechanism(s) to prevent legacy UEs camping on cells adopting the Rel-18 NES techniques, if necessary [RAN2]
5. Specify CHO procedure enhancement(s) in case source/target cell is in NES mode [RAN2]
6. Specify inter-node beam activation and enhancements on restricting paging in a limited area [RAN3].
7. Specify the corresponding RRM/RF core requirements, if necessary, for the above features [RAN4]

Agreement

For the purpose of further discussions in RAN1 on NES spatial domain adaptations, consider the following cases
    Type 1: all antenna elements associated to a logical antenna port is disabled/enabled
    Type 2: part/subset of antenna elements associated to a logical antenna port is disabled/enabled Agreement For spatial element adaptation, further study the following
    A1-1) Each CSI-RS resource/resource set/resource setting can be associated with only one spatial adaptation pattern
        FFS: Details on how the association is done
    A1-2) Each CSI-RS resource/resource set/resource setting can be associated with one or more spatial adaptation patterns
        FFS: Details on how the association is done
    FFS: Details on the definition of "spatial adaptation patterns"

Agreement

For spatial element adaptation, further study the following
    A2-1) Independent/separate CSI report configurations where each CSI report configuration corresponds to one spatial adaptation pattern
    A2-2) One CSI report configuration contains multiple CSI report sub-configurations where each sub-configuration corresponds to one spatial adaptation pattern
        FFS: Details of sub-configuration Agreement For spatial domain adaptation, further study necessary enhancements for multiple CSI(s) where each CSI corresponds to a spatial adaptation pattern, e.g.

FFS: gNB indicates to UE which CSI(s) the UE shall report

FFS: the UE selects which CSI(s) are reported

FFS: multiple CSI(s) are reported in a joint CSI report

FFS: Overhead reduction for multiple CSI(s)

Note: UE complexity needs to be taken into account.

Agreement

For adaptation of power offset values between PDSCH and CSI-RS, further study the following Where/how to configure multiple power offset values Whether/how one or more power offset values are dynamically indicated to UE for CSI measurement/reporting, and PDSCH reception Overhead reduction for CSI reports associated with multiple power offset values between PDSCH and CSI-RS Whether other UE report content can be included Agreement For spatial and power domain adaptation, solution(s) based on adaptation within an active BWP is considered as baseline Agreement Discuss the signalling aspects for spatial/power domain adaptation for Rel-18 NES-capable UEs considering that Whether there is a need for transition time per adaptation (for UE)

Whether/How to inform UE on spatial adaptation pattern update and/or PDSCH/CSI-RS transmission power change due to adaptation.

Agreement

RAN1 continues discussion on the at least following physical layer related aspects of cell DTX/DRX aspects physical layer signals/channels and procedures expected to be impacted during non-active periods of cell DTX/DRX consider impact to at least KPIs from the SI when physical layers/signals/channels are impacted by cell DTX/DRX Further discussions on other aspects are not precluded Agreement At least the following candidate signals/channels for connected mode UEs, which the UE may be expected to not transmit or receive during non-active periods of cell DTX/DRX, are considered from RAN1 perspective for further discussion. The exact set of signals/channels that the UE may be expected to not transmit or receive is FFS.

DL

Periodic/Semi-persistent CSI-RS (including TRS)

PRS

PDCCH scrambled with UE specific RNTI

PDCCH in Type-3 CSS

SPS-PDSCH

UL

SR

Periodic/Semi-persistent CSI report

Periodic/Semi-persistent SRS

CG-PUSCH

Other signals/channels are not precluded

In some examples, a Channel State Information (CSI) report may be derived based on measurements on (and/or over) multiple Channel State Information Reference Signals (CSI-RSs) and/or multiple CSI-RS resources, e.g., CSI-RS resources in a resource set. For example, the User Equipment (UE) may perform measurement over multiple CSI-RSs to determine a set of measurement results associated with the multiple CSI-RSs, and/or may compare the set of measurement results (for the multiple CSI-RSs). In an example, the UE may select and/or report a first CSI-RS with strongest signal strength over the multiple CSI-RSs (e.g., the first CSI-RS may be associated with a strongest beam over multiple beams associated with the multiple CSI-RSs). For example, the UE may identify the first CSI-RS with the strongest signal strength and/or associated with the strongest beam based on a comparison of one or more first measurement results (of the set of measurement results) associated with the first CSI-RS with other measurement results (of the set of measurement results) associated with other CSI-RSs of the multiple CSI-RSs. In an example, the one or more first measurement results may be indicative of a signal strength associated with the first CSI-RS. The UE may report an Identity (ID) of the (selected) first CSI-RS and the one or more first measurement results (e.g., Reference Signal Received Power (RSRP), such as Layer 1 RSRP (L1-RSRP)), to the base station. However, if there is an adaptation associated with CSI-RS (due to the base station transitioning from network energy saving operation back to normal operation during the multiple CSI-RSs, for example), the base station (and/or the UE) may not be able to suitably compare the multiple CSI-RSs since some of the multiple CSI-RSs may be with network energy saving and some of the CSI-RSs may be without network energy saving. The adaptation associated with CSI-RS may comprise (i) the base station turning on some or all CSI-RS, (ii) the base station increasing Transmission (TX) power for CSI-RS, and/or (iii) the base station increasing a number of antenna port for CSI-RS.

In an example, the multiple CSI-RSs may comprise 8 CSI-RSs associated with 8 CSI-RS resources (e.g., 8 CSI-RS occasions). After 5 CSI-RS resources (e.g., 5 CSI-RS occasions) of the 8 CSI-RS resources (and prior to 3 remaining CSI-RS resources of the 8 CSI-RS resources), the base station may perform an adaptation associated with CSI-RS (e.g., the base station may adapt CSI-RS), for example, by at least one of adapting antenna port number, adapting transmission power, turning on CSI-RS, etc. The adaptation may be applied to the 3 remaining CSI-RS resources (e.g., 3 CSI-RS occasions). In an example in which the adaptation comprises adapting antenna port number from one to four, the base station may transmit CSI-RSs via the 5 CSI-RS resources using one antenna ports and the base station may transmit CSI-RSs via the 3 remaining CSI-RS resources using four antenna ports. In an example in which the adaptation comprises adapting antenna port number from one to four, the base station may transmit CSI-RSs via the 5 CSI-RS resources using one antenna port (e.g., each of the 5 CSI-RS resources may be used to transmit CSI-RS using one antenna port) and the base station may transmit CSI-RSs via the 3 remaining CSI-RS resources using four antenna ports (e.g., each of the 3 remaining CSI-RS resources may be used to transmit CSI-RS using four antenna ports). In an example in which the adaptation comprises adapting transmission power from 21 dB milliWatt (dBm) and to 30 dBm, the base station may transmit CSI-RSs via the 5 CSI-RS resources using about 21 dBm (e.g., each of the 5 CSI-RS resources may be used to transmit CSI-RS using about 21 dBm) and the base station may transmit CSI-RSs via the 3 remaining CSI-RS resources using 30 dBm (e.g., each of the 3 remaining CSI-RS resources may be used to transmit CSI-RS using 30 dBm). In an example in which the adaptation comprises turning on CSI-RS (e.g., activating CSI-RS functionality), the base station may not transmit CSI-RS via the 5 CSI-RS resources and the base station may transmit CSI-RSs via the 3 remaining CSI-RS resources. Techniques are provided herein for managing CSI reporting in association with an adaptation (and/or addressing impacts of the adaptation on the CSI reporting and/or measurements associated with the CSI reporting).

In some examples, an adaptation of a base station is associated with adapting from a first adaptation status (e.g., a status of the base station before the adaptation) to a second adaptation status (e.g., a status of the base station after the adaptation).

In an example, the adaptation comprises adapting an antenna port number associated with the base station. For example, adapting the antenna port number may comprise adapting the antenna port number from a first number of antenna ports to a second number of antenna ports. For example, the first adaptation status may be associated with the first number of antenna ports and the second adaptation status may be associated with the second number of antenna ports. The antenna port number may be associated with CSI-RS functionality of the base station. In some examples, prior to the adaptation, the base station may use the first number of antenna ports to transmit one or more CSI-RSs using one or more CSI-RS resources to a UE. Alternatively and/or additionally, after the adaptation, the base station may use the second number of antenna ports to transmit one or more CSI-RSs using one or more CSI-RS resources to the UE.

In an example, the adaptation comprises adapting a transmission power associated with the base station. For example, adapting the transmission power may comprise adapting the transmission power from a first transmission power to a second transmission power. For example, the first adaptation status may be associated with the first transmission power and the second adaptation status may be associated with the second transmission power. The transmission power may be associated with CSI-RS functionality of the base station. In some examples, prior to the adaptation, the base station may use the first transmission power to transmit one or more CSI-RSs using one or more CSI-RS resources to a UE. Alternatively and/or additionally, after the adaptation, the base station may use the second transmission power to transmit one or more CSI-RSs using one or more CSI-RS resources to the UE.

In an example, the adaptation comprises turning on CSI-RS (e.g., activating CSI-RS functionality). For example, prior to the adaptation, the base station may not use one or more CSI-RS resources to transmit one or more CSI-RSs to the UE. Alternatively and/or additionally, after the adaptation, the base station may use one or more CSI-RS resources to transmit one or more CSI-RSs to the UE.

A first concept of the present disclosure is to derive a CSI report based on CSI-RS associated with both adaptation statuses (e.g., the first adaptation status and the second adaptation status). For example, the UE may compensate a difference (e.g., a difference in number of antenna ports, a difference in transmission power, a difference in CSI-RS functionality, etc.) between the two adaptation statuses. For example, the UE may compensate for the difference to derive the CSI report.

In an example, when the adaptation is associated with adapting the antenna port number from the first number of antenna ports to the (different) second number of antenna ports, the UE may follow and/or use a lower number of antenna ports that is lower among the two adaptation statuses to derive the CSI report (e.g., the lower number of antenna ports may correspond to a minimum value of a set of values comprising the first number of antenna ports and the second number of antenna ports). In an example in which the adaptation is associated with adapting the antenna port number from two to four (e.g., for each CSI-RS resource and/or occasion), the UE may use two antenna ports (e.g., out of four antenna ports) to (i) derive the CSI report for CSI-RS resource and/or occasion after adaptation and (ii) derive the CSI report for CSI-RS resource/occasion before adaptation. In some examples, the two antenna ports may be common between the two adaptation statuses (e.g., the two antenna ports may be used prior to the adaptation in the first adaptation status and/or after the adaptation in the second adaptation status). The two antenna ports may share a same pattern and/or resource element between the two adaptation statuses. The UE may use two antenna ports among the four antenna ports to derive CSI report after the adaptation. (e.g., and does not derive the CSI report based on remaining two antenna ports of the four antenna ports other than the two antenna ports).

In an example in which the adaptation is associated with adapting the transmission power from the first transmission power to the (different) second transmission power, when deriving a measurement (e.g., a quantity) associated with the CSI report (e.g., the UE may include the measurement in the CSI report and/or use the measurement to generate the CSI report), the UE may take the power adaptation into account to compensate a power difference between the first transmission power and the second transmission power. In an example, when the transmission power is increased by 6 dB due to the power adaptation (e.g., the second transmission power is greater than the first transmission by about 6 dB), the UE may add 6 dB to a measurement (e.g., Reference Signal Received Power (RSRP)) that is associated with a CSI-RS resource (and/or occasion) before the adaptation (wherein 6 dB is not added for measurement associated with CSI-RS resource and/or occasion after the adaptation, for example). Alternatively and/or additionally, when the transmission power is increased by 6 dB due to the power adaptation, the UE may reduce (e.g., subtract) a measurement (e.g., RSRP), that is associated with CSI-RS resource (and/or occasion) after the adaptation, by 6 dB (wherein 6 dB is not reduced for measurement associated with CSI-RS resource and/or occasion before the adaptation, for example).

A second concept of the present disclosure is to derive a CSI report based on CSI-RS associated with one of the adaptation statuses (e.g., merely the first adaptation status before the adaptation or the second adaptation status after the adaptation). In some examples, the CSI report may not be derived based on the other adaptation status of the adaptation statuses (e.g., the CSI report may be derived based on the first adaptation status and not the second adaptation status and/or may be derived based on the second adaptation status and not the first adaptation status). The CSI report may be derived based on a latest adaptation status of the adaptation statuses, e.g., the latest adaptation status may correspond to the second adaptation status after the adaptation. The CSI report may be derived based on a configured adaptation status (e.g., the configured adaptation status may be indicated by the base station or another base station).

In an example, the CSI report may be derived based on an adaptation status (of the adaptation statuses) with higher energy consumption (e.g., larger Tx power, larger number of antenna port(s), On). For example, the UE may be configured (by the base station and/or another base station, for example) to use the first adaptation status to derive the CSI report (and/or may not use the second adaptation status to derive the CSI report) based on a determination that at least one of (i) the first transmission power is greater than the second transmission power, (ii) the first number of antenna ports is greater than the second number of antenna ports, (iii) the first adaptation status is associated with CSI-RS being on (e.g., CSI-RS functionality is activated) and/or the second adaptation status is associated with CSI-RS being off (e.g., CSI-RS functionality is deactivated). Alternatively and/or additionally, the UE may be configured (by the base station and/or another base station, for example) to use the second adaptation status to derive the CSI report (and/or may not use the first adaptation status to derive the CSI report) based on a determination that at least one of (i) the second transmission power is greater than the first transmission power, (ii) the second number of antenna ports is greater than the first number of antenna ports, (iii) the second adaptation status is associated with CSI-RS being on (e.g., CSI-RS functionality is activated) and/or the first adaptation status is associated with CSI-RS being off (e.g., CSI-RS functionality is deactivated).

In an example, the CSI report may be derived based on an adaptation status (of the adaptation statuses) with lower energy consumption (e.g., lower Tx power, smaller number of antenna port(s), Off). For example, the UE may be configured (by the base station and/or another base station, for example) to use the first adaptation status to derive the CSI report (and/or may not use the second adaptation status to derive the CSI report) based on a determination that at least one of (i) the first transmission power is less than the second transmission power, (ii) the first number of antenna ports is less than the second number of antenna ports, (iii) the first adaptation status is associated with CSI-RS being off (e.g., CSI-RS functionality is deactivated) and/or the second adaptation status is associated with CSI-RS being on (e.g., CSI-RS functionality is activated). Alternatively and/or additionally, the UE may be configured (by the base station and/or another base station, for example) to use the second adaptation status to derive the CSI report (and/or may not use the first adaptation status to derive the CSI report) based on a determination that at least one of (i) the second transmission power is less than the first transmission power, (ii) the second number of antenna ports is less than the first number of antenna ports, (iii) the second adaptation status is associated with CSI-RS being off (e.g., CSI-RS functionality is deactivated) and/or the first adaptation status is associated with CSI-RS being on (e.g., CSI-RS functionality is activated).

A third concept of the present disclosure is to avoid the issue by network restriction. For example, network may avoid (and/or may be prohibited from) adapting CSI-RS (and/or may be configured not to adapt CSI-RS) within a period in which a plurality of CSI-RS resources are to be used to derive a single CSI report (e.g., one CSI). Instead, if a current time is after an initial CSI-RS resource of a plurality of CSI-RS resources associated with a (single) CSI report, the base station may wait until a time after a CSI-RS of the last CSI-RS resource of the plurality of CSI-RS resources (for the CSI report, for example) is transmitted to perform the adaptation (of CSI-RS, for example).

A fourth concept of the present disclosure is to skip the CSI report and/or to report a predefined value (e.g., at least one of all 0's, all 1's, index 0, OOR, etc.). For example, the UE may not derive and/or transmit the CSI report based on the plurality of CSI-RS resources (and/or CSI-RSs transmitted via the plurality of CSI-RS resources) based on the adaptation being after the initial CSI-RS resource of the plurality of CSI-RS resources and/or before the last CSI-RS resource of the plurality of CSI-RS resources. Alternatively and/or additionally, the UE may transmit the CSI report comprising the predefined value (e.g., at least one of all 0's, all 1's, index 0, OOR, etc.) based on the adaptation being after the initial CSI-RS resource of the plurality of CSI-RS resources and/or before the last CSI-RS resource of the plurality of CSI-RS resources.

Embodiment 1

In Embodiment 1, a UE may be indicated adaptation of a signal (e.g., CSI-RS) transmitted by a base station. For example, the UE (from the base station, for example) may receive an indication indicative of the adaptation. The indication may indicate CSI-RS is adapted. In an example, the indication may indicate that CSI-RS is adapted from a first number of antenna ports to a second number antenna ports. The first number may be smaller than the second number. In an example, the indication may indicate that CSI-RS is adapted from a first transmission power to a second transmission power. The first transmission power may be smaller than the second transmission power. The indication may indicate that CSI-RS is adapted from turn off to turn on. A plurality of CSI-RS resources may be associated with one CSI report (e.g., one CSI). The plurality of CSI-RS resources are configured for deriving the one CSI report (e.g., the one CSI). The UE may derive the one CSI report (e.g., the one CSI) based on one or more CSI-RSs associated with (e.g., within and/or transmitted via) the plurality of CSI-RS resources. One or more first CSI-RS resources of the plurality of CSI-RS resources are before the adaptation. One or more second CSI-RS resources of the plurality of CSI-RS resources are after the adaptation.

In some examples, the UE may derive CSI based on CSI-RS with a same number of antenna port within the plurality of CSI-RS resources. The UE may derive CSI based on CSI-RS with a third number of antenna port within the plurality of CSI-RS resources. In some examples, the third number is not larger than the first number and/or the second number. In some examples, the third number is a minimum number among the first number and the second number. In some examples, the UE derives the one CSI report (e.g., the one CSI) based on a subset (and/or part) of a CSI-RS if the CSI-RS comprises more than the third number of antenna port. In some examples, the UE does not derive the one CSI report (e.g., the one CSI) based on CSI-RS on additional antenna ports which exceed the third number. In some examples, the UE derives the one CSI report (e.g., the one CSI) based on CSI-RS on one or more antenna ports that are common before the adaptation and after the adaptation. In some examples, the UE derives the one CSI report (e.g., the one CSI) based on CSI-RS on one or more resource elements that are common before the adaptation and after the adaptation. In some examples, the UE compensates the one CSI report (e.g., the one CSI) (and/or CSI derived for the one CSI report) based on a measure of transmission power difference associated with the adaptation. In some examples, the UE adjusts one or more measurements of the one CSI report (e.g., one or more measured quantities) based on a power difference of the adaptation. In some examples, the UE adds the power difference to a measurement (e.g., a measured quantity measured before the adaptation) to determine an updated measurement (that takes the adaptation into account, for example), wherein the UE may use the updated measurement to derive the one CSI report. Alternatively and/or additionally, the UE may subtract the power difference from a measurement (e.g., a measured quantity measured after the adaptation) to determine an updated measurement (that takes the adaptation into account, for example), wherein the UE may use the updated measurement to derive the one CSI report.

Embodiment 2

In Embodiment 2, a UE may be indicated adaptation of a signal (e.g., CSI-RS) transmitted by a base station. For example, the UE (from the base station, for example) may receive an indication indicative of the adaptation. The indication may indicate CSI-RS is adapted. In an example, the indication may indicate that CSI-RS is adapted from a first number of antenna ports to a second number antenna ports. The first number may be smaller than the second number. In an example, the indication may indicate that CSI-RS is adapted from a first transmission power to a second transmission power. The first transmission power may be smaller than the second transmission power. The indication may indicate that CSI-RS is adapted from turn off to turn on. A plurality of CSI-RS resources may be associated with one CSI report (e.g., one CSI). The plurality of CSI-RS resources are configured for deriving the one CSI report (e.g., the one CSI). The UE may be configured to derive the one CSI report (e.g., the one CSI) based on one or more CSI-RSs associated with (e.g., within and/or transmitted via) the plurality of CSI-RS resources. One or more first CSI-RS resources of the plurality of CSI-RS resources are before the adaptation. One or more second CSI-RS resources of the plurality of CSI-RS resources are after the adaptation.

In some examples, the UE may skip the one CSI report. For example, the UE does not transmit the one CSI report. The UE does not report the one CSI. Alternatively and/or additionally, the UE may report a predefined value for the one CSI.

Embodiment 3

In Embodiment 3, a UE may be indicated adaptation of a signal (e.g., CSI-RS) transmitted by a base station. For example, the UE (from the base station, for example) may receive an indication indicative of the adaptation. The indication may indicate CSI-RS is adapted. In an example, the indication may indicate that CSI-RS is adapted from a first number of antenna ports to a second number antenna ports. The first number may be smaller than the second number. In an example, the indication may indicate that CSI-RS is adapted from a first transmission power to a second transmission power. The first transmission power may be smaller than the second transmission power. The indication may indicate that CSI-RS is adapted from turn off to turn on. A plurality of CSI-RS resources may be associated with one CSI report (e.g., one CSI). The plurality of CSI-RS resources are configured for deriving the one CSI report (e.g., the one CSI). The UE may derive the one CSI report (e.g., the one CSI) based on one or more CSI-RSs associated with (e.g., within and/or transmitted via) the plurality of CSI-RS resources. One or more first CSI-RS resources of the plurality of CSI-RS resources are before the adaptation. One or more second CSI-RS resources of the plurality of CSI-RS resources are after the adaptation.

In some examples, the UE may derive the one CSI report (e.g., the one CSI) based on one or more CSI-RSs that are associated with (e.g., within and/or transmitted via) the one or more first CSI-RS resources, of the plurality of CSI-RS resources, before the adaptation. In some examples, the UE does not derive the one CSI based on one or more CSI-RSs that are associated with (e.g., within and/or transmitted via) the one or more second CSI-RS resources, of the plurality of CSI-RS resources, after the adaptation. In some examples, the UE does not derive the one CSI based on one or more CSI-RSs that are within the one or more second CSI-RS resources after the adaptation based on (and/or due to) the CSI-RS being adapted (which may be determined by the UE based on the indication, for example).

In some examples, the UE may derive the one CSI report (e.g., the one CSI) based on one or more CSI-RSs that are associated with (e.g., within and/or transmitted via) the one or more second CSI-RS resources, of the plurality of CSI-RS resources, after the adaptation. In some examples, the UE does not derive the one CSI based on one or more CSI-RSs that are associated with (e.g., within and/or transmitted via) the one or more first CSI-RS resources, of the plurality of CSI-RS resources, before the adaptation. In some examples, the UE does not derive the one CSI based on one or more CSI-RSs that are within the one or more first CSI-RS resources before the adaptation based on (and/or due to) the CSI-RS being adapted (which may be determined by the UE based on the indication, for example).

In some examples, based on a configuration from the base station (and/or another base station), the UE may determine whether (i) to derive the one CSI report (e.g., the one CSI) based on one or more CSI-RSs that are associated with (e.g., within and/or transmitted via) the one or more first CSI-RS resources before the adaptation or (ii) to derive the one CSI report (e.g., the one CSI) based on one or more CSI-RSs that are associated with (e.g., within and/or transmitted via) the one or more second CSI-RS resources after the adaptation. Alternatively and/or additionally, the UE may use a power consumption (e.g., a power consumption measured and/or reported by the UE) to make a determination of whether (i) to derive the one CSI report (e.g., the one CSI) based on one or more CSI-RSs that are associated with (e.g., within and/or transmitted via) the one or more first CSI-RS resources before the adaptation or (ii) to derive the one CSI report (e.g., the one CSI) based on one or more CSI-RSs that are associated with (e.g., within and/or transmitted via) the one or more second CSI-RS resources after the adaptation.

In some examples, embodiments disclosed herein, such as embodiments described with respect to each of the first concept, the second concept, the third concept, the fourth concept, Embodiment 1, Embodiment 2 and Embodiment 3, may be implemented independently and/or separately. Alternatively and/or additionally, a combination of embodiments described herein, such as embodiments described with respect to one, some and/or all of the first concept, the second concept, the third concept, the fourth concept, Embodiment 1, Embodiment 2 and/or Embodiment 3, may be implemented. Alternatively and/or additionally, a combination of embodiments described herein, such as embodiments described with respect to one, some and/or all of the first concept, the second concept, the third concept, the fourth concept, Embodiment 1, Embodiment 2 and/or Embodiment 3, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

The present disclosure may describe behavior and/or operation when a number of antenna ports (associated with CSI-RS, for example) is adapted from a first number of antenna ports to a second number of antenna ports unless otherwise noted. Techniques and/or systems provided herein may be applicable to behavior and/or operation of a base station and/or a UE when CSI-RS (associated with the base station and/or the UE) is adapted from the first number of antenna ports to the second number of antenna ports. Techniques and/or systems provided herein may be implemented on a base station and/or a UE when CSI-RS (associated with the base station and/or the UE) is adapted from the first number of antenna ports to the second number of antenna ports.

The present disclosure may describe behavior and/or operation when CSI-RS is adapted from a first transmission power to a second transmission power unless otherwise noted. Techniques and/or systems provided herein may be applicable to behavior and/or operation of a base station and/or a UE when CSI-RS (associated with the base station and/or the UE) is adapted from the first transmission power to the second transmission power. Techniques and/or systems provided herein may be implemented on a base station and/or a UE when CSI-RS (associated with the base station and/or the UE) is adapted from the first transmission power to the second transmission power.

The present disclosure may describe behavior and/or operation when CSI-RS is adapted from turn on to turn off unless otherwise noted. Techniques and/or systems provided herein may be applicable to behavior and/or operation of a base station and/or a UE when CSI-RS (associated with the base station and/or the UE) is adapted from turn on to turn off. Techniques and/or systems provided herein may be implemented on a base station and/or a UE when CSI-RS (associated with the base station and/or the UE) is adapted from turn on to turn off.

The present disclosure may describe behavior and/or operation when CSI-RS is adapted from turn off to turn on unless otherwise noted. Techniques and/or systems provided herein may be applicable to behavior and/or operation of a base station and/or a UE when CSI-RS (associated with the base station and/or the UE) is adapted from turn off to turn on. Techniques and/or systems provided herein may be implemented on a base station and/or a UE when CSI-RS (associated with the base station and/or the UE) is adapted from turn off to turn on.

The present disclosure may describe behavior and/or operation when there is at least one CSI-RS with a defined number of ports (e.g., the first number of ports, the second number of ports, etc.) received unless otherwise noted. Techniques and/or systems provided herein may be applicable to behavior and/or operation of a base station and/or a UE when there is at least one CSI-RS with the defined number of ports (e.g., the first number of ports, the second number of ports, etc.) received (by the UE, for example). Techniques and/or systems provided herein may be implemented on a base station and/or a UE when there is at least one CSI-RS with the defined number of ports (e.g., the first number of ports, the second number of ports, etc.) received (by the UE, for example).

The present disclosure may describe behavior and/or operation when there is no CSI-RS with a defined number of ports (e.g., the first number of ports, the second number of ports, etc.) received unless otherwise noted. Techniques and/or systems provided herein may be applicable to behavior and/or operation of a base station and/or a UE when there is no CSI-RS with the defined number of ports (e.g., the first number of ports, the second number of ports, etc.) received (by the UE, for example). Techniques and/or systems provided herein may be implemented on a base station and/or a UE when there is no CSI-RS with the defined number of ports (e.g., the first number of ports, the second number of ports, etc.) received (by the UE, for example).

The present disclosure may describe behavior and/or operation of a single serving cell unless otherwise noted. Techniques and/or systems provided herein may be applicable to behavior and/or operation of a single serving cell. Techniques and/or systems provided herein may be implemented on a single serving cell.

The present disclosure may describe behavior and/or operation of multiple serving cells unless otherwise noted. Techniques and/or systems provided herein may be applicable to behavior and/or operation of multiple serving cells. Techniques and/or systems provided herein may be implemented on multiple serving cells.

The present disclosure may describe behavior and/or operation of a single bandwidth part unless otherwise noted. Techniques and/or systems provided herein may be applicable to behavior and/or operation of a single bandwidth part. Techniques and/or systems provided herein may be implemented on a single bandwidth part.

Throughout the present disclosure, a base station may configure multiple bandwidth parts to the UE (e.g., the base station configures the UE with multiple bandwidth parts) unless otherwise noted.

Throughout the present disclosure, a base station may configure a single bandwidth part to the UE (e.g., the base station configures the UE with a single bandwidth part) unless otherwise noted.

One, some and/or all of the foregoing examples, concepts, techniques and/or embodiments can be formed and/or combined to a new embodiment.

Figure 6:
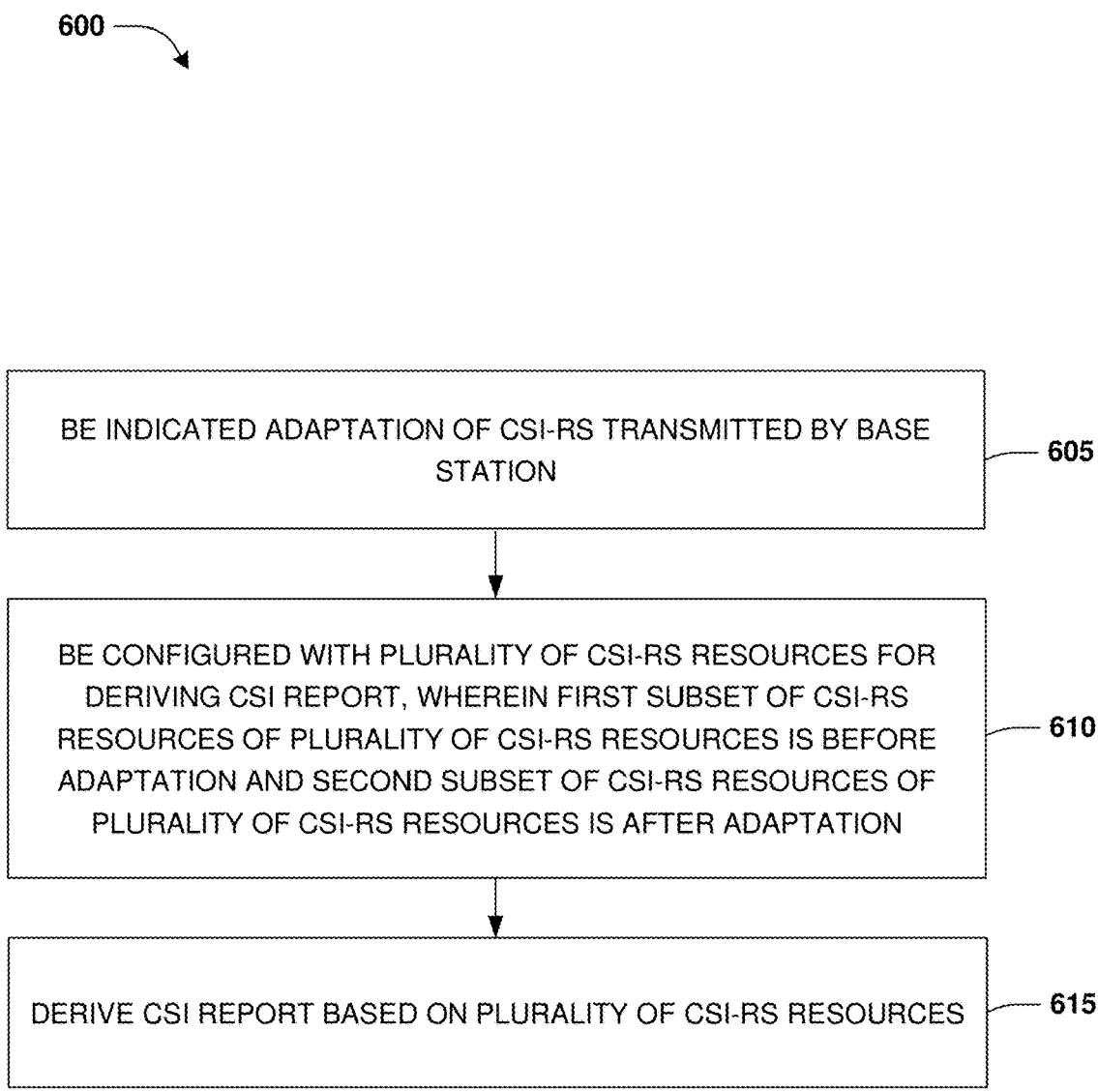
FIG. 6 is a flow chart according to one exemplary embodiment.

FIG. 6 is a flow chart 600 according to one exemplary embodiment from the perspective of a UE. In step 605, the UE is indicated adaptation of a CSI-RS transmitted by a base station. For example, the UE may receive an indication of the adaptation. The indication may be transmitted by the base station. In step 610, the UE is configured with a plurality of CSI-RS resources for deriving (e.g., determining, computing and/or generating) a CSI report, wherein a first subset of (one or more) CSI-RS resources of the plurality of CSI-RS resources is before the adaptation and a second subset of (one or more) CSI-RS resources of the plurality of CSI-RS resources is after the adaptation. For example, each CSI-RS resource of the first subset of (one or more) CSI-RS resources may comprise (i) one or more time resources before an adaptation time of the adaptation and/or (ii) one or more frequency resources. Alternatively and/or additionally, each CSI-RS resource of the second subset of (one or more) CSI-RS resources may comprise (i) one or more time resources after the adaptation time of the adaptation and/or (ii) one or more frequency resources. In step 615, the UE derives (e.g., determines, computes and/or generates) the CSI report based on the plurality of CSI-RS resources (e.g., based on all CSI-RS resources of the plurality of CSI-RS resources).

In one embodiment, the UE derives the CSI report based on a first part of a plurality of antenna ports. The first part may comprise a first subset of (one or more) antenna ports of the plurality of antenna ports. For example, the UE may use the first part of the plurality of antenna ports to determine CSI for inclusion in the CSI report. For example, CSI that is included in the CSI report may be determined based on the first part of the plurality of antenna ports (and/or the CSI report may comprise CSI determined merely based on the first part of the plurality of antenna ports).

In one embodiment, the UE derives the CSI report based on one or more antenna ports (e.g., the first part of the plurality of antenna ports) that are common between a first set of antenna ports before the adaptation and a second set of antenna ports after adaptation. The first set of antenna ports may comprise one, some or all antenna ports of the plurality of antenna ports. The first set of antenna ports may be used by the UE and/or the base station to transmit and/or receive one or more CSI-RSs before the adaptation (e.g., the one or more CSI-RSs may be transmitted and/or received using one or more CSI-RS resources of the first subset of CSI-RS resources). The second set of antenna ports may comprise one, some or all antenna ports of the plurality of antenna ports. The second set of antenna ports may be used by the UE and/or the base station to transmit and/or receive one or more CSI-RSs after the adaptation (e.g., the one or more CSI-RSs may be transmitted and/or received using one or more CSI-RS resources of the second subset of CSI-RS resources). The adaptation may be associated with switching between using the first set of antenna ports and the second set of antenna ports. The first part (of the plurality of antenna ports) based on which the UE derives the CSI report may comprise one, some or all antenna ports that are common to both the first set of antenna ports before the adaptation and the second set of antenna ports after adaptation.

In one embodiment, the UE does not derive the CSI report based on a second part of the plurality of antenna ports. The second part may comprise a second subset of (one or more) antenna ports of the plurality of antenna ports. For example, the UE may exclude the second part of the plurality of antenna ports from consideration to determine CSI for inclusion in the CSI report. For example, CSI that is included in the CSI report may not be determined based on the second part of the plurality of antenna ports (and/or the CSI report may not comprise CSI determined based on the second part of the plurality of antenna ports).

In some examples, the second part of the plurality of antenna ports includes one or more antenna ports, of the plurality of antenna ports, that are not common to both the first set of antenna ports (used before the adaptation, for example) and the second set of antenna ports (used after the adaptation, for example).

In some examples, the UE derives the CSI report (in step 615, for example) based on the plurality of CSI-RS resources. For example, for each CSI-RS resource of one, some or all of the plurality of CSI-RS resources, the UE may (i) monitor for and/or receive a CSI-RS (from the base station, for example) via the CSI-RS resource, and/or (ii) measure the CSI-RS to determine a measurement result (e.g., at least one of CQI, PMI, RI, CRI, L1, L1-RSRP, L1-SINR, etc.) associated with the CSI-RS resource, wherein the measurement result is determined based on the first part of the plurality of antenna ports and/or the second part of the plurality of antenna ports. For example, the measurement result may be determined based on measurements of one or more signals transmitted and/or received via the first part of the plurality of antenna ports (and/or may not be determined based on measurements of one or more signals transmitted and/or received via the second part of the plurality of antenna ports). Accordingly, the UE may determine a set of measurement results (e.g., signal strength measurements), associated with the plurality of CSI-RS resources, that may account for the first part of the plurality of antenna ports (and/or the second part of the plurality of antenna ports). For example, the set of measurement results may comprise a first measurement result (e.g., at least one of CQI, PMI, RI, CRI, L1, L1-RSRP, L1-SINR, etc.) associated with the first CSI-RS resource (e.g., the UE may (i) monitor for and/or receive a first CSI-RS via the first CSI-RS resource, and/or (ii) measure the first CSI-RS to determine the first measurement result associated with the first CSI-RS resource, wherein the first measurement result is based on one or more measurements associated with the first part of the plurality of antennas), a second measurement result (e.g., at least one of CQI, PMI, RI, CRI, L1, L1-RSRP, L1-SINR, etc.) associated with the second CSI-RS resource (e.g., the UE may (i) monitor for and/or receive a second CSI-RS via the second CSI-RS resource, and/or (ii) measure the second CSI-RS to determine the second measurement result associated with the second CSI-RS resource, wherein the second measurement result is based on one or more measurements associated with the first part of the plurality of antennas), and/or one or more other measurement results associated with one or more other CSI-RS resources of the plurality of CSI-RS resources.

In some examples, the UE may derive the CSI report based on the set of measurement results. For example, the UE may (i) compare the set of measurement results associated with the plurality of CSI-RS resources to select a selected CSI-RS resource among the plurality of CSI-RS resources (e.g., the selected CSI-RS resource may be selected based on a determination, based on the set of measurement results, that the selected CSI-RS resource is associated with a strongest signal strength among the plurality of CSI-RS resources), and/or (ii) generate the CSI report to comprise CSI comprising (A) an indication that the selected CSI-RS resource is associated with the strongest signal strength among the plurality of CSI-RS resources, (B) a selected CSI-RS resource measurement result associated with the selected CSI-RS resource (e.g., the selected CSI-RS resource measurement result may report at least one of CQI, PMI, RI, CRI, L1, L1-RSRP, L1-SINR, etc. associated with the selected CSI-RS resource), and/or (C) a selected CSI-RS resource ID associated with the selected CSI-RS resource (and/or a selected CSI-RS ID associated with the CSI-RS received via the selected CSI-RS resource).

In one embodiment, deriving the CSI report (in step 615, for example) is not based on measurement results derived from signals that are transmitted and/or received using antenna ports of the second part of the plurality of antenna ports.

In one embodiment, the UE derives the CSI report based on a third number of antenna ports that is (i) not larger than a first number of antenna ports before the adaptation and/or (ii) not larger than a second number of antenna ports after the adaptation. In some examples, the third number of antenna ports is a smaller number among the first number of antenna ports and the second number of antenna ports. For example, when the first number of antenna ports is four and the second number of antenna ports is eight, the third number of antenna ports may be four.

In one embodiment, the first number of ports is one, two, four, eight, or other value.

In one embodiment, the second number of ports is one, two, four, eight, or other value.

In one embodiment, the UE compensates a power difference between a first transmission power before adaptation and a second transmission power after adaptation.

In one embodiment, the UE derives the CSI report based on the power difference.

In one embodiment, the UE subtracts the power difference from a measurement (e.g., measured quantity associated with a CSI-RS) performed after the adaptation to determine a measurement result (of the set of measurement results, for example) based on which the UE derives the CSI report.

In one embodiment, the UE adds the power difference to a measurement (e.g., measured quantity associated with a CSI-RS) performed before the adaptation to determine a measurement result (of the set of measurement results, for example) based on which the UE derives the CSI report.

In one embodiment, the adaptation is associated with adapting a number of antenna ports associated with CSI-RS. For example, the adaptation may be associated with a switch from the first number of ports to the second number of ports. For example, prior to the adaptation, the UE and/or the base station may use the first number of ports to transmit and/or receive one or more CSI-RSs using one or more CSI-RS resources. Alternatively and/or additionally, after the adaptation, the UE and/or the base station may use the second number of ports to transmit and/or receive one or more CSI-RSs using one or more CSI-RS resources.

In one embodiment, the adaptation is associated with adapting a transmission power associated with CSI-RS. For example, the adaptation may be associated with a switch from the first transmission power to the second transmission power. For example, prior to the adaptation, the base station may use the first transmission power to transmit one or more CSI-RSs using one or more CSI-RS resources (e.g., the first subset of CSI-RS resources before the adaptation time of the adaptation). Alternatively and/or additionally, after the adaptation, the base station may use the second transmission power to transmit one or more CSI-RSs using one or more CSI-RS resources (e.g., the second subset of CSI-RS resources after the adaptation time of the adaptation).

In one embodiment, the adaptation is associated with turning on CSI-RS (e.g., activating CSI-RS functionality). For example, prior to the adaptation, the base station may not use one or more CSI-RS resources to transmit one or more CSI-RSs to the UE. Alternatively and/or additionally, after the adaptation, the base station may use one or more CSI-RS resources to transmit one or more CSI-RSs to the UE.

Referring back to FIGS. 3 and 4, in one exemplary embodiment of a UE, the device 300 includes a program code 312 stored in the memory 310. The CPU 308 may execute program code 312 to enable the UE (i) to be indicated adaptation of a CSI-RS transmitted by a base station, (ii) to be configured with a plurality of CSI-RS resources for deriving a CSI report, wherein a first subset of (one or more) CSI-RS resources of the plurality of CSI-RS resources is before the adaptation and a second subset of (one or more) CSI-RS resources of the plurality of CSI-RS resources is after the adaptation, and (iii) to derive the CSI report based on the plurality of CSI-RS resources (e.g., based on all CSI-RS resources of the plurality of CSI-RS resources). Furthermore, the CPU 308 can execute the program code 312 to perform one, some and/or all of the above-described actions and steps and/or others described herein.

FIG. 7 is a flow chart 700 according to one exemplary embodiment from the perspective of a UE. In step 705, the UE receives an indication of an adaptation associated with CSI-RS, wherein the adaptation is associated with switching from a first number of ports to a second number of ports, and the UE is configured with a plurality of CSI-RS resources for deriving (e.g., determining, computing and/or generating) a CSI report. In some examples, the UE receives the indication of the adaptation from a base station. In some examples, the UE receives a configuration of the plurality of CSI-RS resources (e.g., the UE receives the configuration from the base station) and/or uses the configuration to configure the plurality of CSI-RS resources. In step 710, the UE determines whether to transmit the CSI report (and/or whether to generate the CSI report) based on whether the UE receives a CSI-RS associated with the second number of ports.

In some examples, the adaptation is a CSI-RS adaptation by the base station and/or the UE. In some examples, prior to the adaptation, the UE and/or the base station may use the first number of ports to transmit and/or receive one or more CSI-RSs using one or more CSI-RS resources. For example, prior to the adaptation a set of antenna ports amounting to the first number of ports may be used for transmitting a CSI-RS by the base station to the UE via a CSI-RS resource of the plurality of CSI-RS resources. Alternatively and/or additionally, after the adaptation, the UE and/or the base station may use the second number of ports to transmit and/or receive one or more CSI-RSs using one or more CSI-RS resources. For example, after the adaptation a set of antenna ports amounting to the second number of ports may be used for transmitting a CSI-RS by the base station to the UE via a CSI-RS resource of the plurality of CSI-RS resources.

In one embodiment, in response to receiving one or more first CSI-RSs that are associated with the second number of ports, the UE may (i) generate the CSI report based on the one or more first CSI-RSs and/or (ii) transmit the CSI report (to the base station, for example). For example, the UE may determine to transmit the CSI report (and/or may determine to generate the CSI report for transmission to the base station) in response to receiving the one or more first CSI-RSs that are associated with the second number of ports. For example, the UE may generate the CSI report (for CSI-RS associated with the second number of ports, for example) and/or may transmit the CSI report (to the base station, for example) in response to receiving at least one CSI-RS that is associated with the second number of ports (e.g., the at least one CSI-RS that is associated with the second number of ports may comprise a CSI-RS that is transmitted by the base station and/or received by the UE using the second number of ports, wherein the CSI-RS may be transmitted and/or received after the adaptation associated with switching from the first number of ports to the second number of ports).

For example, the UE may (i) monitor for and/or receive the one or more first CSI-RSs (from the base station, for example) via one or more CSI-RS resources of the plurality of CSI-RS resources, and/or (ii) measure the one or more first CSI-RSs to determine a set of measurement results (e.g., at least one of CQI, PMI, RI, CRI, L1, L1-RSRP, L1-SINR, etc.) associated with the one or more first CSI-RSs. For example, the one or more first CSI-RSs may comprise a first CSI-RS received (using the second number of ports, for example) by the UE via a first CSI-RS resource of the plurality of CSI-RS resources, a second CSI-RS received (using the second number of ports, for example) by the UE via a second CSI-RS resource of the plurality of CSI-RS resources and/or one or more other CSI-RSs. For example, the set of measurement results may comprise a first measurement result (e.g., at least one of CQI, PMI, RI, CRI, L1, L1-RSRP, L1-SINR, etc.) associated with the first CSI-RS resource and/or the first CSI-RS, a second measurement result (e.g., at least one of CQI, PMI, RI, CRI, L1, L1-RSRP, L1-SINR, etc.) associated with the second CSI-RS resource and/or the second CSI-RS, and/or one or more other measurement results.

In some examples, the UE may derive the CSI report based on the set of measurement results associated with the one or more first CSI-RSs. For example, the UE may (i) compare the set of measurement results associated with the one or more first CSI-RSs to select a selected CSI-RS resource (e.g., the selected CSI-RS resource may be selected based on a determination, based on the set of measurement results, that the selected CSI-RS resource is associated with a strongest signal strength among the one or more CSI-RS resources associated with the one or more first CSI-RSs), and/or (ii) generate the CSI report to comprise CSI comprising (A) an indication that the selected CSI-RS resource is associated with the strongest signal strength among the one or more CSI-RS resources, (B) a selected CSI-RS resource measurement result associated with the selected CSI-RS resource (e.g., the selected CSI-RS resource measurement result may report at least one of CQI, PMI, RI, CRI, L1, L1-RSRP, L1-SINR, etc. associated with the selected CSI-RS resource), and/or (C) a selected CSI-RS resource ID associated with the selected CSI-RS resource (and/or a selected CSI-RS ID associated with a CSI-RS, of the one or more first CSI-RSs, received via the selected CSI-RS resource). In some examples, the base station may use the CSI report to determine which CSI-RS resource (and/or which channel) to use for communication with the UE. For example, in response to transmitting the CSI report indicative of the selected CSI-RS resource, the base station and the UE may communicate using a channel associated with the selected CSI-RS resource.

In one embodiment, the UE determines not to transmit the CSI report (and/or determines not to generate the CSI report for transmission to the base station) in response to not receiving a CSI-RS that is associated with the second number of ports (e.g., in response to not receiving any CSI-RS associated with the second number of ports). For example, the UE may determine not to generate the CSI report (for CSI-RS associated with the second number of ports, for example) and/or may not transmit the CSI report (to the base station, for example) in response to not receiving a CSI-RS (e.g., any CSI-RS from the base station after the adaptation) that is associated with the second number of ports. For example, the UE may skip generation and/or transmission of the CSI report (for CSI-RS associated with the second number of ports, for example) in response to not receiving a CSI-RS (e.g., any CSI-RS from the base station after the adaptation) that is associated with the second number of ports. Alternatively and/or additionally, in response to not receiving a CSI-RS (e.g., any CSI-RS from the base station after the adaptation) that is associated with the second number of ports, the UE may postpone generation and/or transmission of the CSI report (for CSI-RS associated with the second number of ports, for example) until after the UE has received one or more CSI-RSs associated with the second number of ports (e.g., the UE may generate and/or transmit the CSI report based on measurement results of the one or more CSI-RSs associated with the second number of ports).

In one embodiment, the first number of ports is larger than the second number of ports.

In one embodiment, the first number of ports is smaller than the second number of ports.

In one embodiment, the first number of ports is one, two, four, eight, or other value.

In one embodiment, the second number of ports is one, two, four, eight, or other value.

In one embodiment, the plurality of CSI-RS resources are associated with (e.g., usable for) channel measurement. For example, the UE may measure one or more CSI-RSs received via one or more CSI-RS resources of the plurality of CSI-RS resources to determine signal strengths associated with one or more channels, and/or may select a selected CSI-RS resource (e.g., a highest quality CSI-RS resource associated with a highest quality channel among the one or more channels), and/or may report the selected CSI-RS resource and/or one or more measurements to the base station.

In one embodiment, the first number of ports is associated with a first sub-configuration.

In one embodiment, the second number of ports is associated with a second sub-configuration.

In some examples, the first sub-configuration and/or the second sub-configuration are included in a plurality of sub-configurations of a CSI report configuration. In some examples, the first sub-configuration corresponds to a first spatial adaptation pattern and/or the second sub-configuration corresponds to a second spatial adaptation pattern different than the first spatial adaptation pattern. In some examples, the CSI report configuration is used by the UE and/or the base station for configuring CSI-RS resources and/or transmitting and/or receiving CSI-RSs for deriving CSI to be reported to the base station.

Referring back to FIGS. 3 and 4, in one exemplary embodiment of a UE, the device 300 includes a program code 312 stored in the memory 310. The CPU 308 may execute program code 312 to enable the UE (i) to receive an indication of an adaptation associated with CSI-RS, wherein the adaptation is associated with switching from a first number of ports to a second number of ports, and the UE is configured with a plurality of CSI-RS resources for deriving a CSI report, and (ii) to determine whether to transmit the CSI report based on whether the UE receives a CSI-RS associated with the second number of ports. Furthermore, the CPU 308 can execute the program code 312 to perform one, some and/or all of the above-described actions and steps and/or others described herein.

Figure 8:
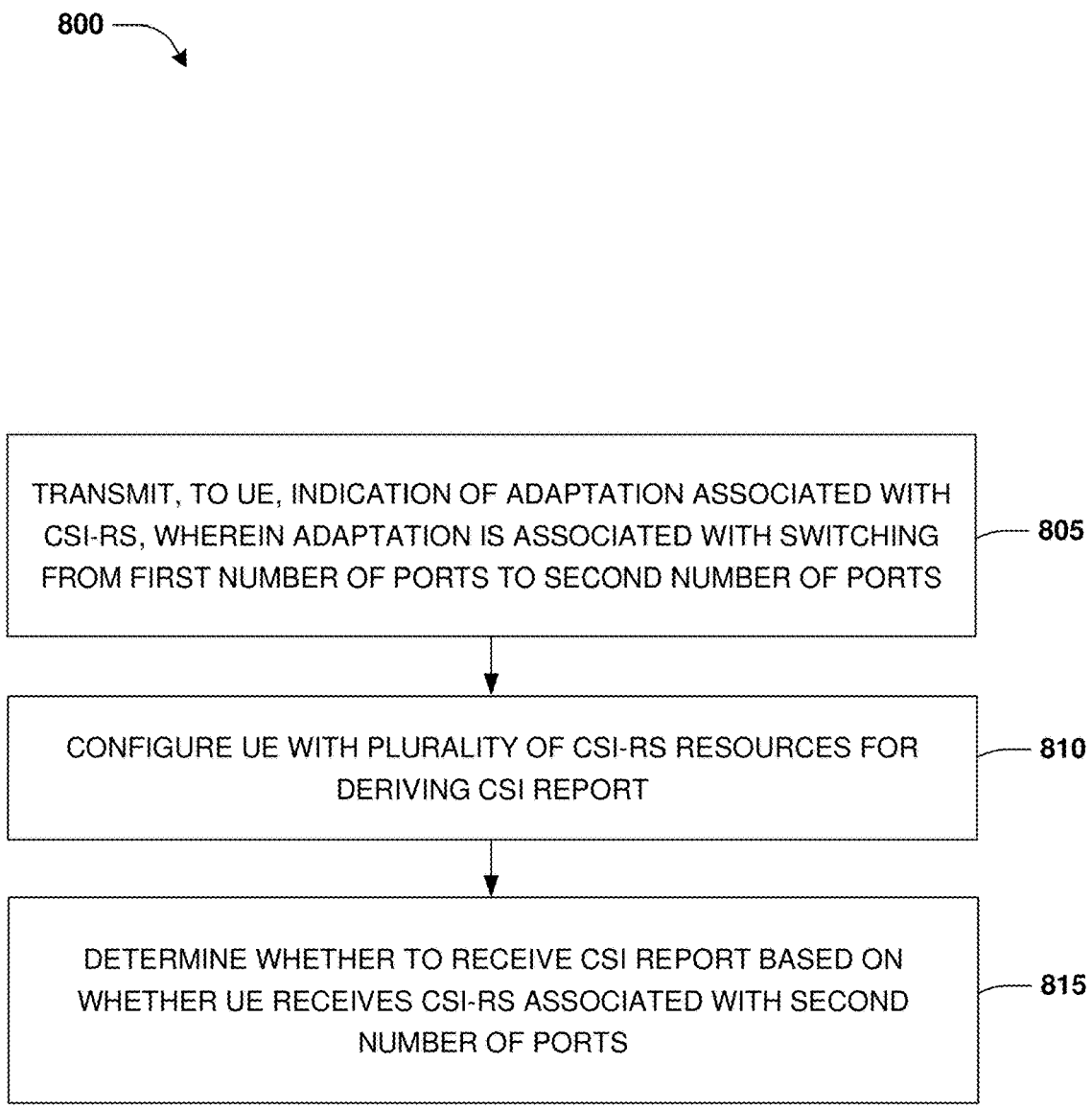
FIG. 8 is a flow chart according to one exemplary embodiment.

FIG. 8 is a flow chart 800 according to one exemplary embodiment from the perspective of a base station. In step 805, the base station transmits, to a UE, an indication of an adaptation associated with CSI-RS, wherein the adaptation is associated with switching from a first number of ports to a second number of ports. In step 810, the base station configures the UE with a plurality of CSI-RS resources for deriving (e.g., determining, computing and/or generating) a CSI report. In some examples, the base station transmits a configuration of the plurality of CSI-RS resources to the UE (e.g., the UE receives the configuration from the base station) and/or the UE uses the configuration to configure the plurality of CSI-RS resources. In step 815, the base station determines whether to receive the CSI report (and/or whether to monitor for the CSI report) based on whether the UE receives a CSI-RS associated with the second number of ports (and/or based on whether the base station has transmitted a CSI-RS associated with the second number of ports to the UE).

In some examples, the adaptation is a CSI-RS adaptation by the base station and/or the UE. In some examples, prior to the adaptation, the UE and/or the base station may use the first number of ports to transmit and/or receive one or more CSI-RSs using one or more CSI-RS resources. For example, prior to the adaptation a set of antenna ports amounting to the first number of ports may be used for transmitting a CSI-RS by the base station to the UE via a CSI-RS resource of the plurality of CSI-RS resources. Alternatively and/or additionally, after the adaptation, the UE and/or the base station may use the second number of ports to transmit and/or receive one or more CSI-RSs using one or more CSI-RS resources. For example, after the adaptation a set of antenna ports amounting to the second number of ports may be used for transmitting a CSI-RS by the base station to the UE via a CSI-RS resource of the plurality of CSI-RS resources.

In one embodiment, based on a determination that the UE received one or more first CSI-RSs that are associated with the second number of ports, the base station may monitor for the CSI report and/or receive the CSI report (from the UE, for example). Alternatively and/or additionally, the base station may monitor for the CSI report and/or receive the CSI report based on a determination that the base station transmitted the one or more first CSI-RSs (using the second number of ports, for example) to the UE.

For example, the UE may (i) monitor for and/or receive the one or more first CSI-RSs (from the base station, for example) via one or more CSI-RS resources of the plurality of CSI-RS resources, and/or (ii) measure the one or more first CSI-RSs to determine a set of measurement results (e.g., at least one of CQI, PMI, RI, CRI, L1, L1-RSRP, L1-SINR, etc.) associated with the one or more first CSI-RSs. For example, the one or more first CSI-RSs may comprise a first CSI-RS transmitted (using the second number of ports, for example) by the base station via a first CSI-RS resource of the plurality of CSI-RS resources, a second CSI-RS transmitted (using the second number of ports, for example) by the base station via a second CSI-RS resource of the plurality of CSI-RS resources and/or one or more other CSI-RSs. For example, the set of measurement results may comprise a first measurement result (e.g., at least one of CQI, PMI, RI, CRI, L1, L1-RSRP, L1-SINR, etc.) associated with the first CSI-RS resource and/or the first CSI-RS, a second measurement result (e.g., at least one of CQI, PMI, RI, CRI, L1, L1-RSRP, L1-SINR, etc.) associated with the second CSI-RS resource and/or the second CSI-RS, and/or one or more other measurement results.

In some examples, the UE may derive the CSI report based on the set of measurement results associated with the one or more first CSI-RSs. For example, the UE may (i) compare the set of measurement results associated with the one or more first CSI-RSs to select a selected CSI-RS resource (e.g., the selected CSI-RS resource may be selected based on a determination, based on the set of measurement results, that the selected CSI-RS resource is associated with a strongest signal strength among the one or more CSI-RS resources associated with the one or more first CSI-RSs), and/or (ii) generate the CSI report to comprise CSI comprising (A) an indication that the selected CSI-RS resource is associated with the strongest signal strength among the one or more CSI-RS resources, (B) a selected CSI-RS resource measurement result associated with the selected CSI-RS resource (e.g., the selected CSI-RS resource measurement result may report at least one of CQI, PMI, RI, CRI, L1, L1-RSRP, L1-SINR, etc. associated with the selected CSI-RS resource), and/or (C) a selected CSI-RS resource ID associated with the selected CSI-RS resource (and/or a selected CSI-RS ID associated with a CSI-RS, of the one or more first CSI-RSs, received via the selected CSI-RS resource). In some examples, the base station may use the CSI report to determine which CSI-RS resource (and/or which beam and/or channel) to use for communication with the UE. For example, in response to receiving the CSI report indicative of the selected CSI-RS resource, the base station and the UE may communicate using a beam and/or channel associated with the selected CSI-RS resource.

In one embodiment, the base station determines not to monitor for and/or receive the CSI report based on a determination that the UE did not receive a CSI-RS that is associated with the second number of ports (e.g., based on a determination that the UE did not receive any CSI-RS associated with the second number of ports). For example, the base station may determine not to monitor for and/or receive the CSI report based on a determination that the base station did not transmit a CSI-RS that is associated with the second number of ports (e.g., based on a determination that the base station did not transmit any CSI-RS associated with the second number of ports). For example, the base station may skip monitoring and/or reception of the CSI report (for CSI-RS associated with the second number of ports, for example) based on a determination that the UE did not receive a CSI-RS that is associated with the second number of ports (and/or based on a determination that the base station did not transmit a CSI-RS that is associated with the second number of ports). Alternatively and/or additionally, based on a determination that the UE did not receive a CSI-RS that is associated with the second number of ports (and/or based on a determination that the base station did not transmit a CSI-RS that is associated with the second number of ports), the base station may postpone reception of the CSI report (for CSI-RS associated with the second number of ports, for example) until after the UE has received one or more CSI-RSs associated with the second number of ports.

In one embodiment, the first number of ports is larger than the second number of ports.

In one embodiment, the first number of ports is smaller than the second number of ports.

In one embodiment, the first number of ports is one, two, four, eight, or other value.

In one embodiment, the second number of ports is one, two, four, eight, or other value.

In one embodiment, the plurality of CSI-RS resources are associated with (e.g., usable for) channel measurement. For example, the UE may measure one or more CSI-RSs received via one or more CSI-RS resources of the plurality of CSI-RS resources to determine signal strengths associated with one or more channels, and/or may select a selected CSI-RS resource (e.g., a highest quality CSI-RS resource associated with a highest quality channel among the one or more channels), and/or may report the selected CSI-RS resource and/or one or more measurements to the base station.

In one embodiment, the first number of ports is associated with a first sub-configuration.

In one embodiment, the second number of ports is associated with a second sub-configuration.

In some examples, the first sub-configuration and/or the second sub-configuration are included in a plurality of sub-configurations of a CSI report configuration. In some examples, the first sub-configuration corresponds to a first spatial adaptation pattern and/or the second sub-configuration corresponds to a second spatial adaptation pattern different than the first spatial adaptation pattern. In some examples, the CSI report configuration is used by the UE and/or the base station for configuring CSI-RS resources and/or transmitting and/or receiving CSI-RSs for deriving CSI to be reported to the base station.

Referring back to FIGS. 3 and 4, in one exemplary embodiment of a base station, the device 300 includes a program code 312 stored in the memory 310. The CPU 308 may execute program code 312 to enable the base station (i) to transmit, to a UE, an indication of an adaptation associated with CSI-RS, wherein the adaptation is associated with switching from a first number of ports to a second number of ports, (ii) to configure the UE with a plurality of CSI-RS resources for deriving a CSI report, and (iii) to determine whether to receive the CSI report based on whether the UE receives a CSI-RS associated with the second number of ports. Furthermore, the CPU 308 can execute the program code 312 to perform one, some and/or all of the above-described actions and steps and/or others described herein.

In the present disclosure, a CSI-RS that is associated with a number of ports may correspond to a CSI-RS that is transmitted using antenna ports amounting to the number of ports (e.g., when the number of ports is eight, the CSI-RS associated with the number of ports may be transmitted using eight antenna ports).

Figure 9:
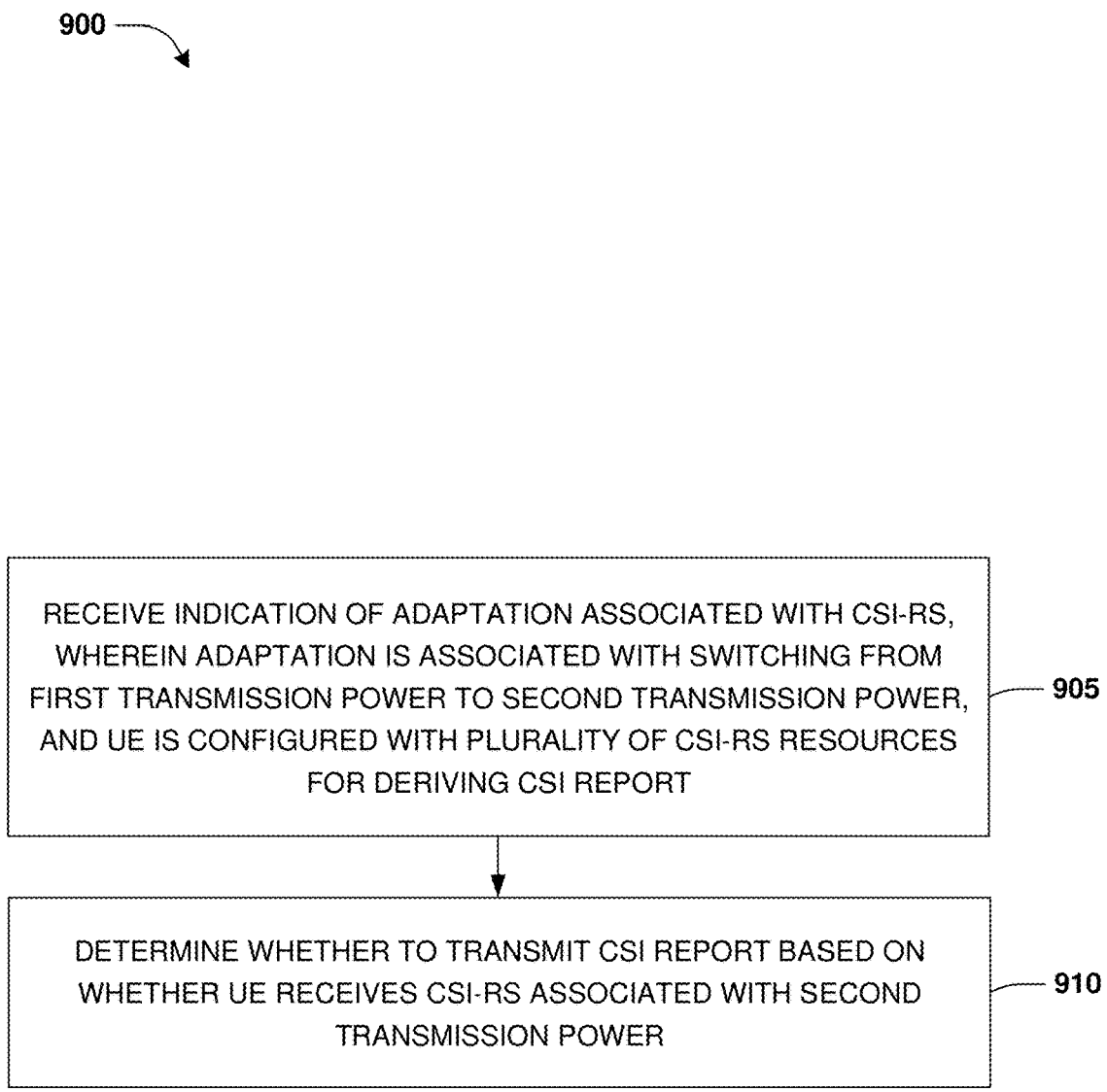
FIG. 9 is a flow chart according to one exemplary embodiment.

FIG. 9 is a flow chart 900 according to one exemplary embodiment from the perspective of a UE. In step 905, the UE receives an indication of an adaptation associated with CSI-RS, wherein the adaptation is associated with switching from a first transmission power to a second transmission power, and the UE is configured with a plurality of CSI-RS resources for deriving (e.g., determining, computing and/or generating) a CSI report. In some examples, the UE receives the indication of the adaptation from a base station. In some examples, the UE receives a configuration of the plurality of CSI-RS resources (e.g., the UE receives the configuration from the base station) and/or uses the configuration to configure the plurality of CSI-RS resources. In step 910, the UE determines whether to transmit the CSI report (and/or whether to generate the CSI report) based on whether the UE receives a CSI-RS associated with the second transmission power.

In some examples, the adaptation is a CSI-RS adaptation by the base station and/or the UE. In some examples, prior to the adaptation, the base station may use the first transmission power to transmit one or more CSI-RSs using one or more CSI-RS resources (wherein the one or more CSI-RSs transmitted using the first transmission power may be received by the UE). Alternatively and/or additionally, after the adaptation, the UE and/or the base station may use the second transmission power to transmit one or more CSI-RSs using one or more CSI-RS resources (wherein the one or more CSI-RSs transmitted using the second transmission power may be received by the UE).

In one embodiment, in response to receiving one or more first CSI-RSs that are associated with the second transmission power, the UE may (i) generate the CSI report based on the one or more first CSI-RSs and/or (ii) transmit the CSI report (to the base station, for example). For example, the UE may determine to transmit the CSI report (and/or may determine to generate the CSI report for transmission to the base station) in response to receiving the one or more first CSI-RSs that are associated with the second transmission power. For example, the UE may generate the CSI report (for CSI-RS associated with the second transmission power, for example) and/or may transmit the CSI report (to the base station, for example) in response to receiving at least one CSI-RS that is associated with the second transmission power (e.g., the at least one CSI-RS that is associated with the second transmission power may comprise a CSI-RS that is transmitted by the base station using the second transmission power, wherein the CSI-RS may be transmitted and/or received after the adaptation associated with switching from the first transmission power to the second transmission power).

For example, the UE may (i) monitor for and/or receive the one or more first CSI-RSs (from the base station, for example) via one or more CSI-RS resources of the plurality of CSI-RS resources, and/or (ii) measure the one or more first CSI-RSs to determine a set of measurement results (e.g., at least one of CQI, PMI, RI, CRI, L1, L1-RSRP, L1-SINR, etc.) associated with the one or more first CSI-RSs. For example, the one or more first CSI-RSs may comprise a first CSI-RS (transmitted by the base station using the second transmission power, for example) received by the UE via a first CSI-RS resource of the plurality of CSI-RS resources, a second CSI-RS (transmitted by the base station using the second transmission power, for example) received by the UE via a second CSI-RS resource of the plurality of CSI-RS resources and/or one or more other CSI-RSs. For example, the set of measurement results may comprise a first measurement result (e.g., at least one of CQI, PMI, RI, CRI, L1, L1-RSRP, L1-SINR, etc.) associated with the first CSI-RS resource and/or the first CSI-RS, a second measurement result (e.g., at least one of CQI, PMI, RI, CRI, L1, L1-RSRP, L1-SINR, etc.) associated with the second CSI-RS resource and/or the second CSI-RS, and/or one or more other measurement results.

In some examples, the UE may derive the CSI report based on the set of measurement results associated with the one or more first CSI-RSs. For example, the UE may (i) compare the set of measurement results associated with the one or more first CSI-RSs to select a selected CSI-RS resource (e.g., the selected CSI-RS resource may be selected based on a determination, based on the set of measurement results, that the selected CSI-RS resource is associated with a strongest signal strength among the one or more CSI-RS resources associated with the one or more first CSI-RSs), and/or (ii) generate the CSI report to comprise CSI comprising (A) an indication that the selected CSI-RS resource is associated with the strongest signal strength among the one or more CSI-RS resources, (B) a selected CSI-RS resource measurement result associated with the selected CSI-RS resource (e.g., the selected CSI-RS resource measurement result may report at least one of CQI, PMI, RI, CRI, L1, L1-RSRP, L1-SINR, etc. associated with the selected CSI-RS resource), and/or (C) a selected CSI-RS resource ID associated with the selected CSI-RS resource (and/or a selected CSI-RS ID associated with a CSI-RS, of the one or more first CSI-RSs, received via the selected CSI-RS resource). In some examples, the base station may use the CSI report to determine which CSI-RS resource (and/or which channel) to use for communication with the UE. For example, in response to transmitting the CSI report indicative of the selected CSI-RS resource, the base station and the UE may communicate using a channel associated with the selected CSI-RS resource.

In one embodiment, the UE determines not to transmit the CSI report (and/or determines not to generate the CSI report for transmission to the base station) in response to not receiving a CSI-RS that is associated with the second transmission power (e.g., in response to not receiving any CSI-RS associated with the second transmission power). For example, the UE may determine not to generate the CSI report (for CSI-RS associated with the second transmission power, for example) and/or may not transmit the CSI report (to the base station, for example) in response to not receiving a CSI-RS (e.g., any CSI-RS from the base station after the adaptation) that is associated with the second transmission power. For example, the UE may skip generation and/or transmission of the CSI report (for CSI-RS associated with the second transmission power, for example) in response to not receiving a CSI-RS (e.g., any CSI-RS from the base station after the adaptation) that is associated with the second transmission power. Alternatively and/or additionally, in response to not receiving a CSI-RS (e.g., any CSI-RS from the base station after the adaptation) that is associated with the second transmission power, the UE may postpone generation and/or transmission of the CSI report (for CSI-RS associated with the second transmission power, for example) until after the UE has received one or more CSI-RSs associated with the second transmission power (e.g., the UE may generate and/or transmit the CSI report based on measurement results of the one or more CSI-RSs associated with the second transmission power).

In one embodiment, the first transmission power is greater than the second transmission power.

In one embodiment, the first transmission power is less than the second transmission power.

In one embodiment, the plurality of CSI-RS resources are associated with (e.g., usable for) channel measurement. For example, the UE may measure one or more CSI-RSs received via one or more CSI-RS resources of the plurality of CSI-RS resources to determine signal strengths associated with one or more channels, and/or may select a selected CSI-RS resource (e.g., a highest quality CSI-RS resource associated with a highest quality channel among the one or more channels), and/or may report the selected CSI-RS resource and/or one or more measurements to the base station.

In one embodiment, the first transmission power is associated with a first sub-configuration.

In one embodiment, the second transmission power is associated with a second sub-configuration.

In some examples, the first sub-configuration and/or the second sub-configuration are included in a plurality of sub-configurations of a CSI report configuration. In some examples, the first sub-configuration corresponds to a first spatial adaptation pattern and/or the second sub-configuration corresponds to a second spatial adaptation pattern different than the first spatial adaptation pattern. In some examples, the CSI report configuration is used by the UE and/or the base station for configuring CSI-RS resources and/or transmitting and/or receiving CSI-RSs for deriving CSI to be reported to the base station.

Referring back to FIGS. 3 and 4, in one exemplary embodiment of a UE, the device 300 includes a program code 312 stored in the memory 310. The CPU 308 may execute program code 312 to enable the UE (i) to receive an indication of an adaptation associated with CSI-RS, wherein the adaptation is associated with switching from a first transmission power to a second transmission power, and the UE is configured with a plurality of CSI-RS resources for deriving a CSI report, and (ii) to determine whether to transmit the CSI report based on whether the UE receives a CSI-RS associated with the second transmission power. Furthermore, the CPU 308 can execute the program code 312 to perform one, some and/or all of the above-described actions and steps and/or others described herein.

Figure 10:
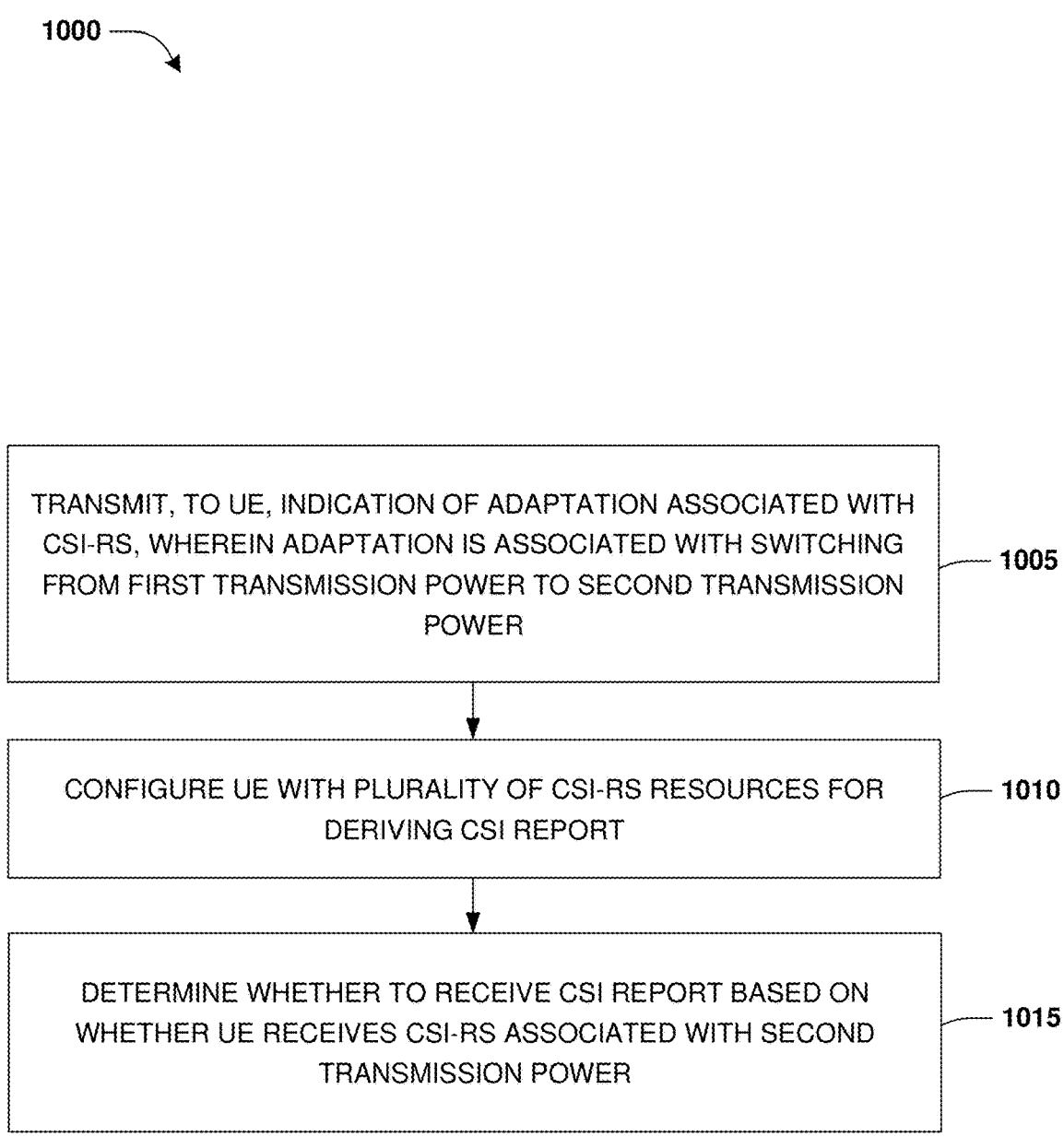
FIG. 10 is a flow chart according to one exemplary embodiment.

FIG. 10 is a flow chart 1000 according to one exemplary embodiment from the perspective of a base station. In step 1005, the base station transmits, to a UE, an indication of an adaptation associated with CSI-RS, wherein the adaptation is associated with switching from a first transmission power to a second transmission power. In step 810, the base station configures the UE with a plurality of CSI-RS resources for deriving (e.g., determining, computing and/or generating) a CSI report. In some examples, the base station transmits a configuration of the plurality of CSI-RS resources to the UE (e.g., the UE receives the configuration from the base station) and/or the UE uses the configuration to configure the plurality of CSI-RS resources. In step 1015, the base station determines whether to receive the CSI report (and/or whether to monitor for the CSI report) based on whether the UE receives a CSI-RS associated with the second transmission power (and/or based on whether the base station has transmitted a CSI-RS associated with the second transmission power to the UE).

In some examples, the adaptation is a CSI-RS adaptation by the base station and/or the UE. In some examples, prior to the adaptation, the base station may use the first transmission power to transmit one or more CSI-RSs using one or more CSI-RS resources (wherein the one or more CSI-RSs transmitted using the first transmission power may be received by the UE). Alternatively and/or additionally, after the adaptation, the UE and/or the base station may use the second transmission power to transmit one or more CSI-RSs using one or more CSI-RS resources (wherein the one or more CSI-RSs transmitted using the second transmission power may be received by the UE).

In one embodiment, based on a determination that the UE received one or more first CSI-RSs that are associated with the second transmission power, the base station may monitor for the CSI report and/or receive the CSI report (from the UE, for example). Alternatively and/or additionally, the base station may monitor for the CSI report and/or receive the CSI report based on a determination that the base station transmitted the one or more first CSI-RSs (using the second transmission power, for example) to the UE.

For example, the UE may (i) monitor for and/or receive the one or more first CSI-RSs (from the base station, for example) via one or more CSI-RS resources of the plurality of CSI-RS resources, and/or (ii) measure the one or more first CSI-RSs to determine a set of measurement results (e.g., at least one of CQI, PMI, RI, CRI, L1, L1-RSRP, L1-SINR, etc.) associated with the one or more first CSI-RSs. For example, the one or more first CSI-RSs may comprise a first CSI-RS transmitted (using the second transmission power, for example) by the base station via a first CSI-RS resource of the plurality of CSI-RS resources, a second CSI-RS transmitted (using the second transmission power, for example) by the base station via a second CSI-RS resource of the plurality of CSI-RS resources and/or one or more other CSI-RSs. For example, the set of measurement results may comprise a first measurement result (e.g., at least one of CQI, PMI, RI, CRI, L1, L1-RSRP, L1-SINR, etc.) associated with the first CSI-RS resource and/or the first CSI-RS, a second measurement result (e.g., at least one of CQI, PMI, RI, CRI, L1, L1-RSRP, L1-SINR, etc.) associated with the second CSI-RS resource and/or the second CSI-RS, and/or one or more other measurement results.

In some examples, the UE may derive the CSI report based on the set of measurement results associated with the one or more first CSI-RSs. For example, the UE may (i) compare the set of measurement results associated with the one or more first CSI-RSs to select a selected CSI-RS resource (e.g., the selected CSI-RS resource may be selected based on a determination, based on the set of measurement results, that the selected CSI-RS resource is associated with a strongest signal strength among the one or more CSI-RS resources associated with the one or more first CSI-RSs), and/or (ii) generate the CSI report to comprise CSI comprising (A) an indication that the selected CSI-RS resource is associated with the strongest signal strength among the one or more CSI-RS resources, (B) a selected CSI-RS resource measurement result associated with the selected CSI-RS resource (e.g., the selected CSI-RS resource measurement result may report at least one of CQI, PMI, RI, CRI, L1, L1-RSRP, L1-SINR, etc. associated with the selected CSI-RS resource), and/or (C) a selected CSI-RS resource ID associated with the selected CSI-RS resource (and/or a selected CSI-RS ID associated with a CSI-RS, of the one or more first CSI-RSs, received via the selected CSI-RS resource). In some examples, the base station may use the CSI report to determine which CSI-RS resource (and/or which beam and/or channel) to use for communication with the UE. For example, in response to receiving the CSI report indicative of the selected CSI-RS resource, the base station and the UE may communicate using a beam and/or channel associated with the selected CSI-RS resource.

In one embodiment, the base station determines not to monitor for and/or receive the CSI report based on a determination that the UE did not receive a CSI-RS that is associated with the second transmission power (e.g., based on a determination that the UE did not receive any CSI-RS associated with the second transmission power). For example, the base station may determine not to monitor for and/or receive the CSI report based on a determination that the base station did not transmit a CSI-RS that is associated with the second transmission power (e.g., based on a determination that the base station did not transmit any CSI-RS associated with the second transmission power). For example, the base station may skip monitoring and/or reception of the CSI report (for CSI-RS associated with the second transmission power, for example) based on a determination that the UE did not receive a CSI-RS that is associated with the second transmission power (and/or based on a determination that the base station did not transmit a CSI-RS that is associated with the second transmission power). Alternatively and/or additionally, based on a determination that the UE did not receive a CSI-RS that is associated with the second transmission power (and/or based on a determination that the base station did not transmit a CSI-RS that is associated with the second transmission power), the base station may postpone reception of the CSI report (for CSI-RS associated with the second transmission power, for example) until after the UE has received one or more CSI-RSs associated with the second transmission power.

In one embodiment, the first transmission power is greater than the second transmission power.

In one embodiment, the first transmission power is less than the second transmission power.

In one embodiment, the plurality of CSI-RS resources are associated with (e.g., usable for) channel measurement. For example, the UE may measure one or more CSI-RSs received via one or more CSI-RS resources of the plurality of CSI-RS resources to determine signal strengths associated with one or more channels, and/or may select a selected CSI-RS resource (e.g., a highest quality CSI-RS resource associated with a highest quality channel among the one or more channels), and/or may report the selected CSI-RS resource and/or one or more measurements to the base station.

In one embodiment, the first transmission power is associated with a first sub-configuration.

In one embodiment, the second transmission power is associated with a second sub-configuration.

In some examples, the first sub-configuration and/or the second sub-configuration are included in a plurality of sub-configurations of a CSI report configuration. In some examples, the first sub-configuration corresponds to a first spatial adaptation pattern and/or the second sub-configuration corresponds to a second spatial adaptation pattern different than the first spatial adaptation pattern. In some examples, the CSI report configuration is used by the UE and/or the base station for configuring CSI-RS resources and/or transmitting and/or receiving CSI-RSs for deriving CSI to be reported to the base station.

Referring back to FIGS. 3 and 4, in one exemplary embodiment of a base station, the device 300 includes a program code 312 stored in the memory 310. The CPU 308 may execute program code 312 to enable the base station (i) to transmit, to a UE, an indication of an adaptation associated with CSI-RS, wherein the adaptation is associated with switching from a first transmission power to a second transmission power, (ii) to configure the UE with a plurality of CSI-RS resources for deriving a CSI report, and (iii) to determine whether to receive the CSI report based on whether the UE receives a CSI-RS associated with the second transmission power. Furthermore, the CPU 308 can execute the program code 312 to perform one, some and/or all of the above-described actions and steps and/or others described herein.

In the present disclosure, a CSI-RS that is associated with a transmission power may correspond to a CSI-RS that is transmitted (by a base station, for example) using an amount of power (e.g., electrical energy) that amounts to (and/or is limited by) about the transmission power.

Figure 11:
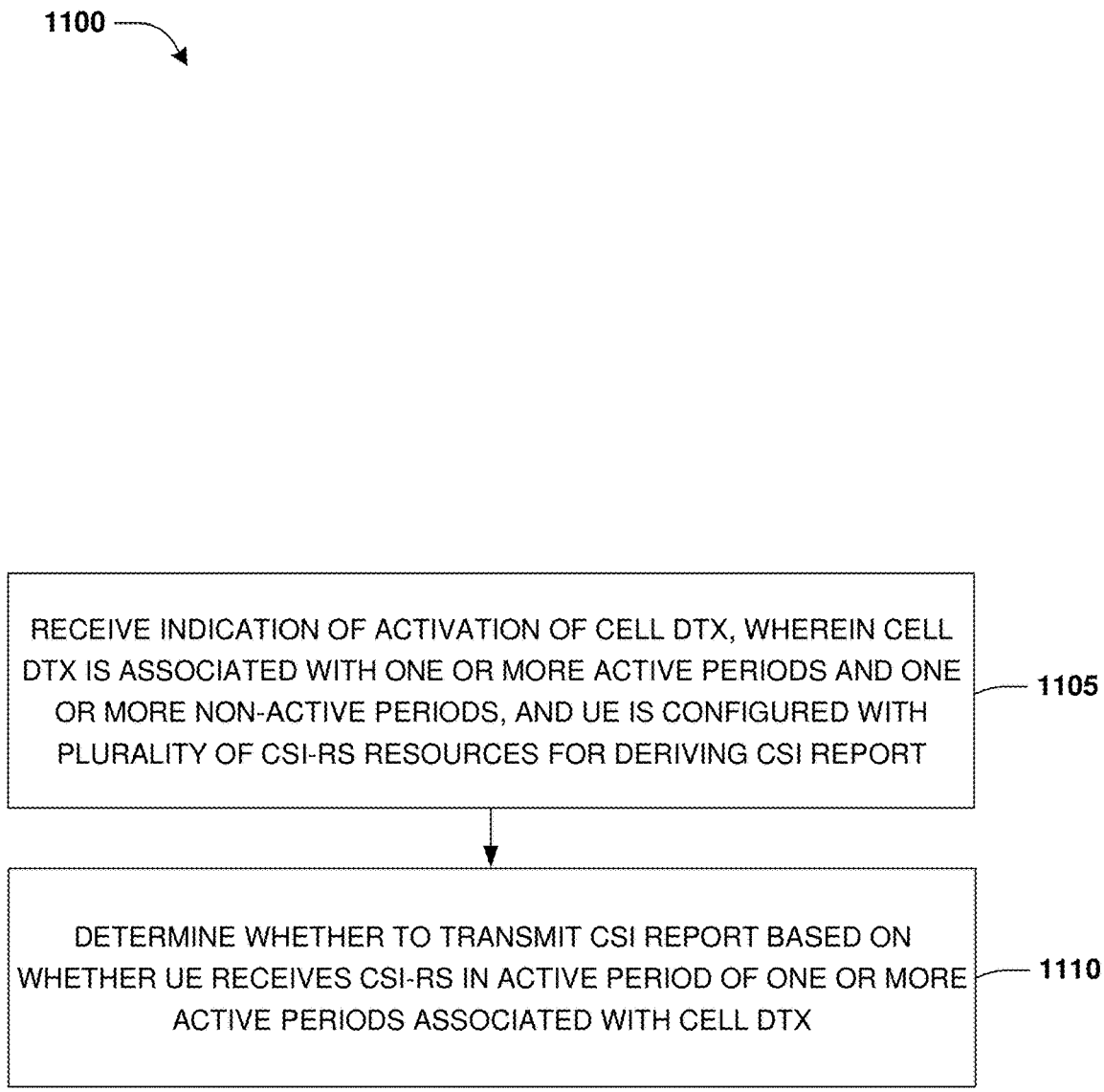
FIG. 11 is a flow chart according to one exemplary embodiment.

FIG. 11 is a flow chart 1100 according to one exemplary embodiment from the perspective of a UE. In step 1105, the UE receives an indication of activation of Cell DTX by a base station, wherein the Cell DTX is associated with one or more active periods and one or more non-active periods, and the UE is configured with a plurality of CSI-RS resources for deriving (e.g., determining, computing and/or generating) a CSI report. In some examples, the UE receives the indication of the activation from the base station. In some examples, the UE receives a configuration of the plurality of CSI-RS resources (e.g., the UE receives the configuration from the base station) and/or uses the configuration to configure the plurality of CSI-RS resources. In step 1110, the UE determines whether to transmit the CSI report (and/or whether to generate the CSI report) based on whether the UE receives a CSI-RS in an active period of the one or more active periods.

In some examples, the activation of the Cell DTX is performed by the base station and/or the UE. In some examples, prior to the activation of the Cell DTX, the UE and/or the base station may operate and/or communicate with each other using a first mode (e.g., a non-energy saving mode). Alternatively and/or additionally, after the activation of the Cell DTX, the UE and/or the base station may operate and/or communicate with each other using the Cell DTX (e.g., an energy saving mode). In some examples, the UE and/or the base station may communicate with each other more during the one or more active periods of the Cell DTX than the one or more non-active periods.

In one embodiment, in response to receiving one or more first CSI-RSs in an active period of the one or more active periods, the UE may (i) generate the CSI report based on the one or more first CSI-RSs and/or (ii) transmit the CSI report (to the base station, for example). For example, the UE may determine to transmit the CSI report (and/or may determine to generate the CSI report for transmission to the base station) in response to receiving the one or more first CSI-RSs in an active period of the one or more active periods. For example, the UE may generate the CSI report and/or may transmit the CSI report (to the base station, for example) in response to receiving at least one CSI-RS in an active period of the one or more active periods (e.g., the at least one CSI-RS may comprise a CSI-RS that is transmitted by the base station and/or received by the UE during the active period of the Cell DTX).

For example, the UE may (i) monitor for and/or receive the one or more first CSI-RSs (from the base station, for example) via one or more CSI-RS resources of the plurality of CSI-RS resources during the active period of the Cell DTX, and/or (ii) measure the one or more first CSI-RSs to determine a set of measurement results (e.g., at least one of CQI, PMI, RI, CRI, L1, L1-RSRP, L1-SINR, etc.) associated with the one or more first CSI-RSs. For example, the one or more first CSI-RSs may comprise a first CSI-RS received by the UE via a first CSI-RS resource of the plurality of CSI-RS resources, a second CSI-RS received by the UE via a second CSI-RS resource of the plurality of CSI-RS resources and/or one or more other CSI-RSs. For example, the set of measurement results may comprise a first measurement result (e.g., at least one of CQI, PMI, RI, CRI, L1, L1-RSRP, L1-SINR, etc.) associated with the first CSI-RS resource and/or the first CSI-RS, a second measurement result (e.g., at least one of CQI, PMI, RI, CRI, L1, L1-RSRP, L1-SINR, etc.) associated with the second CSI-RS resource and/or the second CSI-RS, and/or one or more other measurement results.

In some examples, the UE may derive the CSI report based on the set of measurement results associated with the one or more first CSI-RSs. For example, the UE may (i) compare the set of measurement results associated with the one or more first CSI-RSs to select a selected CSI-RS resource (e.g., the selected CSI-RS resource may be selected based on a determination, based on the set of measurement results, that the selected CSI-RS resource is associated with a strongest signal strength among the one or more CSI-RS resources associated with the one or more first CSI-RSs), and/or (ii) generate the CSI report to comprise CSI comprising (A) an indication that the selected CSI-RS resource is associated with the strongest signal strength among the one or more CSI-RS resources, (B) a selected CSI-RS resource measurement result associated with the selected CSI-RS resource (e.g., the selected CSI-RS resource measurement result may report at least one of CQI, PMI, RI, CRI, L1, L1-RSRP, L1-SINR, etc. associated with the selected CSI-RS resource), and/or (C) a selected CSI-RS resource ID associated with the selected CSI-RS resource (and/or a selected CSI-RS ID associated with a CSI-RS, of the one or more first CSI-RSs, received via the selected CSI-RS resource). In some examples, the base station may use the CSI report to determine which CSI-RS resource (and/or which channel) to use for communication with the UE. For example, in response to transmitting the CSI report indicative of the selected CSI-RS resource, the base station and the UE may communicate using a channel associated with the selected CSI-RS resource.

In one embodiment, the UE determines not to transmit the CSI report (and/or determines not to generate the CSI report for transmission to the base station) in response to not receiving a CSI-RS in an active period of the one or more active periods of the Cell DTX (e.g., in response to not receiving any CSI-RS in an active period of the Cell DTX). For example, the UE may determine not to generate the CSI report and/or may not transmit the CSI report (to the base station, for example) in response to not receiving a CSI-RS (e.g., any CSI-RS from the base station) in an active period of the Cell DTX. For example, the UE may skip generation and/or transmission of the CSI report in response to not receiving a CSI-RS (e.g., any CSI-RS from the base station) in an active period of the Cell DTX. Alternatively and/or additionally, in response to not receiving a CSI-RS (e.g., any CSI-RS from the base station) in an active period of the Cell DTX, the UE may postpone generation and/or transmission of the CSI report until after the UE has received one or more CSI-RSs in an active period of the Cell DTX (e.g., the UE may generate and/or transmit the CSI report based on measurement results of the one or more CSI-RSs received in the active period).

In one embodiment, the Cell DTX is associated with transmission of CSI-RS in the one or more active periods. For example, the Cell DTX (and/or the base station and/or the UE) may be configured such that CSI-RS is transmitted in an active period (of the one or more active periods) of the Cell DTX.

In one embodiment, the Cell DTX is associated with not transmitting CSI-RS in the one or more non-active periods. For example, the Cell DTX (and/or the base station and/or the UE) may be configured such that CSI-RS is not transmitted in a non-active period (of the one or more non-active periods) of the Cell DTX.

In one embodiment, the plurality of CSI-RS resources are associated with (e.g., usable for) channel measurement. For example, the UE may measure one or more CSI-RSs received via one or more CSI-RS resources of the plurality of CSI-RS resources to determine signal strengths associated with one or more channels, and/or may select a selected CSI-RS resource (e.g., a highest quality CSI-RS resource associated with a highest quality channel among the one or more channels), and/or may report the selected CSI-RS resource and/or one or more measurements to the base station.

In one embodiment, the CSI report comprises CQI, PMI, RI, CRI, L1, L1-RSRP, and/or L1-SINR.

Referring back to FIGS. 3 and 4, in one exemplary embodiment of a UE, the device 300 includes a program code 312 stored in the memory 310. The CPU 308 may execute program code 312 to enable the UE (i) to receive an indication of activation of Cell DTX, wherein the Cell DTX is associated with one or more active periods and one or more non-active periods, and the UE is configured with a plurality of CSI-RS resources for deriving a CSI report, and (ii) to determine whether to transmit the CSI report based on whether the UE receives a CSI-RS in an active period of the one or more active periods associated with the Cell DTX. Furthermore, the CPU 308 can execute the program code 312 to perform one, some and/or all of the above-described actions and steps and/or others described herein.

Figure 12:
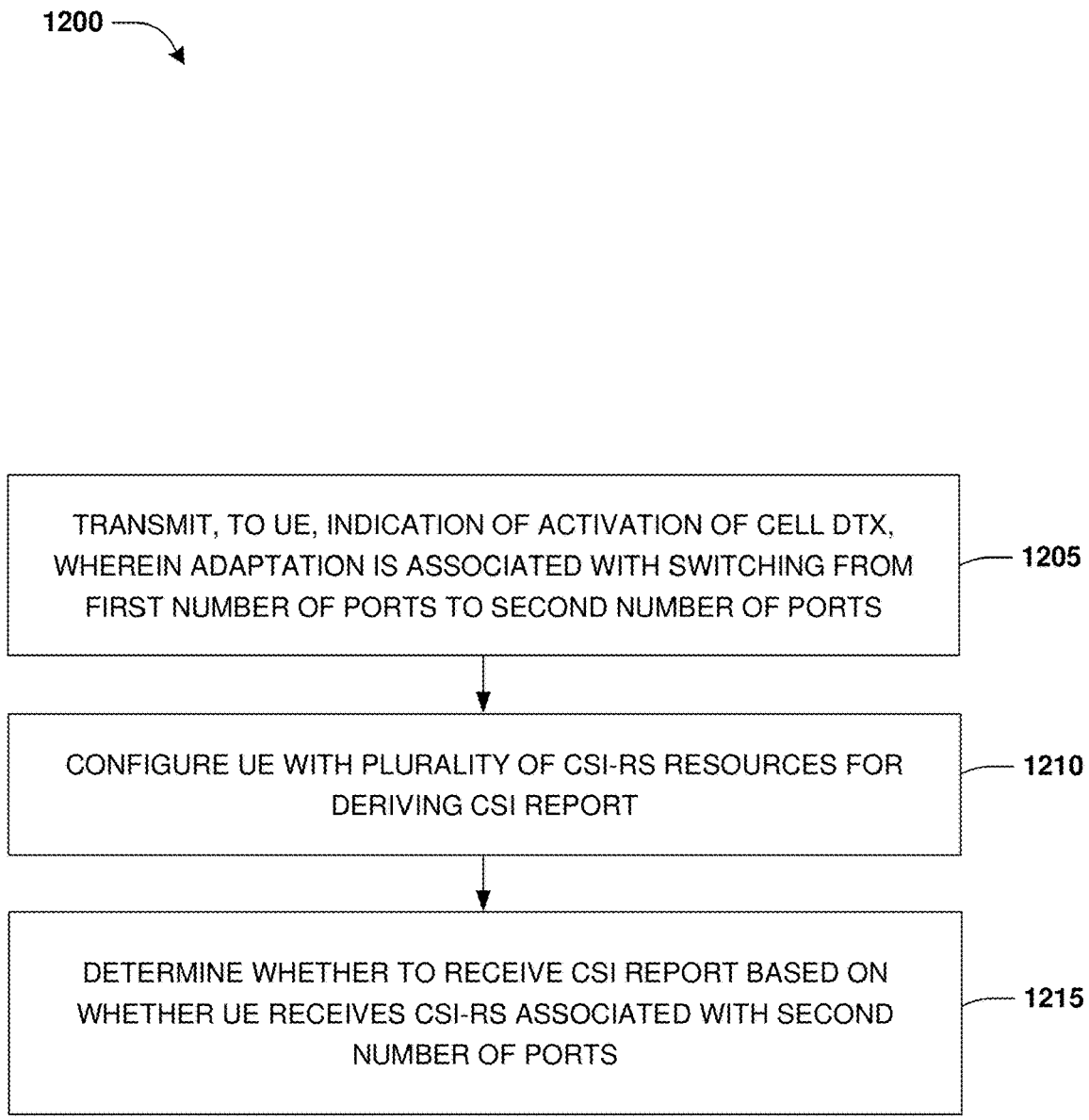
FIG. 12 is a flow chart according to one exemplary embodiment.

FIG. 12 is a flow chart 1200 according to one exemplary embodiment from the perspective of a base station. In step 1205, the base station transmits, to a UE, an indication of activation of Cell DTX, wherein the Cell DTX is associated with one or more active periods and one or more non-active periods. In step 1210, the base station configures the UE with a plurality of CSI-RS resources for deriving (e.g., determining, computing and/or generating) a CSI report. In some examples, the base station transmits a configuration of the plurality of CSI-RS resources to the UE (e.g., the UE receives the configuration from the base station) and/or the UE uses the configuration to configure the plurality of CSI-RS resources. In step 1215, the base station determines whether to receive the CSI report (and/or whether to monitor for the CSI report) based on whether the UE receives a CSI-RS in an active period of the one or more active periods (and/or based on whether the base station has transmitted a CSI-RS to the UE in an active period of the one or more active periods).

In some examples, the activation of the Cell DTX is performed by the base station and/or the UE. In some examples, prior to the activation of the Cell DTX, the UE and/or the base station may operate and/or communicate with each other using a first mode (e.g., a non-energy saving mode). Alternatively and/or additionally, after the activation of the Cell DTX, the UE and/or the base station may operate and/or communicate with each other using the Cell DTX (e.g., an energy saving mode). In some examples, the UE and/or the base station may communicate with each other more during the one or more active periods of the Cell DTX than the one or more non-active periods.

In one embodiment, based on a determination that the UE received one or more first CSI-RSs in an active period of the one or more active periods, the base station may monitor for the CSI report and/or receive the CSI report (from the UE, for example). Alternatively and/or additionally, the base station may monitor for the CSI report and/or receive the CSI report based on a determination that the base station transmitted the one or more first CSI-RSs to the UE.

For example, the UE may (i) monitor for and/or receive the one or more first CSI-RSs (from the base station, for example) via one or more CSI-RS resources of the plurality of CSI-RS resources during the active period of the Cell DTX, and/or (ii) measure the one or more first CSI-RSs to determine a set of measurement results (e.g., at least one of CQI, PMI, RI, CRI, L1, L1-RSRP, L1-SINR, etc.) associated with the one or more first CSI-RSs. For example, the one or more first CSI-RSs may comprise a first CSI-RS transmitted by the base station via a first CSI-RS resource of the plurality of CSI-RS resources, a second CSI-RS transmitted by the base station via a second CSI-RS resource of the plurality of CSI-RS resources and/or one or more other CSI-RSs. For example, the set of measurement results may comprise a first measurement result (e.g., at least one of CQI, PMI, RI, CRI, L1, L1-RSRP, L1-SINR, etc.) associated with the first CSI-RS resource and/or the first CSI-RS, a second measurement result (e.g., at least one of CQI, PMI, RI, CRI, L1, L1-RSRP, L1-SINR, etc.) associated with the second CSI-RS resource and/or the second CSI-RS, and/or one or more other measurement results.

In some examples, the UE may derive the CSI report based on the set of measurement results associated with the one or more first CSI-RSs. For example, the UE may (i) compare the set of measurement results associated with the one or more first CSI-RSs to select a selected CSI-RS resource (e.g., the selected CSI-RS resource may be selected based on a determination, based on the set of measurement results, that the selected CSI-RS resource is associated with a strongest signal strength among the one or more CSI-RS resources associated with the one or more first CSI-RSs), and/or (ii) generate the CSI report to comprise CSI comprising (A) an indication that the selected CSI-RS resource is associated with the strongest signal strength among the one or more CSI-RS resources, (B) a selected CSI-RS resource measurement result associated with the selected CSI-RS resource (e.g., the selected CSI-RS resource measurement result may report at least one of CQI, PMI, RI, CRI, L1, L1-RSRP, L1-SINR, etc. associated with the selected CSI-RS resource), and/or (C) a selected CSI-RS resource ID associated with the selected CSI-RS resource (and/or a selected CSI-RS ID associated with a CSI-RS, of the one or more first CSI-RSs, received via the selected CSI-RS resource). In some examples, the base station may use the CSI report to determine which CSI-RS resource (and/or which beam and/or channel) to use for communication with the UE. For example, in response to receiving the CSI report indicative of the selected CSI-RS resource, the base station and the UE may communicate using a beam and/or channel associated with the selected CSI-RS resource.

In one embodiment, the base station determines not to monitor for and/or receive the CSI report based on a determination that the UE did not receive a CSI-RS in an active period of the one or more active periods of the Cell DTX (e.g., based on a determination that the UE did not receive any CSI-RS in an active period of the Cell DTX). For example, the base station may determine not to monitor for and/or receive the CSI report based on a determination that the base station did not transmit a CSI-RS in an active period of the one or more active periods of the Cell DTX (e.g., based on a determination that the base station did not transmit any CSI-RS in an active period of the Cell DTX). For example, the base station may skip monitoring and/or reception of the CSI report based on a determination that the UE did not receive a CSI-RS in an active period of the one or more active periods of the Cell DTX (and/or based on a determination that the base station did not transmit a CSI-RS in an active period of the one or more active periods of the Cell DTX). Alternatively and/or additionally, based on a determination that the UE did not receive a CSI-RS in an active period of the one or more active periods of the Cell DTX (and/or based on a determination that the base station did not transmit a CSI-RS in an active period of the one or more active periods of the Cell DTX), the base station may postpone reception of the CSI report until after the UE has received one or more CSI-RSs in an active period of the Cell DTX.

In one embodiment, the Cell DTX is associated with transmission of CSI-RS in the one or more active periods. For example, the Cell DTX (and/or the base station and/or the UE) may be configured such that CSI-RS is transmitted in an active period (of the one or more active periods) of the Cell DTX.

In one embodiment, the Cell DTX is associated with not transmitting CSI-RS in the one or more non-active periods. For example, the Cell DTX (and/or the base station and/or the UE) may be configured such that CSI-RS is not transmitted in a non-active period (of the one or more non-active periods) of the Cell DTX. Alternatively and/or additionally, the Cell DTX (and/or the base station and/or the UE) may be configured such that the base station is prohibited from and/or not allowed to transmit CSI-RS in a non-active period (of the one or more non-active periods) of the Cell DTX.

In one embodiment, the plurality of CSI-RS resources are associated with (e.g., usable for) channel measurement. For example, the UE may measure one or more CSI-RSs received via one or more CSI-RS resources of the plurality of CSI-RS resources to determine signal strengths associated with one or more channels, and/or may select a selected CSI-RS resource (e.g., a highest quality CSI-RS resource associated with a highest quality channel among the one or more channels), and/or may report the selected CSI-RS resource and/or one or more measurements to the base station.

In one embodiment, the CSI report comprises CQI, PMI, RI, CRI, L1, L1-RSRP, and/or L1-SINR.

Referring back to FIGS. 3 and 4, in one exemplary embodiment of a base station, the device 300 includes a program code 312 stored in the memory 310. The CPU 308 may execute program code 312 to enable the base station (i) to transmit, to a UE, an indication of activation of Cell DTX, wherein the adaptation is associated with switching from a first number of ports to a second number of ports, (ii) to configure the UE with a plurality of CSI-RS resources for deriving a CSI report, and (iii) to determine whether to receive the CSI report based on whether the UE receives a CSI-RS associated with the second number of ports. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 6-12. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 6-12, and/or one, some and/or all of the above-described actions and steps and/or others described herein.

It may be appreciated that applying one or more of the techniques presented herein may result in one or more benefits including, but not limited to, increased efficiency of communication between devices, such as due, at least in part, to enabling a UE to measure and/or report CSI properly under network adaptation.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), comprising:
receiving an indication of activation of Cell Discontinuous Transmission (DTX) of a base station, wherein:
the Cell DTX is associated with one or more active periods and one or more non-active periods; and
the UE is configured with a plurality of Channel State Information Reference Signal (CSI-RS) resources for deriving a Channel State Information (CSI) report; and
determining whether to transmit the CSI report based on whether the UE receives a CSI-RS for deriving the CSI report in an active period of the one or more active periods associated with the Cell DTX.

2. The method of claim 1, comprising:
in response to receiving one or more first CSI-RSs in an active period of the one or more active periods, at least one of:
generating the CSI report based on the one or more first CSI-RSs; or
transmitting the CSI report.

3. The method of claim 1, wherein:
the UE determines not to transmit the CSI report in response to not receiving a CSI-RS in an active period of the one or more active periods.

4. The method of claim 1, wherein:
the Cell DTX is associated with transmission of CSI-RS in the one or more active periods.

5. The method of claim 1, wherein:
the Cell DTX is associated with not transmitting CSI-RS in the one or more non-active periods.

6. The method of claim 1, wherein:
the plurality of CSI-RS resources are associated with channel measurement.

7. The method of claim 1, wherein:
the CSI report comprises at least one of Channel Quality Indicator (CQI), precoding matrix indicator (PMI), rank indicator (RI), CSI-RS resource indicator (CRI), Layer Indicator (LI), Layer 1 Reference Signal Received Power (L1-RSRP), or Layer 1 signal to interference and noise ratio (L1-SINR).

8. The method of claim 1, wherein:
the UE receives the indication from the base station.

9. A method of a base station, comprising:
transmitting, to a User Equipment (UE), an indication of activation of Cell Discontinuous Transmission (DTX), wherein the Cell DTX is associated with one or more active periods and one or more non-active periods;
configuring the UE with a plurality of Channel State Information Reference Signal (CSI-RS) resources for deriving a Channel State Information (CSI) report; and
determining whether to receive the CSI report based on whether the UE receives a CSI-RS for deriving the CSI report in an active period of the one or more active periods associated with the Cell DTX.

10. The method of claim 9, wherein:
based on a determination that the UE received one or more first CSI-RSs in an active period of the one or more active periods, at least one of:
monitoring for the CSI report; or
receiving the CSI report.

11. The method of claim 9, wherein:
the base station determines not to at least one of monitor for or receive the CSI report based on a determination that the UE did not receive a CSI-RS in an active period of the one or more active periods.

12. The method of claim 9, wherein:
the Cell DTX is associated with transmission of CSI-RS in the one or more active periods.

13. The method of claim 9, wherein:
the Cell DTX is associated with not transmitting CSI-RS in the one or more non-active periods.

14. The method of claim 9, wherein:
the plurality of CSI-RS resources are associated with channel measurement.

15. The method of claim 9, wherein:
the CSI report comprises at least one of Channel Quality Indicator (CQI), precoding matrix indicator (PMI), rank indicator (RI), CSI-RS resource indicator (CRI), Layer Indicator (LI), Layer 1 Reference Signal Received Power (L1-RSRP), or Layer 1 signal to interference and noise ratio (L1-SINR).

16. A User Equipment (UE) comprising:
a control circuit;
a processor installed in the control circuit; and
a memory installed in the control circuit and operatively coupled to the processor, wherein the processor is configured to execute a program code stored in the memory to perform operations, the operations comprising:
receiving an indication of activation of Cell Discontinuous Transmission (DTX) of a base station, wherein:
the Cell DTX is associated with one or more active periods and one or more non-active periods; and
the UE is configured with a plurality of Channel State Information Reference Signal (CSI-RS) resources for deriving a Channel State Information (CSI) report; and
determining whether to transmit the CSI report based on whether the UE receives a CSI-RS for deriving the CSI report in an active period of the one or more active periods associated with the Cell DTX.

17. The UE of claim 16, the operations comprising:
in response to receiving one or more first CSI-RSs in an active period of the one or more active periods, at least one of:
generating the CSI report based on the one or more first CSI-RSs; or
transmitting the CSI report.

18. The UE of claim 16, wherein:
the UE determines not to transmit the CSI report in response to not receiving a CSI-RS in an active period of the one or more active periods.

19. The UE of claim 16, wherein:
the Cell DTX is associated with transmission of CSI-RS in the one or more active periods.

20. The UE of claim 16, wherein:
the Cell DTX is associated with not transmitting CSI-RS in the one or more non-active periods.

* * * * *